US011797655B1

(12) United States Patent
Kaizer et al.

(10) Patent No.: US 11,797,655 B1
(45) Date of Patent: Oct. 24, 2023

(54) TRANSFERRING A DOMAIN NAME ON A SECONDARY BLOCKCHAIN MARKET AND IN THE DNS

(71) Applicant: VERISIGN, INC., Reston, VA (US)

(72) Inventors: Andrew Kaizer, Arlington, VA (US); Swapneel Sheth, Fairfax, VA (US)

(73) Assignee: Verisign, Inc., Reston, VA (US)

(*) Notice: Subject to any disclaimer, the term of this patent is extended or adjusted under 35 U.S.C. 154(b) by 47 days.

(21) Appl. No.: 16/515,825

(22) Filed: Jul. 18, 2019

(51) Int. Cl.
*G06F 21/31* (2013.01)
*G06Q 20/36* (2012.01)
(Continued)

(52) U.S. Cl.
CPC .............. *G06F 21/31* (2013.01); *G06F 16/22* (2019.01); *G06Q 20/3678* (2013.01);
(Continued)

(58) Field of Classification Search
CPC ...... G06F 21/31; G06F 21/6245; G06F 16/22; G06F 16/245; G06F 21/6272; G06Q 20/40; G06Q 20/389; G06Q 20/3821; G06Q 20/383; G06Q 20/4014; G06Q 30/0206; G06Q 20/223; G06Q 20/065; G06Q 20/3827; G06Q 20/3829; G06Q 20/36; H04L 9/3236; H04L 9/3297; H04L 9/0894; H04L 9/3239; H04L 63/0421;
(Continued)

(56) References Cited

U.S. PATENT DOCUMENTS 10,721,060 B1   7/2020   Kaizer et al.
11,159,326 B1   10/2021  Nelson et al.
(Continued)

FOREIGN PATENT DOCUMENTS

CN    107705114 A    2/2018
CN    109981633 A    7/2019
(Continued)

OTHER PUBLICATIONS

International Search Report and Written Opinion issued in International Application No. PCT/US2019/038447 dated Sep. 30, 2019, pp. 1-15.
(Continued)

*Primary Examiner* — Kyung H Shin
(74) *Attorney, Agent, or Firm* — Lee & Hayes, P.C.

(57) ABSTRACT

Techniques for transferring registration of a domain name from a first registrant to a second registrant for cryptocurrency in a blockchain network and in the Domain Name System (DNS) are disclosed. The techniques can include receiving a purchase request message comprising the domain name, at least one purchase parameter, and a second registrant network identifier, and sending a purchase instruction message to an executable program on a blockchain for the blockchain network, the purchase instruction message including the domain name and the second registrant network identifier, such that the executable program writes at least the domain name, the second registrant network identifier, and an identifier of a gaining registrar to a deed contract for the domain name and emits an event representing a request to transfer registration of the domain name.

20 Claims, 29 Drawing Sheets

(51) Int. Cl.
*H04L 61/3015* (2022.01)
*H04L 41/08* (2022.01)
*H04L 61/4511* (2022.01)
*H04L 9/08* (2006.01)
*G06F 16/22* (2019.01)

(52) U.S. Cl.
CPC ............ *H04L 9/0869* (2013.01); *H04L 41/08* (2013.01); *H04L 61/3025* (2013.01); *H04L 61/4511* (2022.05); *G06Q 2220/00* (2013.01)

(58) Field of Classification Search
CPC ............. H04L 63/0807; H04L 63/0853; H04L 61/302; H04L 9/0869; H04L 9/0637; H04L 9/3066; H04L 9/30; H04L 9/3247; H04L 9/50; H04L 67/104; H04L 9/0825; H04W 12/06; H04W 12/75
See application file for complete search history.

(56) References Cited

U.S. PATENT DOCUMENTS

| | | |
|---|---|---|
| 11,354,658 B2 | 6/2022 | Lyons et al. |
| 11,392,579 B2 | 7/2022 | Kasimov et al. |
| 11,587,071 B2 | 2/2023 | Ravinathan et al. |
| 11,621,829 B2 | 4/2023 | Kaizer et al. |
| 11,632,236 B1 | 4/2023 | Kaizer et al. |
| 2007/0130316 A1 | 6/2007 | Turakhia |
| 2007/0143469 A1 | 6/2007 | Adams et al. |
| 2008/0235383 A1 | 9/2008 | Schneider |
| 2011/0296440 A1 | 12/2011 | Laurich et al. |
| 2012/0011360 A1 | 1/2012 | Engels et al. |
| 2012/0174198 A1 | 7/2012 | Gould et al. |
| 2015/0278820 A1 | 10/2015 | Meadows |
| 2016/0173439 A1 | 6/2016 | Kaliski, Jr. et al. |
| 2016/0196300 A1* | 7/2016 | Kamdar ............... G06F 16/22 707/770 |
| 2016/0292672 A1 | 10/2016 | Fay et al. |
| 2017/0180134 A1 | 6/2017 | King |
| 2017/0310484 A1 | 10/2017 | Kaliski, Jr. et al. |
| 2017/0324738 A1 | 11/2017 | Hari et al. |
| 2017/0330174 A1 | 11/2017 | Demarinis et al. |
| 2017/0344988 A1 | 11/2017 | Cusden et al. |
| 2017/0346833 A1 | 11/2017 | Zhang |
| 2018/0227275 A1 | 8/2018 | Russinovich et al. |
| 2018/0262493 A1 | 9/2018 | Andrade |
| 2018/0276663 A1 | 9/2018 | Arora |
| 2018/0287997 A1 | 10/2018 | Li et al. |
| 2019/0121988 A1 | 4/2019 | van de Ruit et al. |
| 2019/0156040 A1 | 5/2019 | Sasin et al. |
| 2019/0166085 A1 | 5/2019 | Li et al. |
| 2019/0220831 A1* | 7/2019 | Rangarajan ........... H04L 9/0869 |
| 2019/0236571 A1 | 8/2019 | Arora et al. |
| 2019/0253252 A1 | 8/2019 | Qiu |
| 2019/0333054 A1* | 10/2019 | Cona ....................... G06F 21/31 |
| 2020/0021446 A1 | 1/2020 | Roennow et al. |
| 2020/0058023 A1 | 2/2020 | Travizano et al. |
| 2020/0145373 A1 | 5/2020 | Richardson |
| 2020/0314055 A1 | 10/2020 | Blinn |
| 2020/0328883 A1 | 10/2020 | Kaizer et al. |
| 2020/0382372 A1 | 12/2020 | Easwar Prasad et al. |
| 2020/0403809 A1 | 12/2020 | Chan et al. |
| 2021/0037013 A1 | 2/2021 | Salkintzis |
| 2021/0135867 A1 | 5/2021 | Zeng et al. |
| 2022/0103370 A1 | 3/2022 | Alwen et al. |
| 2022/0376889 A1 | 11/2022 | Kaizer et al. |
| 2022/0376925 A1 | 11/2022 | Kaizer et al. |

FOREIGN PATENT DOCUMENTS

| | | |
|---|---|---|
| CN | 112671950 A | 4/2021 |
| CN | 112765684 A | 5/2021 |
| JP | 2021-524978 A | 9/2021 |
| WO | 2018007828 A2 | 1/2018 |
| WO | 2020/150741 A1 | 7/2020 |
| WO | 2022/246189 A1 | 11/2022 |
| WO | 2022/246193 A1 | 11/2022 |

OTHER PUBLICATIONS

Domraider, "ICO Whitepaper," www.domraider.io, SIRET 79417114000013 [retrieved on Aug. 25, 2019], Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019] Retrieved from the Internet: URL:https://pdfs.semanticscholar.org/7e38/b0c0e6f7066de9821 b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/ 20 17/TCD-SCSS-DISSERTA TION-2017-015.pdf pp. 1-89.

International Preliminary Report on Patentability issued in International Application No. PCT/US2019/038447 dated Jan. 7, 2021, pp. 1-13.

Notice of Allowance issued in U.S. Appl. No. 16/024,488 dated Mar. 13, 2020, 30 pages.

Office Action issued in U.S. Appl. No. 16/402,047 dated Feb. 1, 2021, 14 pages.

Office Action issued in U.S. Appl. No. 16/402,047 dated May 11, 2021, 9 pages.

Office Action issued in U.S. Appl. No. 16/402,047 dated Aug. 9, 2021, 10 pages.

Baritz et al., ID4me—Technical White Paper Draft, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", https://blog.undeveloped.com/domain-industry-join-us-in-becoming-innovative-thriving-again-a751d2e17ae9, Nov. 21, 2017, pp. 1-6.

DNS Registrar guide—Ethereum Name Service, https://docs.ens.domains/dns-registrar-guide, pp. 1-5.

Einarrson, B., "[DNSOP] Verifying TLD operator authorisation," https://mailarchive.ietf.org/arch/msg/dnsop/qaDjnArp98T0glBYQbUfswwaxrg, Jun. 18, 2019, 1 page.

Hollenbeck, S., "Extensible Provisioning Protocol (EPP) Domain Name Mapping," RFC 4931, https://datatracker.ietf.org/doc/html/rfc4931, May 2007, pp. 1-46.

Hollenbeck, S., "Extensible Provisioning Protocol (EPP)," RFC 5730, https://datatracker.ietf.org/doc/html/rfc5730, Aug. 2009, pp. 1-67.

Hollenbeck et al., "Security Services for the Registration Data Access Protocal (RDAP)," RFC 7481, https://tools.ietf.org/html/rfc7481, Mar. 2015, pp. 1-13.

Johnson, N., "[DNSOP] Verifying TLD operator authorisation," https://mailarchive.ietf.org/arch/msg/dnsop/AX5D3cqSTWF69pAWqu5Pn6SGXDs, Jun. 14, 2019, 1 page.

Johnson, N., "ENS Root Change Will Allow Easy Integration of More Than 1300 DNS TLDs," https://medium.com/the-ethereum-name-service/upcoming-changes-to-the-ens-root-a1b78fd52b38, Feb. 25, 2019, 4 pages.

Johnson, N., "Introducing .luxe on ENS," https://medium.com/@weka/introducing-luxe-on-ens-35a9ee2383ce, Oct. 2, 2018, 4 pages.

Kuhl, R., "[DNSOP] Verifying TLD operator authorisation," https://mailarchive.ietf.org/arch/msg/dnsop/DQEjRQzAafeGoMckNTt5GxSTe9g, Jun. 14, 2019, 1 page.

(56) References Cited

OTHER PUBLICATIONS

Millegan, B., "ENS + .KRED: Major Integration of DNS and ENS Launches," https://medium.com/the-ethereum-name-service/ens-kred-major-integration-of-dns-and-ens-launches-e7efb4dd872a, Feb. 19, 2020, 3 pages.

Millegan, B., "Ethereum Name Service," https://vir.isi.edu/events/dinr2020/S/blantly-ENS.pdf, 24 pages.

Millegan, B., "Linking DNS with blockchain-based ENS records," https://ccnso.icann.org/sites/default/files/field-attached/presentation-dns-blockchain-ens-24jun19-en.pdf, 31 pages.

Monster, R., "Domain Leasing : How we do it at Epik, and how you can too," https://www.epik.com/blog/leasing-domains-how-we-do-it-at-epik-and-how-you-can-too.html, Mar. 27, 2020, 14 pages.

Verisign, Inc., "Ethereum Name Service (ENS) Root Change Issues," Verisign Technical Note, https://www.verisign.com/assets/labs/ens-root-change-issues-5.2020.pdf, pp. 1-2.

International Search Report and Written Opinion for Application No. PCT/US2022/030241, dated Oct. 6, 2022, 8 pages.

International Search Report and Written Opinion for Application No. PCT/US2022/030248, dated Oct. 6, 2022, 6 pages.

U.S. Final Office Action for U.S. Appl. No. 16/515,825, dated Sep. 20, 2021, 19 pages.

U.S. Non-Final Office Action for U.S. Appl. No. 16/515,825, dated Apr. 15, 2021, 14 pages.

U.S. Notice of Allowance for U.S. Appl. No. 17/325,687, dated Apr. 17, 2023, 25 pages.

\* cited by examiner

TRANSFERRING A DOMAIN NAME ON A SECONDARY BLOCKCHAIN MARKET AND IN THE DNS

FIELD

This disclosure relates generally to blockchains, and, more particularly, to use of a domain name as a blockchain address.

BACKGROUND

The domain name system (DNS) is a hierarchical distributed naming system for resources provided by computer servers that are connected to the internet. It associates domain names to numeric internet protocol (IP) addresses of internet resources. The DNS thus allows computers and humans to access networked resources, including web pages, using domain names.

According to some embodiments, and unless otherwise qualified by specifying the level, the term domain name may refer to a fully qualified domain name, including a top-level domain name, a second-level domain name, and possibly additional levels of domain names.

According to some embodiments, a DNS registry is an authoritative, master database of all domain names registered in a top-level domain or other domain in which domain names can be registered. A registry may include many hardware computer servers operably coupled to the internet. For ease of discussion, a registry may be identified with its hardware computer servers unless otherwise specified or clear from context. Internet users generally interact with the registry via intermediaries such as registrars.

According to some embodiments, registrars may be companies that register registrations of domain names by entities known as registrants. Registrars may compete with one another to register domain names for registrants through the registry. That is, an internet user may interact with a registrar to obtain registration of a domain name, thereby becoming a registrant for the domain. Registrars typically include many hardware computer servers. According to an embodiment, a registrar is identified with its hardware computer servers. According to an embodiment, a registrant is identified with its hardware client computer.

According to some embodiments, service providers may provide DNS-related services, but are not DNS registrars or DNS registries. For example, web hosting providers may provide the web server computers that serve the web pages associated with domain names. These entities may be considered service providers in the DNS context. As another example, consumer DNS resolvers may provide DNS resolution services separate from the official distributed database of DNS data maintained by the official DNS registries. Such DNS operators are also a type of service provider. As yet another example, service providers in the DNS context may act on a user's behalf, e.g., to enable DNSSEC for a registrant's domain. Other service providers exist. Note that some service providers may be trusted service providers, e.g., providing cryptographic and/or authentication services.

A hash may be a function that can input a variety of computer-interpretable objects and output a fixed-size string, e.g., a hexadecimal number. Hashes may have other useful properties such as preimage resistance (or irreversibility) and collision resistance.

Asymmetric cryptography generally refers to cryptography that utilizes an asymmetric key pair that includes keys that may be referred to as a public key and a private key. A message or other data may be encrypted by applying an encryption algorithm under control of the public key, and an encrypted message or other data may be decrypted by applying a conjugate decryption algorithm and under control of the private key to the encrypted message. Asymmetric cryptography includes asymmetric cryptographic schemes, such as the Rivest-Shamir-Adleman (RSA) technique, as well as the Diffie-Hellman family of techniques.

According to some embodiments, a digital signature may be the result of applying a private key of an asymmetric cryptographic key pair to encrypt a computer-interpretable object. The corresponding public key may be published or otherwise made available by the signing entity to the verifying party. The object may first be hashed as part of the digital signature process. A verifying party can verify the digital signature by applying the public key to decrypt the digital signature and comparing the result to the object or the hash of the object, or otherwise by determining that the digital signature corresponds to the object or its hash, depending on the scheme. If the comparison results in a match, then the digital signature is valid; otherwise it is invalid. Digital signatures may confer authentication (e.g., binding the signed object to the signer), non-repudiation (e.g., assuring that the signed object was indeed signed by the signing entity), and/or object integrity (e.g., assuring that the signed object has not changed since being signed). According to some embodiments, the process of validating a digital signature includes confirming that the aforementioned properties hold for the signed object. An asymmetric key pair that supports digital signatures may or may not also support encryption and decryption operations.

A digital certificate is a package that includes information identifying a public key (e.g., the key itself or a hash of the key), together with information identifying the owner of the key, and a digital signature on at least some of the package contents. Digital certificates may have expiration dates, which may be represented in the package contents. The digital certificate may be produced (e.g., digitally signed) by a trusted party, such as a certification authority. A digital certificate provides any entity that trusts the party that digitally signed the digital certificate with the ability to validate that the digitally signed public key is indeed associated with the party identified in the digital certificate. Thus, digital certificates are used to protect data, encrypt transactions, and enable secure communications, among other uses. An example standard for digital certificates is the X.509 standard, promulgated by the International Telecommunications Union's Standardization sector.

According to some embodiments, a certification authority may be an entity that provides digital certificates. Thus, certificate authorities may be trusted third parties, which verify the identities of parties engaged in some communication. Certificate authorities may issue many digital certificates per minute. Certification authorities are identified with the computer servers that provide the digital certificates.

According to some embodiments, a blockchain may be an electronic ledger that records transactions. For example, the blockchain may be a decentralized, distributed, electronic ledger that records transactions, including but not limited to cryptocurrency transactions, or other information, as described presently. In general, a blockchain may take the form of a distributed readable and writeable computer interpretable data structure, stored in various computers (e.g., nodes) in the blockchain network (e.g., a cryptocurrency network). According to some embodiments, a blockchain may be further constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of a plurality of transactions, a transaction identifier, a transaction amount, and the blockchain address associated with the receiving party (more precisely, associated with the receiving party's public key). According to some embodiments, some participants in the blockchain network may be associated with a cryptographic asymmetric key pair, referred to as the participant's blockchain key pair, including a public key (e.g., usable by the participant to receive cryptocurrency) and a private key (e.g., usable by the participant to send cryptocurrency). According to some embodiments, the public key may be associated with (e.g., usable to derive via cryptographic hash) a value referred to as a blockchain address, and the private key is owned or controlled—and kept secret—by the blockchain network participant. A first blockchain participant may receive cryptocurrency from a second blockchain participant, for example, that utilizes a cryptocurrency blockchain address of the first blockchain participant.

SUMMARY

According to various embodiments, a computer readable medium comprising computer readable instructions for transferring registration of a domain name from a first registrant to a second registrant for cryptocurrency in a blockchain network and in the Domain Name System (DNS) by configuring at least one electronic processor to perform operations is disclosed. The operations include receiving a purchase request message comprising the domain name, at least one purchase parameter, and a second registrant network identifier; and sending a purchase instruction message to an executable program on a blockchain for the blockchain network, the purchase instruction message comprising the domain name and the second registrant network identifier, whereby the executable program writes at least the domain name, the second registrant network identifier, and an identifier of a gaining registrar to a deed contract for the domain name and emits an event representing a request to transfer registration of the domain name.

Various optional features of the above embodiments include the following. The operations may further comprise: detecting the event representing the request to transfer registration of the domain name; extracting at least the domain name and the identifier of the gaining registrar from the deed contract; obtaining, from a losing registrar, data representing authorization to transfer registration of the domain name in the DNS; and sending, to the gaining registrar, and using the data representing authorization to transfer registration of the domain name in the DNS, a request to transfer registration of the domain name to the second registrant. The operations may further comprise: receiving a proof indicating that the gaining registrar is a registrar of record for the domain name, wherein the proof is digitally signed by a private key of a blockchain key pair of a registry for the domain name; and sending the proof to the executable program, whereby the domain name and corresponding cryptocurrency funds are held in escrow until the executable program verifies that the domain name has been transferred in the DNS to the second registrant. The operations may further comprise: receiving a registrar-level proof indicating that the gaining registrar is a registrar of record for the domain name, wherein the registrar-level proof is digitally signed by a private key of a blockchain key pair of the gaining registrar; and sending the registrar-level proof to the executable program. The operations may further comprise: detecting the event representing the request to transfer registration of the domain name; and extracting from the deed contract at least the identifier of the gaining registrar and information identifying the second registrant; and notifying at least one of the gaining registrar, a losing registrar, the registry for the domain name, the second registrant, or the first registrant of the request to transfer ownership of the domain name. The operations may further comprise, prior to the receiving the purchase request message and the sending the purchase instruction message: receiving a for-sale message comprising the domain name and the at least one purchase parameter; and sending a for-sale update request comprising the domain name and the at least one purchase parameter to the executable program, whereby the executable program adds the domain name to a set of domain name registrations for sale. The operations may further comprise, prior to the receiving the purchase request message and the sending the purchase instruction message: receiving a request to identify at least one domain name for sale; sending a request to the executable program to identify the at least one domain name for sale; receiving, from the executable program, an identification of the at least one domain name for sale; and conveying to a sender of the request to identify at least one domain name for sale an identification of the at least one domain name for sale. The receiving the purchase request message and the sending the purchase instruction message may be performed by a wallet of the second registrant. The blockchain may include a transaction indicating that the executable program owns a top-level domain of the domain name. The at least one purchase parameter may include a purchase price.

According to various embodiments, a method of transferring registration of a domain name from a first registrant to a second registrant for cryptocurrency in a blockchain network and in the Domain Name System (DNS) is disclosed. The method includes receiving a purchase request message comprising the domain name, at least one purchase parameter, and a second registrant network identifier; and sending a purchase instruction message to an executable program on a blockchain for the blockchain network, the purchase instruction message comprising the domain name and the second registrant network identifier, whereby the executable program writes at least the domain name, the second registrant network identifier, and an identifier of a gaining registrar to a deed contract for the domain name and emits an event representing a request to transfer registration of the domain name.

Various optional features of the above embodiments include the following. The method may further include detecting the event representing the request to transfer registration of the domain name; extracting at least the domain name and the identifier of the gaining registrar from the deed contract; obtaining, from a losing registrar, data representing authorization to transfer registration of the domain name in the DNS; and sending, to the gaining registrar, and using the data representing authorization to transfer registration of the domain name in the DNS, a request to transfer registration of the domain name to the second registrant. The method may further include: receiving a proof indicating that the gaining registrar is a registrar of record for the domain name, wherein the proof is digitally signed by a private key of a blockchain key pair of a registry for the domain name; and sending the proof to the executable program, whereby the domain name and corresponding cryptocurrency funds are held in escrow until the executable program verifies that the domain name has been transferred in the DNS to the second registrant. The method may further include: receiving a registrar-level proof indicating that the gaining registrar is a registrar of record for the domain name, wherein the registrar-level proof is digitally signed by a private key of a blockchain key pair of the gaining registrar; and sending the registrar-level proof to the executable program. The method may further include: detecting the event representing the request to transfer registration of the domain name; and extracting from the deed contract at least the identifier of the gaining registrar and information identifying the second registrant; and notifying at least one of the gaining registrar, a losing registrar, the registry for the domain name, the second registrant, or the first registrant of the request to transfer ownership of the domain name. The method may further include, prior to the receiving the purchase request message and the sending the purchase instruction message: receiving a for-sale message comprising the domain name and the at least one purchase parameter; and sending a for-sale update request comprising the domain name and the at least one purchase parameter to the executable program, whereby the executable program adds the domain name to a set of domain name registrations for sale. The method may further include, prior to the receiving the purchase request message and the sending the purchase instruction message: receiving a request to identify at least one domain name for sale; sending a request to the executable program to identify the at least one domain name for sale; receiving, from the executable program, an identification of the at least one domain name for sale; and conveying to a sender of the request to identify at least one domain name for sale an identification of the at least one domain name for sale. The receiving the purchase request message and the sending the purchase instruction message may be performed by a wallet of the second registrant. The blockchain may include a transaction indicating that the executable program owns a top-level domain of the domain name. The at least one purchase parameter may include a purchase price.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
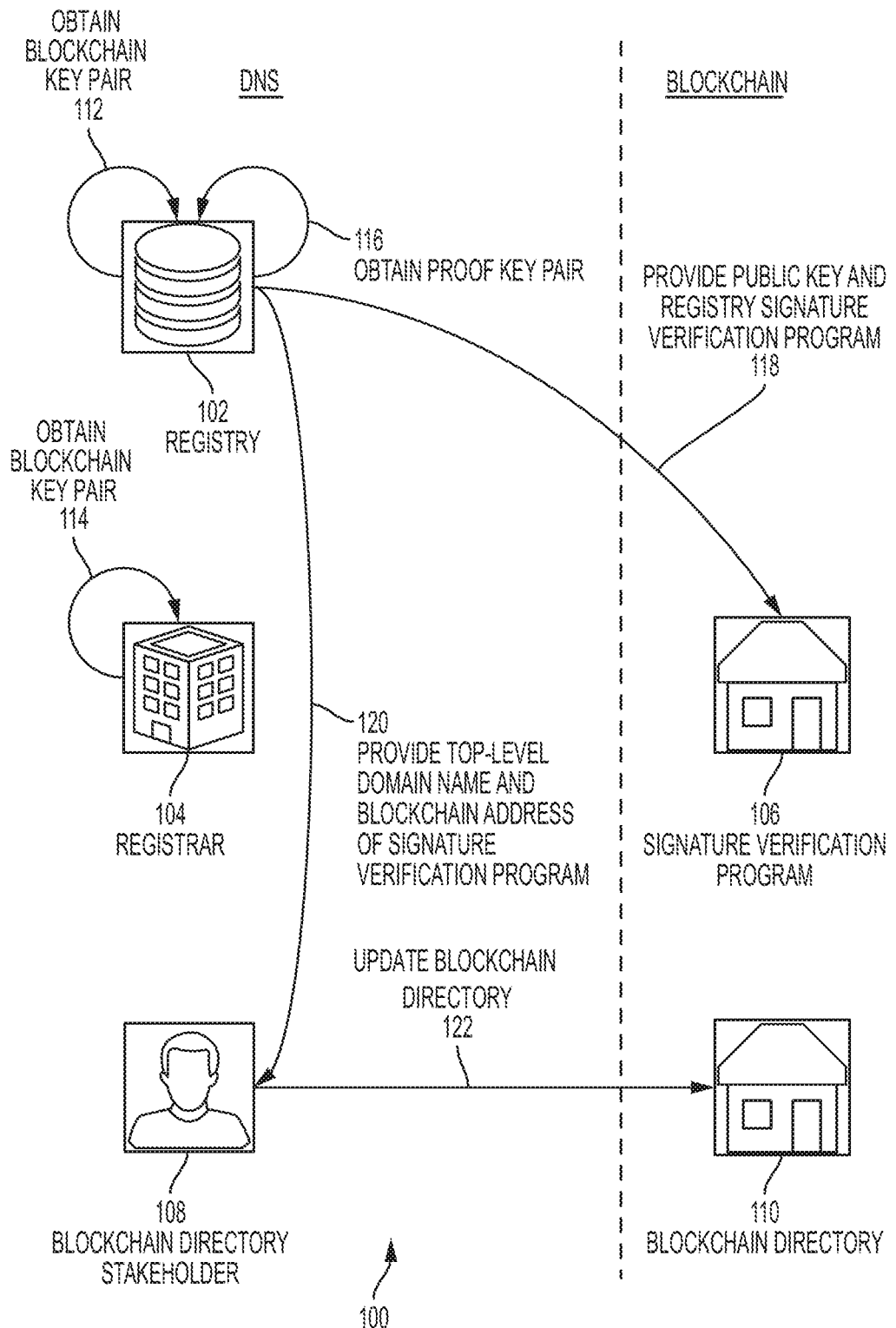
FIG. 1 is a hybrid diagram of a setup method to prepare for assigning a DNS domain name registered to a registrant as a blockchain address in a blockchain network according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

The present disclosure includes two parts. Part A discloses systems for, and methods of, using a domain name as a blockchain address. Part B discloses systems for, and methods of, transferring a domain name on a secondary blockchain market and in the DNS.

Part A: Domain Name Blockchain Addresses

I. Overview

Some embodiments provide the ability to use a domain name registration purchased in the traditional Domain Name System (DNS) environment (e.g. at a registrar) in a blockchain environment. For example, if a registrant registers example.com, the registrant may wish to be able to use it as a blockchain address. This usage enables a human friendly way to interact with others, such as other blockchain participants, by using a domain name as a blockchain address instead of complicated strings of numbers and letters, such as a public key or a hash of a public key. Further, it permits blockchain participants to utilize their web presence, e.g., example.com, as their blockchain presence.

Some embodiments leverage information known by parties in the DNS— such as the registry, registrar, and registrant—to prove domain name registration, which is then utilized by a registrant to securely claim a domain name as their blockchain address. At a high level, some embodiments may include two phases. First, a setup phase creates and/or provisions components in the DNS and blockchain environments. Second, an execution phase occurs where a domain name is pushed from the DNS environment into the blockchain environment, e.g., at the request of the registrant.

Embodiments include many innovations, benefits, and technical advantages. For example, some embodiments establish a direct approach for registrants to utilize their DNS domain names in a blockchain network. To that end, some embodiments insert an executable program, a registry signature verification program, described in detail herein, into the blockchain. According to an embodiment, the registry signature verification program is provided and maintained by a respective registry for the associated top-level domain.

As another example, some embodiments provide a way for the registry signature verification program to verify the claim of domain name registration via a cryptographic asymmetric key system. This verification may ensure that only registry approved domain names can be added to the blockchain. This is advantageous because many blockchains do not allow for external network connections to be established to fetch or retrieve information, e.g., a public key to use for validation purposes. External network connections are prevented because external sources may risk breaking the blockchain nodes' ability to rely on the same information, e.g., an external network may go offline or provide different answers to different nodes which would break the blockchain network's ability to reach consensus. The cryptographic asymmetric key approach resolves this by supplying a public key in such a way that the entire blockchain has access to the public key. For example, in some embodiments, the public key is provisioned during the creation of the registry signature verification program. Therefore, confusion is avoided in the blockchain network about how to validate digitally signed messages, and a consensus can be reached.

As yet another example, some embodiments utilize a registrar of record proof, which may be a digitally signed message, provided by a registry, indicating a registrar of record for a given domain name. Some embodiments establish and utilize an Extensible Provisioning Protocol (EPP) extension or utilize an existing domain object extension and associated commands if such extension and commands provide the disclosed functionality. According to some embodiments, this extension may include a single command, e.g., an INFO command, that accepts as arguments a domain name and a blockchain address. A registry receiving a properly formed (e.g., syntactically correct) INFO command may compare the registrar of record for the domain name as recorded in the registry database with the registrar that is issuing the particular INFO command. If a match between the register of record and the issuing registrar is found, the registry may digitally sign the domain name and blockchain address and pass the digitally signed message back to the requesting registrar. Otherwise, the registry may return an error. This process proves that the registry, which controls all of a top-level domain's domain names, has confirmed that a particular registrar's request is valid.

According to an embodiment, usage of DNS Security (DNSSEC) is not required. According to an embodiment, delegating a domain name into a zone is not required.

These and other features and advantages are described in detail herein.

II. Setup Phase

FIG. 1 is a hybrid diagram of a setup method 100 to prepare for assigning a DNS domain name registered to a registrant as a blockchain address in a blockchain network according to various embodiments. Setup method 100 may be performed to establish and configure the hardware, software, and protocol components used to perform the methods shown and described below in reference to FIGS. 2-5. The left hand side of the diagram depicts the DNS environment, and the right hand side depicts the blockchain environment.

Setup method 100 may begin with registry 102 obtaining 112 a blockchain key pair and registrar 104 obtaining 114 a blockchain key pair. These blockchain key pairs are the registry's 102 and the registrar's 104 blockchain keys, which they may use to perform blockchain transactions. According to an embodiment, registry 102 and registrar 104 may obtain respective blockchain addresses instead of respective blockchain user public keys according to some embodiments. Registry 102 and registrar 104 may obtain their respective blockchain key pairs (or respective private keys and blockchain addresses) by generating them themselves, or by acquiring them from a different entity, such as a certificate authority.

According to some embodiments, registry 102 and registrar 104 obtain their respective key pairs (or respective private keys and blockchain addresses) through the use of, or by acquiring, respective electronic wallets. According to some embodiments, a wallet may be a computer executable software program or application that facilitates interactions with a blockchain network. The wallet may execute on a user device such as a personal computer or a smart phone. The wallet may be used in cryptocurrency blockchain networks to facilitate the sending and receiving of cryptocurrency with other participants in the network. A wallet may have built in user-callable functionality to generate blockchain key pairs (or private keys and blockchain addresses) and send and receive cryptocurrency. The wallet, as contemplated herein, may have additional functionality as described further herein.

After registry 102 and registrar 104 have obtained their respective key pairs, according to setup method 100, registry 102 may add support for a registrar of record proof. The registrar of record proof may be used to prove that a given registrar is the registrar of record for a particular specified domain, i.e., that a registrant used the particular registrar that requests the registrar of record proof to register their domain name. To support such an EPP extension, registry 102 may utilize facilities of EPP and eXtensible Markup Language (XML) to configure its existing EPP interface to handle registrar of record proof requests—using either a new or and existing domain object extension and associated commands. Further, registry 102 may obtain 116 (e.g., generate) a new cryptographic asymmetric key pair, referred to herein as the proof key pair, of which the private key is used to digitally sign the registrar of record proofs. The public key of the proof key pair may be used by registrars to verify that proofs responsive to their registrar of record proof requests came from the exact registry 102 to which they sent the request and have not been altered, e.g., by a man-in-the-middle attack.

In use, once registry 102 establishes registrar of record proof support, e.g., via an EPP extension, a registrar, e.g., registrar 104, may request such a proof from registry 102. The request may be formatted using XML according to EPP convention, for example. The request may include a domain name and possibly additional information such as a blockchain address as described further below in reference to FIGS. 2-5. The request itself may include information identifying the originating registrar, such as the Internet Protocol (IP) address of the registrar. To respond to the request, registry 102 first checks whether the registrar that sent the request is the registrar of record for the domain name supplied in the request according to its records. If the registrar that sent the request is not the registrar of record for the domain name supplied in the request, then registry 102 may return an error message. If the registrar that sent the request is the registrar of record for the domain name supplied in the request, then registry 102 returns a registrar of record proof message as described above, containing the domain name and other information provided by the requester (e.g., a blockchain address) that it has digitally signed using the private key from its proof key pair obtained 116 previously.

According to some embodiments, the registrar of record proof may have an expiration attached to it by the registry. This may ensure a replay attack is prevented, e.g. to prevent a previous registrant from claiming the domain name too far into the future when they may have transferred the domain to a different registrant. The time limit is a matter of registry policy, and may be on the order of one, two, three, or more days, or coextensive with the expiration of the domain name's registration.

An implied trust may exist between registry 102 and registrar 104. The registrar of record proof asserts that a specified domain name is managed by a particular registrar. Registry 102 relies on registrar 104 to only act explicitly on behalf of a valid registrant. If registrar 104 is found to be acting negligently, e.g., by claiming names on a blockchain for themselves, then it is likely that the registrar would be punished and/or suffer reputational risk. This threat of punishment and/or reputational risk deters bad or negligent acting by registrar 104.

Next, according to setup method 100, registry 102 provides 118 a computer executable registry signature verification program 106 to the blockchain network for inclusion in a block in the blockchain. Registry signature verification program 106 may be in the form of a blockchain smart contract according to some embodiments. According to some embodiments, a smart contract is an executable program stored on the blockchain. According to some embodiments, a smart contract executes at least whenever a blockchain transaction is mined. Registry 102 includes a copy of the public key of its proof key pair in the registry signature verification program. In operation, registry signature verification program 106 performs a registry signature verification algorithm defined by its computer executable code. The registry signature verification algorithm may accept as input data that includes at least a digital signature, determine whether the digital signature is valid using the public key, and output a response indicating whether or not the digital signature is valid.

| Example Registry Signature Verification Algorithm |
| --- |
| (1) Input: message that includes digital signature;<br>(2) Apply public key of proof key pair to digital signature under control of decryption algorithm;<br>(3) Check whether message body (or hash of message body, depending on scheme) is identical to the result of (2) above;<br>(4) Output: results of determination at step 3. |

The registry signature verification program 106 on the blockchain serves as the entry point to claim a domain name that is already provisioned in the DNS environment. Once a node in the blockchain adds registry signature verification program 106 to a block in the blockchain per the request of registry 102, registry 102 receives back an blockchain address indicating where the registry signature verification program 106 is stored in the blockchain. This blockchain address indicates the location of the registry signature verification program 106.

Next, according to setup method 100, some embodiments account for blockchain networks that have existing name services as follows. Some blockchain networks permit participants to use names having particular specified formats (but not arbitrary domain names) as their blockchain addresses. Such associations may be held in a blockchain directory, such as blockchain directory 110. Blockchain directory 110 keeps track of which blockchain addresses have ownership over which names in the blockchain network, that is, the assignments of names to blockchain participants. According to some embodiments, blockchain directory 110 may be embodied by, or utilizes, a non-transitory computer executable blockchain name services program stored in a block of the blockchain. According to such embodiments, the blockchain name services program is a smart contract. In operation, the blockchain name services program may accept as input a command to assign a name to a specified blockchain address, along with a specified name, and may store a record of such assignment upon processing such command. Alternately, or in addition, blockchain directory 110 may include or utilize a table of associations between names and blockchain addresses.

For embodiments in which the blockchain network does not include an existing name services framework, such a framework may be added to handle domain names assigned as blockchain addresses per some embodiments. The added framework may include a blockchain name services program as described herein and/or a blockchain directory such as blockchain directory 110.

Thus, according to some embodiments, to account for blockchain networks that have existing name services, registry 102 provides the top-level domain names(s) over which it has registration authority (e.g., the extensions dot com, dot net, dot edu, etc.), along with the blockchain address of the registry signature verification program 106, to the blockchain directory stakeholder 108 (e.g., owner or manager). Blockchain directory stakeholder 108 may then update 122 blockchain directory 110 with the provided information, that is, with information indicating that the top-level domain names are owned, according to blockchain directory 110, by registry signature verification program 106. That is, blockchain directory stakeholder 108 may perform such an update 122 by passing the top-level domain names(s) over which it has registration authority and the blockchain address of the registry signature verification program 106 to the name services program, which updates a record of the assignment.

Alternately, according to some embodiments, to account for blockchain networks that have existing name services, instead of the providing 120 and the updating 122 described above, registry 102 may submit to the blockchain network for inclusion in the blockchain a message that includes the top-level domain name(s) (e.g., dot com, dot net, dot edu, etc.) for which registration is handled by registry 102 and the blockchain address of the signature verification program 106, digitally signed by the private key of the blockchain key pair of registry 102. The message may be submitted to the blockchain network for inclusion in a block to indicate that registry 102 has conveyed ownership of the top-level domain name to the registry proof verification program at the provided blockchain address, at least for purposes of assigning domain names under the top-level domain name as blockchain addresses in the blockchain network.

Finally, according to setup method 100, registrar 104 (alternately, a service provider) may add functionality to their website or service to enable domain name registrants to sign in and request a domain name be assigned as their blockchain address. This may include adding, or reconfiguring an existing, user interface and adding functionality for obtaining registrar of record proofs from registry 102, and may also include functionality for registrar 104 to submit the registrar of record proof to the blockchain.

According to an embodiment, the service providers considered herein may be trusted by some or all interested parties, e.g., by providing cryptographic services. As disclosed herein, a user (e.g., domain name registrant) can take actions through any of a variety of trust chains. For example, the user may act through the registrar or registry, which may make changes to the blockchain. Alternately, the user may act through a trusted service provider, e.g., a third party trusted service provider, which may make changes to the blockchain directly, through a registry, through a registrar, or through a registrant, which takes actions through the associated registry. In sum, service providers may be trusted to interact with many different entities on behalf of a registrant.

III. Execution Phase

Figure 2:
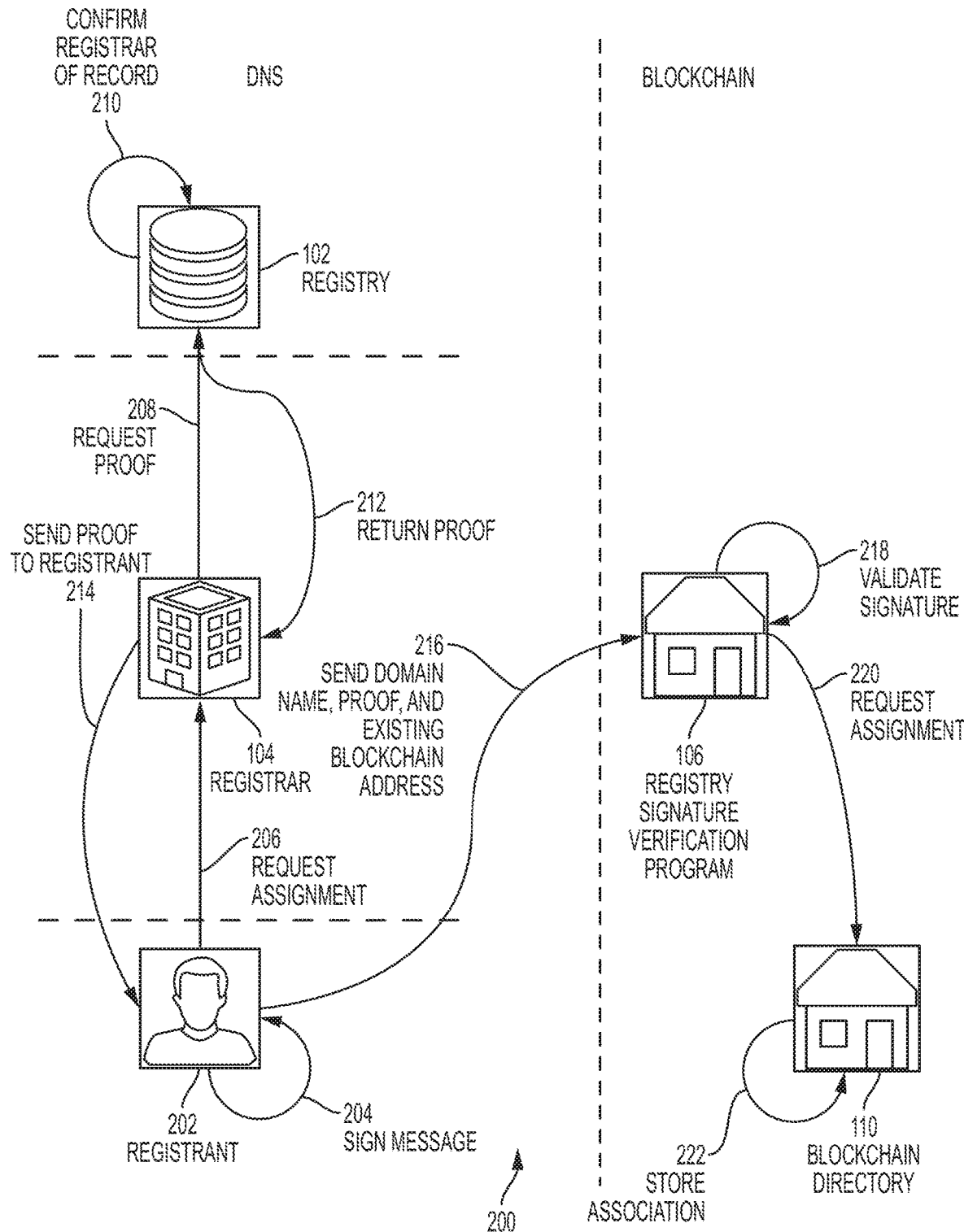
FIG. 2 is a hybrid diagram of a registrant facilitated method for assigning a DNS domain name registered to a registrant as a blockchain address in a blockchain network according to various embodiments.

FIG. 2 is a hybrid diagram of a registrant facilitated method 200 for assigning a DNS domain name registered to registrant 202 as a blockchain address in a blockchain network according to various embodiments. For convenience, method 200 is described in reference to the same registry 102, registrar 104, registry signature verification program 106, and blockchain directory 110 as described above in reference to FIG. 1. Method 200 may be initiated by a registrant, such as registrant 202. The actions performed by registrant 202 in method 200 may be performed through or by the registrant's wallet according to some embodiments.

Method 200 may include, according to some embodiments, a process of registrant 202 digitally signing 204 their existing, e.g., numeric or alphanumeric, blockchain address using their blockchain private key to create a proof of blockchain address ownership. This process may be accomplished any time prior to registrant 202 requesting 206 assignment of a domain name to their existing blockchain address. Later, the proof of blockchain address ownership may be passed to registrar 104 to be validated, once registrar 104 receives a message from registrant 202 specifying a domain name and existing blockchain address and requesting 206 assignment of the specified domain name as the user's specified existing blockchain address. To validate the proof of blockchain address ownership at that point, registry 102 may verify the digital signature using the public key of the user's blockchain key pair and check whether the specified blockchain address in the message matches the blockchain address that is signed in the proof.

The domain name assignment method 200 may be initiated by registrant 202 by requesting 206 assignment of a specified domain name that is registered to registrant 202 and, for method 200 according to some embodiments, a blockchain address to which to assign the domain name. Registrant 202 may send a request message with this data to registrar 104. The message may also include the proof of blockchain address ownership and/or an identification of the particular blockchain, e.g., in embodiments that provide method 200 for multiple blockchains. According to some embodiments, registrant 202 initiates the process through a webpage interface provided by registrar 104.

Next, per method 200, registrar 104 requests 208 a registrar of record proof from registry 102. The request may include, for example, the domain name and blockchain address specified by registrant 202.

Next, per method 200, registry 102 confirms 210 that the registrar that sent the request is the registrar of record for the provided domain name, e.g., using the originating IP address of the request, to identify the requesting registrar. Registry 102 may check the IP address (or other registrar identifier, such as a name) against its stored registrar records. If a registrar of record match is found, then method 200 proceeds to the next step in the process; otherwise, the process may halt at this stage, possibly after registry 102 returns an error message to registrar 104, which returns a like error message to registrant 202.

Next, per method 200, registry 102 returns 212 a registrar of record proof digitally signed with the private key of the proof key pair obtained 116 during the setup phase shown and described above in reference to FIG. 1. The registrar of record proof may include <domain name> in the registrar of record proof's body along with a digital signature on <domain name>. According to some embodiments, the registrar of record proof may include the pair <domain name, blockchain address> in the registrar of record proof's body along with a digital signature on <domain name, blockchain address>. The registrar of record proof is used later by registry signature verification program 106 to verify that the <domain name, blockchain address> combination is valid and that assignment of the domain name should be given to the blockchain address.

Next, per method 200, registrar 104 sends 214 the registrar of record proof to registrant 202 per registrant facilitated embodiments as presented herein.

Per method 200, registrant 202 receives the registrar of record proof and forms a message containing the registrar of record proof, the domain name, and the blockchain address. Registrant 202 may send 216 the message to registry signature verification program 106. This may be accomplished by the registrant's wallet without requiring further involvement by the user.

Next, per method 200, registry signature verification program 106 may validate 218 the registry's digital signature on the registrar of record proof received from registrant 202 using the public key of the proof key pair provisioned during the setup phase. If not valid, then the process may halt, possibly with an error message conveyed from registry signature verification program 106 back to registrant 202 and/or registrar 104. Otherwise, method 200 proceeds as follows.

Next, per method 200, registry signature verification program 200 may request 220 assignment of the domain name as the registrant's blockchain address by sending a message to blockchain directory 110. In embodiments where blockchain directory 110 includes an executable program such as a smart contract, the message may be in the form of a command to assign the domain name as registrant's new blockchain address. According to such embodiments, the command may specify the domain name and the existing blockchain address of registrant 202.

Next, per method 200, blockchain directory 110 may store 222 an association between the domain name and the blockchain address. Such an association may be stored in a table, for example.

According to registrant facilitated method 200, registrant 202 may send the registrar of record proof, domain name, and existing blockchain address to registry signature verification program 106. However, according to alternate embodiments, these data may instead be conveyed to registry signature verification program 106 by registry 102 or registrar 104. In general, the conveyance can be done by any entity, such as a trusted service provider, that may have access to the data. Registry signature verification program 106 does not require that the message come from any particular source. Thus, according to embodiments, FIG. 3 depicts a registrar facilitated method 300, and FIG. 4 depicts a registry facilitated method 400.

Figure 3:
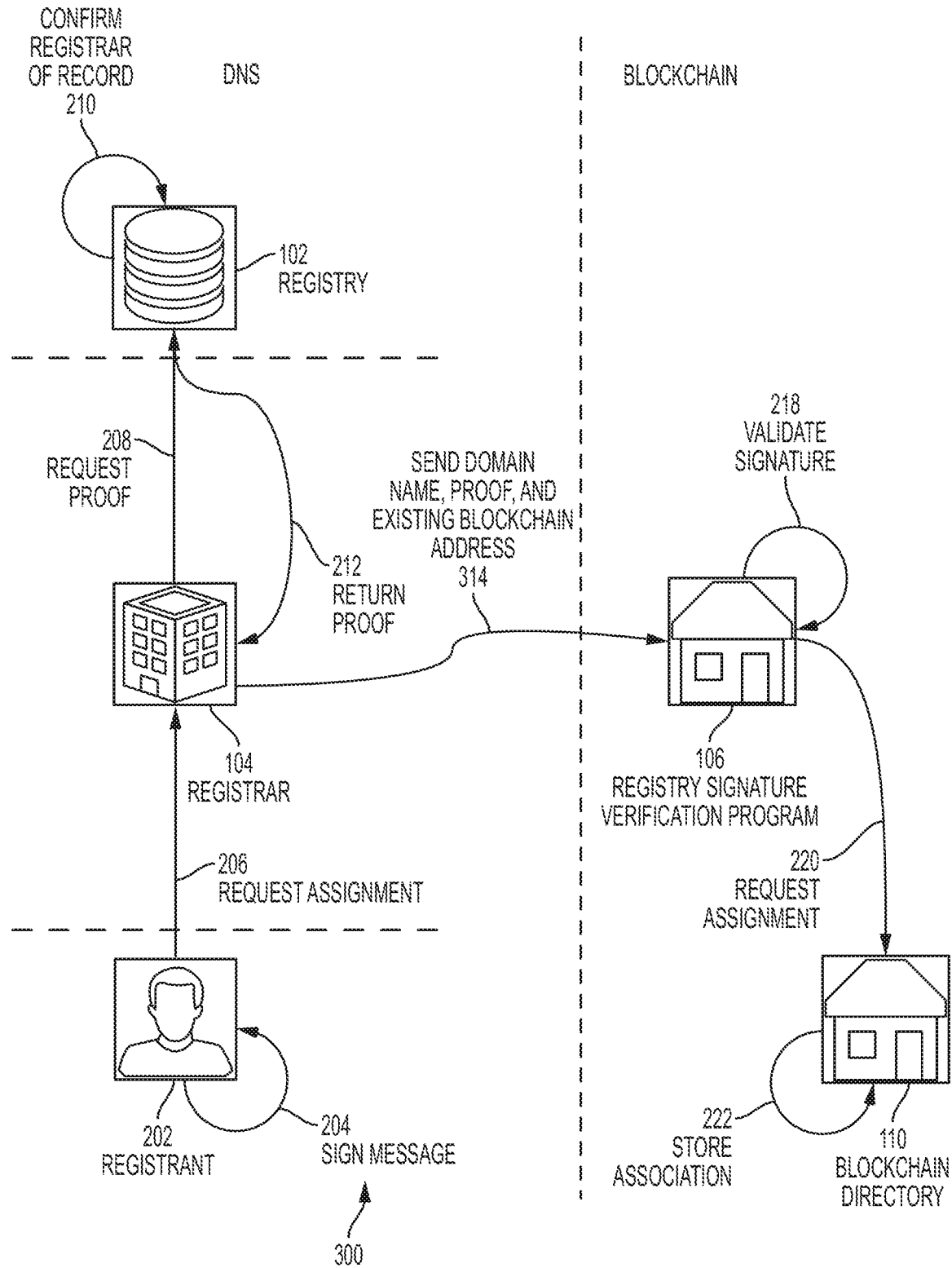
FIG. 3 is a hybrid diagram of a registrar facilitated method for assigning a DNS domain name registered to a registrant as a blockchain address in a blockchain network according to various embodiments.
Figure 4:
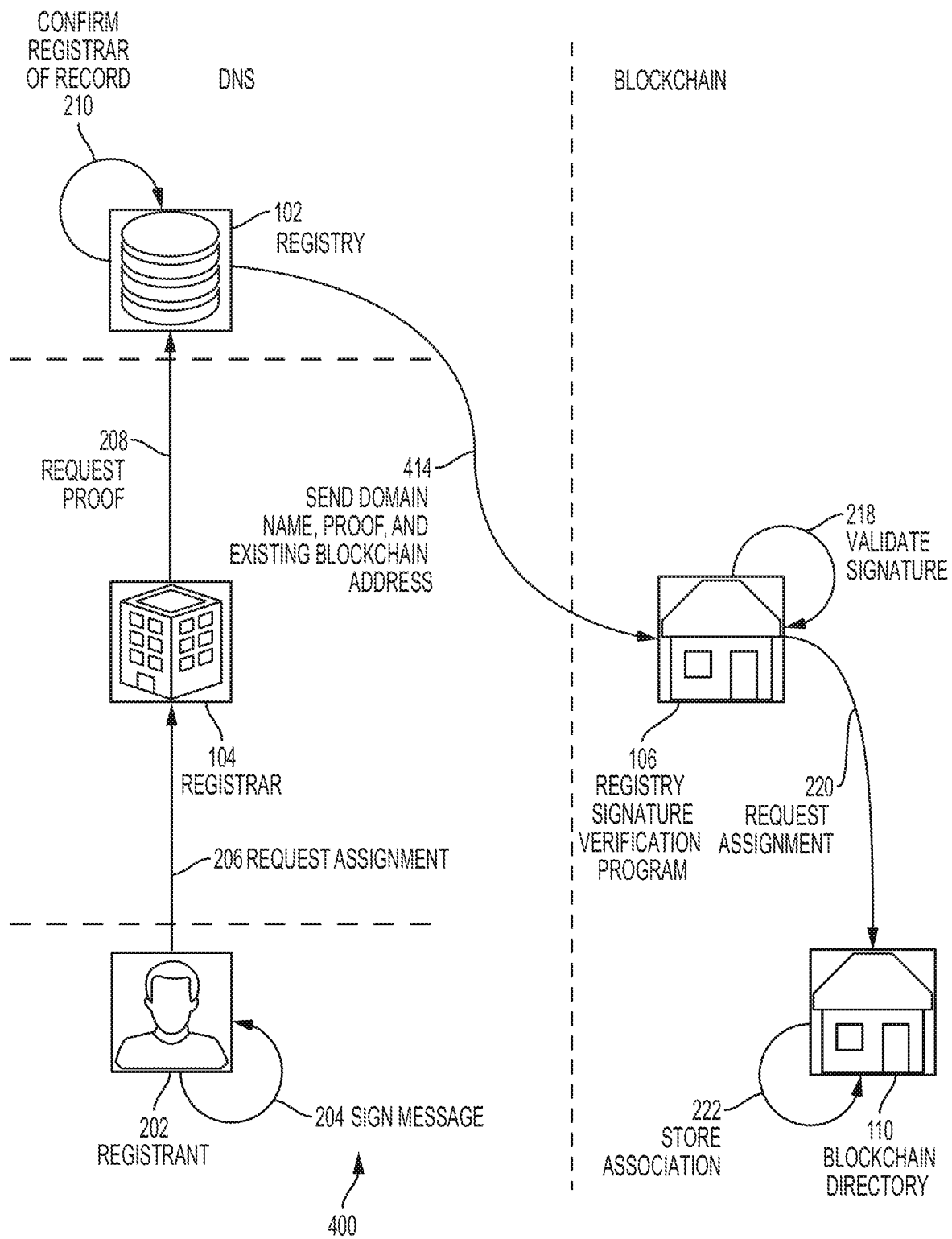
FIG. 4 is a hybrid diagram of a registry facilitated method for assigning a DNS domain name registered to a registrant as a blockchain address in a blockchain network according to various embodiments.

FIG. 3 is a hybrid diagram of a registrar facilitated method 300 for assigning a DNS domain name registered to registrant 202 as a blockchain address in a blockchain network according to various embodiments. The entities and steps depicted in the hybrid diagram that share identifying numerals with the entities and actions depicted in the hybrid diagram of FIG. 2 are described in detail above in reference to FIG. 2. Further, method 300 is essentially identical or similar to method 200 up to the point at which registry 102 returns 212 the registrar of record proof to registrar 104, except that registrant 202 includes their existing blockchain address in the request 206 assignment message, which inclusion is optional in method 200. Therefore, description of method 300 proceeds by describing the features that are unique to method 300.

Once registrar 104 receives the registrar of record proof returned 212 from registry 102, instead of sending 214 the registrar of record proof to registrant 202 as per method 200, registrar 104 forms a message and sends 314 it to registry signature verification program 106. In particular, registrar 104 forms a message that includes the registrar of record proof, the domain name, and the blockchain address.

The remaining steps of method 300 are as described above in reference to method 200 of FIG. 2.

FIG. 4 is a hybrid diagram of a registry facilitated method 400 for assigning a DNS domain name registered to a registrant 202 as a blockchain address in a blockchain network according to various embodiments. Like the hybrid diagram of FIG. 3, the entities and steps depicted in the hybrid diagram of FIG. 4 that share identifying numerals with the entities and steps depicted in the hybrid diagram of FIG. 2 are described in detail above in reference to FIG. 2. Further, method 400 is essentially identical or similar to method 200 up to the point at which registry 102 confirms 210 the registrar of record, except that, as in method 300, per method 400, registrant 202 also includes their existing blockchain address in the request 206 assignment message. Therefore, description of method 400 proceeds by describing the features that are unique to method 400.

Per method 400, after registry 102 confirms 210 the registrar of record, instead of returning 212 the registrar of record proof to registrar 104 as per methods 200 and 300, registry 102 may form a message and send 414 it to registry signature verification program 106. In particular, registry 102 may form a message that includes, for example, the registrar of record proof, the domain name, and the blockchain address.

The remaining steps of method 400 are as described above in reference to method 200 of FIG. 2.

Figure 5:
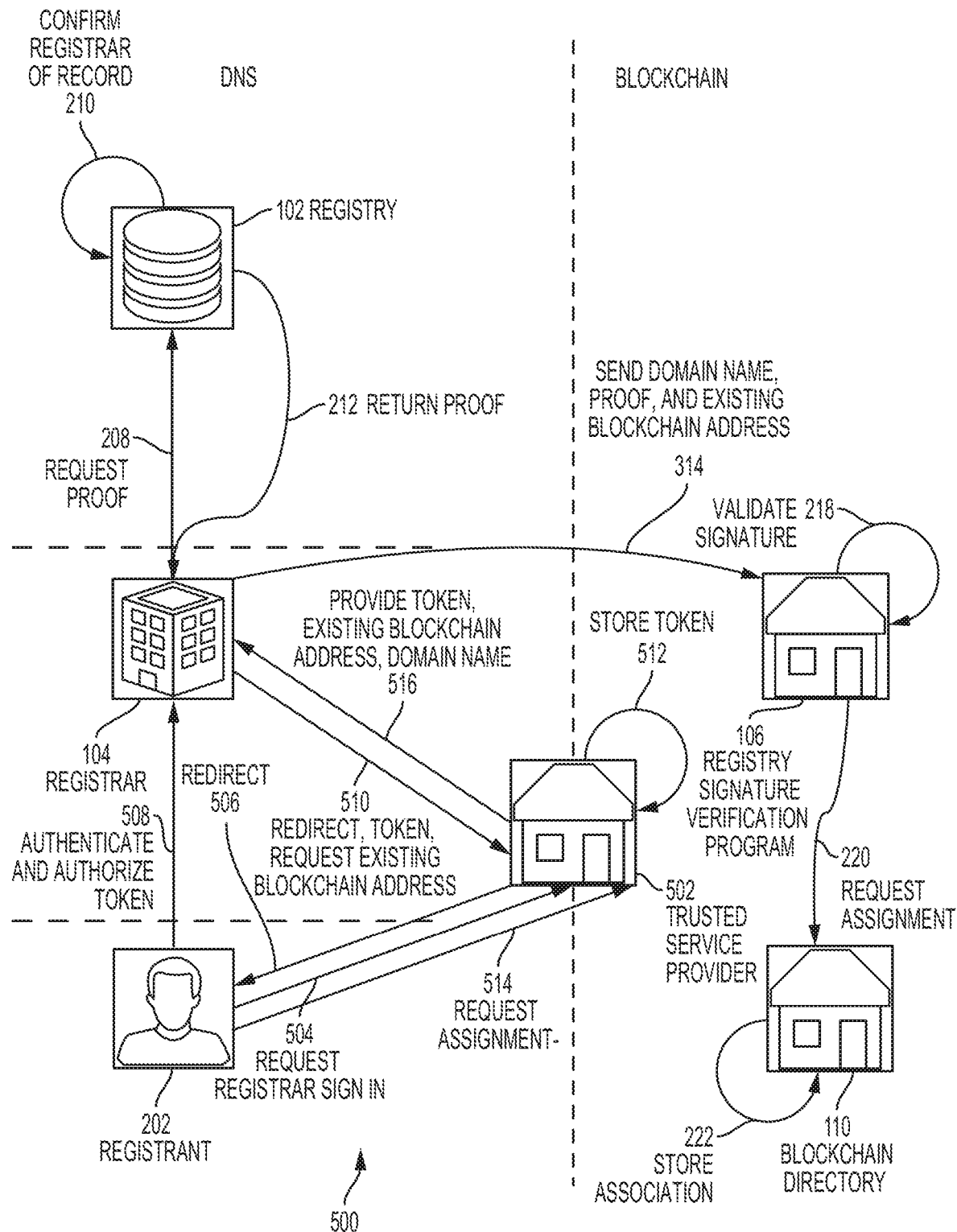
FIG. 5 is a hybrid diagram of a trusted service provider facilitated method for assigning a DNS domain name registered to a registrant as a blockchain address in a blockchain network according to various embodiments.

FIG. 5 is a hybrid diagram of a trusted service provider 502 facilitated method 500 for assigning a DNS domain name registered to a registrant as a blockchain address in a blockchain network according to various embodiments. The trusted service provider 502 may be, for example, a DNS operator, a website hosting provider, a resolver, or a different type of service provider. Method 500 also involves registry 102, registrar 104, registry signature verification program 106, and blockchain directory 110, as described above in reference to FIGS. 1 and 2. Method 500 may be initiated by a registrant such as registrant 202. Some or all of the actions performed by registrant 202 in method 500 may be performed through or by the registrant's wallet according to some embodiments. According to other embodiments, the communications between registrant 202 and trusted service provider 502 may be performed through a web-based user interface provided by trusted service provider 502, which registrant 202 interacts with through a browser executing on registrant's client computer. In contrast to embodiments of methods 200, 300, and 400, method 500 utilizes an authorization token, as explained presently.

Method 500 may begin with registrant 202 requesting 504 that trusted service provider 502 sign in to, or otherwise authenticate with, registrar 104. (As with other embodiments described herein, registrar 104 is the registrar of record of the domain name registered to registrant 202.) In response, trusted service provider 502 redirects 506 the registrant's browser to registrar 104, more particularly, to an authentication or sign in web page of registrar 104.

Next, per method 500, registrant 202 may sign in to, or otherwise authenticate 508 with, registrar 104. If registrant 202 does not already have an existing account with registrar 104, an account may be established by registrant 202 at this point before proceeding. The signing in (or authenticating) may include, for example, registrant 202 providing a user name and a password for their account with registrar 104. Further, registrant 202 may authorize 508 registrar 104 to generate an access token for use by trusted service provider 502 to facilitate the blockchain user name assignment. The access token may be, for example, an Open Authorization (OAuth) access token according to some embodiments.

Next, per method 500, trusted service provider 502 redirects 510 the registrant's browser back to trusted service provider 502, and also passes it the access token. Further, registrar 104 may request the existing blockchain address of registrant 202 at this stage. According to an embodiment, trusted service provider 502 may store 512 the access token for future usage.

Either at this point in method 500, or previously in method 500, registrant 202 may request 514 that their registered domain name be assigned as their new blockchain address. The request may include, for example, the existing blockchain address of registrant 202, or registrant 202 may have previously provided that information to trusted service provider 502.

Once trusted service provider 502 has the access token and the existing blockchain address of registrant 202, and registrant 202 has requested the assignment, trusted service provider 502 provides 516 the access token, the existing blockchain address of registrant 202, and the domain name to registrar 104.

At this point in method 500, the remaining steps are similar to those of method 300 as shown and described above in reference to FIG. 3.

Figure 6:
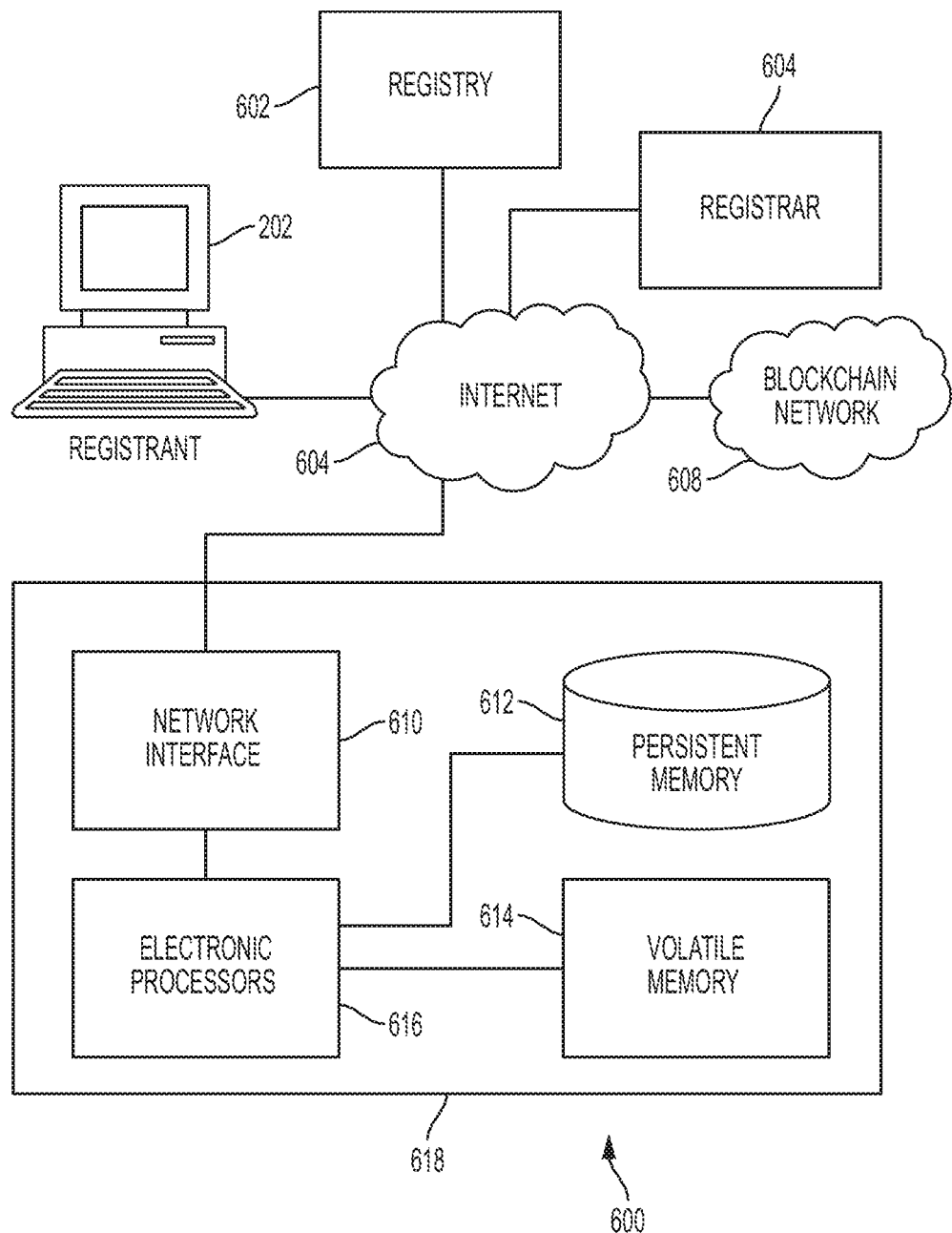
FIG. 6 is a schematic diagram of a system including a server computer according to various embodiments.

FIG. 6 is a schematic diagram of a system 600 including server computer 618 according to various embodiments. System 600 includes, for example, registrant 202 (identified with their computer), DNS registry 602, DNS registrar 604, and server computer 618, all communicatively coupled to the internet 604. System 600 may also include blockchain network 608, which itself may include a plurality of networked nodes, which themselves may be networked through the internet 604. Server computer 618 may be, for example, a server computer of registry 102, registrar 104, or trusted service provider 502, according to various embodiments. Registry 602 may be registry 102, and/or registrar 604 may be registrar 104, consistent with server computer 618 being either registry 102 or registrar 104, according to various embodiments. That is, FIG. 6 is intended to display the various components networked together, as well as the internal workings of a server computer consistent with the various, e.g., registry and registrar, servers disclosed herein.

Server computer 618 may include network interface 610 to communicatively couple to the internet 604. Network interface 610 may include a physical network interface, such as a network adapter. Server computer 618 may be a special-purpose computer, adapted for reliability and high-bandwidth communications. Thus, server computer 618 may be embodied in a cluster of individual hardware server computers, for example. Alternately, or in addition, server computer 618 may include redundant power supplies. Persistent memory 612 may be in a Redundant Array of Inexpensive Disk drives (RAID) configuration for added reliability, and volatile memory 614 may be or include Error-Correcting Code (ECC) memory hardware devices. Server computer 618 further includes one or more electronic processors 616, which may be multi-core processors suitable for handling large amounts of information. Electronic processors 616 are communicatively coupled to persistent memory 612, and may execute instructions stored thereon to at least partially effectuate the techniques, functions, and operations disclosed herein, e.g., method 100 as shown and described above in reference to FIG. 1, method 200 as shown and described in reference to FIG. 2, method 300 as shown and described in reference to FIG. 3, method 400 as shown and described in reference to FIG. 4, method 500 as shown and described in reference to FIG. 5, any variation, modification, or alternate methods as described in the following section, as well as method 700 of FIG. 7, method 800 of FIG. 8, method 900 of FIG. 9, method 1000 of FIG. 10, method 1100 of FIG. 11, method 1200 of FIG. 12, method 1600 of FIG. 16, method 1700 of FIG. 17, and any combinations or variations as disclosed in Part E. Electronic processors 616 are also communicatively coupled to volatile memory 614.

IV. Variations, Modifications, and Alternate Embodiments

Many variations on the disclosed embodiments are possible. Some example variations and modifications are presented below.

a. Higher Level Domain Names

Some embodiments permit assigning domain names that include second-level (and higher-level) domain names as blockchain addresses in a blockchain network. For example, an entity may register the domain name example.com. As such, the entity has implicitly registered any domain names that include second or higher level domain names under the domain name example.com. Thus, the same entity may control then entire name space under example.com, which includes first.example.com, big.example.com, purple.example.com, etc. Such an entity may use method 100 and any of methods 200, 300, 400, or 500, in the stead of registrant 202, to assign domain names that include second or higher level domain names under example.com as blockchain addresses for anyone, not limited to the entity themselves. Thus, the entity that registered example.com may have a web-based business that provides blockchain name assignments to its customers. The entity, rather than its customers, may receive a customer's existing blockchain address and proceed to use any of methods 200, 300, 400, or 500 to assign a domain name that includes a second or higher level domain name under example.com to the customer. Either the entity or the customer may choose the second level (and/or higher) domain name. Note that because the entity has registered example.com, it can ensure that the registrar of record proof procedure described herein is accomplished in order to assign such subdomain names. The usage of higher-level domain names as disclosed here is elaborated upon in Part C, below.

b. Registrant Confirmation Via Wallet

Some embodiments await confirmation from the registrant prior to finalizing the assignment of a domain name as a blockchain address. Any of the disclosed embodiments may implement this variation. For purposes of description rather than limitation, an example embodiment is described relative to method 400 of FIG. 4, with the differences disclosed and explained presently. In such embodiments, the optional step of registrant 202 digitally signing 204 their existing blockchain address using their blockchain private key to create a proof of blockchain address ownership may be omitted. Once registry signature verification program 106 receives the domain name, registrar of record proof, and existing blockchain address sent 414 from registry 102, and once registry signature verification program 106 validates 218 the digital signature on the registrar of record proof, it stores a holding record in the blockchain, where the holding record may include, or include references to, the domain name at issue and the registrant's existing blockchain address. In such embodiments, registry signature verification program 106 awaits confirmation to assign the domain name from registrant 202 before proceeding to request 220 assignment from blockchain directory 110. Registrant 202 may provide such confirmation through the registrant's wallet.

In more detail, the electronic wallet may include functionality that detects whether registrant 202 confirmation is required and permits registrant 202 to send such a confirmation to registry signature verification program 106. To detect the registrant 202 confirmation requirement, the wallet may interact with the blockchain, and/or with registry signature verification program 106 to retrieve any pending holding records relevant to registrant 202. The wallet may use the detection of any retrieved holding records that match the existing blockchain address, or registered domain name, of registrant 202, as an initiation to prompt registrant 202 for confirmation. For example, the wallet may display a virtual button labeled using information from the holding record, e.g., "Claim domain name example.com as your blockchain address instead of 0x987 . . . ?", where the actual blockchain address may be presented. Upon registrant 202 providing confirmation via their wallet to registry signature verification program 106, it proceeds to request 220 assignment of the domain name as the blockchain address of registrant 202.

Embodiments that utilize registrant confirmation may thwart or prevent registrant 202 from assigning their domain name as a blockchain address for another blockchain network participant.

c. Registrant Confirmation Via Voiceprint

According to some embodiments, registry 102 and/or registrar 104 may store voiceprints of some or all contacts attached to a domain name. In general, domain name registration involves providing, for example, the registrant's contact information to the registrar of record, which passes it to the respective registry. In some embodiments, the registration process may include the step of some (or all) contacts for the domain name providing voiceprints to the registrar. Such a voice print may be of a contact, such as registrar 202, saying the domain name itself. Registrar 104 may store and pass the received voiceprint(s) to registry 102 for storage. Registry 102 may set up and implement an EPP extension for the purpose of accepting and storing voiceprints via its EPP interface.

Embodiments may utilize the stored voiceprints as follows. Registrar 104 may provide non-transitory computer executable code to manufacturers, supporting companies, or distributers of consumer voice-based computers that facilitates registrant 202 requesting 206 assignment of a domain name for a blockchain address audibly. Such consumer voice-based computers may be associated with, or provided by, a social network or an e-commerce business, for example. An example of such a consumer voice-based computer is a voice-based digital assistant. The code may be installed on such voice-based computers and, when executed, configure such computers to receive and process audible requests to request 206 assignment. An example, non-limiting format for such requests is, "computer, assign my domain name example.com as my blockchain address in blockchain X in place of blockchain address 0x987 . . . ". When a properly configured consumer voice-based computer receives such an audio command, it may proceed to form and send a request to registrar 104 as disclosed above in reference to methods 200, 300, 400, and 500. However, the request may further include, or be preceded or followed by, a request that includes the voiceprint of registrant 202, e.g., the portion of the voiceprint representing the audible domain name itself. Registrar 104 may receive the request and process it as disclosed in reference to methods 200, 300, 400, and 500, after it has successfully verified a match between the received voiceprint and a stored voiceprint. The matching process may be a probabilistic matching process that outputs a probability of a match, and the method may proceed if the output probability exceeds a predetermined or preset threshold, e.g., at least a 95% probability of a match.

According to some embodiments, instead of registrar 104 detecting a voiceprint match, registrar 104 instead passes the received voiceprint to registry 102, which performs the verification of the match between the received voiceprint and a stored voiceprint, and provides the results back to registrar 104. In such embodiments, the remainder of the steps are similar or essentially identical to those of methods 200, 300, 400, and 500 once registry 102 has verified the voiceprint match.

d. Other Identifiers as Blockchain Addresses

Some embodiments assign an identifier other than a domain name as a blockchain address in a blockchain network. Examples of such identifiers include, but are not limited to, telephone numbers and email addresses. Such embodiments differ from the embodiments disclosed herein in Sections II and III as follows. The identifier holder, e.g., the telephone number owner or email address user, takes the place of registrant 202. The entity that provides the identifier, e.g., a phone company for a telephone number or an email provider for an email identifier, takes the place of registry 102. A facilitating company may take the place of registrar 104. The facilitating company may have or may establish a communication channel with the entity that provides the identifier, e.g., the entity that provides the identifier has an internet-based interface or API.

For the setup phase of such embodiments, method 100 proceeds as disclosed above in Section II, except that the entity that provides the identifier performs the actions of registry 102, and the facilitating company performs the actions of registrar 104. Instead of registry 102 adding support for a registrar of record proof EPP extension, the entity that provides the identifier provides support for responding to requests 208 for registrar of record proof sent by the facilitating company. The requests may be sent through the communication channel between the entity that provides the identifier and the facilitating company. In such embodiments, the entity that provides the identifier obtains and utilizes a proof key pair as disclosed above in Section III. The registry signature verification program 106 may be configured to verify the digital signatures by the entity that provides the identifier, rather than digital signatures by registry 102. The digital signatures may be on data that specifies an identifier such as a phone number or email address and an existing blockchain address, instead of on data that specifies a domain name and an existing blockchain address.

For the execution phase of such embodiments, the entity that provides the identifier performs the actions of registry 102, and the facilitating company performs the actions of registrar 104. Any of methods 200, 300, 400, or 500 may be altered as described presently. The identifier holder, instead of registrant 202, requests 206 assignment of their identifier as a blockchain address. The facilitating company receives the request and requests 208 proof from the entity that provides the identifier. The remaining flow is as described above in Section II for any of methods 200, 300, 400, or 500, mutatis mutandis.

According to some embodiments, the facilitating company may be merged with the entity that provides the identifier. In such embodiments, the entity that provides the identifier may establish an interface that performs the analogous actions of registrar 104. Further, the request 208 for proof may be performed essentially in-house, that is, in a dual facilitating company and entity that provides the identifier. Such embodiments perform as described herein, except that communications 208, 210, and 212 are performed by different portions of the same entity, rather than by different entities.

Embodiments disclosed in this subsection may have the added benefit of enabling secure two-factor identification by consulting the blockchain for a given blockchain network participant's blockchain address to fetch additional factors for use to verify their identity. For example, if a given blockchain address on a blockchain has an attached phone number or email address, those could be consulted on chain as a source to send a message to, to confirm proof of blockchain address ownership.

Further, embodiments disclosed in this subsection may be particularly beneficial to payment providers and their users. According to some embodiments, a payment provider may be a non-bank entity that provides customer accounts to customers that permit such customers to send to and receive payment from other customers using customer identifiers. For example, a payment provider may enable its customers to send and receive money amongst themselves by specifying domain names and currently amounts. In particular, a first customer may log into a payment provider webpage interface by providing a domain name and password, then provide to the interface a domain name of a second customer, as well as a US dollar amount, along with instructions to pay, and the payment provider may respond to such instruction by moving currency between customer accounts as instructed. According to embodiments described in this subsection, a payment provider may assign an existing payment provider identifier (e.g., domain name) as blockchain address. In this way, a payment provider customer may broadcast, publish, or otherwise make known a central payment identifier, e.g., their domain name, along with instructions that the customer may receive payment through such identifier either by way of the standard techniques of the payment provider, or via cryptocurrency using a cryptocurrency blockchain network using the same identifier, e.g., domain name.

Part B: Transferring Registration of a Domain
Name in a Blockchain Network and in the DNS V. Overview Some embodiments according to this Part provide for transferring registration of a domain name both in a blockchain network and in the DNS. In more detail, some embodiments permit a registrant to transfer registration of a domain name on a blockchain secondary market, including transferring any associations with blockchain addresses, while also ensuring that the domain name registration is transferred in the DNS. Some embodiments may be conceptualized as including three phases, as follows.

Phase I: The current registrant of a domain name, referred to herein as the losing registrant, for example, may list their domain name as available for re-registration on the blockchain. According to some embodiments, re-registration is the process by which the registration of a domain name is transferred from an original registrant to a different registrant. As part of the re-registration process, the current registrar of the domain name may list the domain name as available for registration by a different registrant, e.g., the current registrant may put the domain name for sale on a secondary market.

Phase II: The prospective new registrant of a domain name, referred to herein as the gaining registrant, for example, may search for domain names available for re-registration on the blockchain.

Phase III: The gaining registrant initiates the re-registration process on the blockchain, which causes the transfer of the domain name from the losing registrant to the gaining registrant both on blockchain and in the DNS, as well as the transfer of cryptocurrency funds from the gaining registrant to the losing registrant.

These phases are set forth in detail below, where Phase I is shown and described in reference to FIG. 7, Phase II is shown and described in reference to FIG. 8, and Phase III is shown and described in reference to FIGS. 9-29. Details of Phase III differs among embodiments, depending on whether such embodiments include an escrow feature or not, and depending on which entities perform certain actions in the process. Phase III without escrow is shown and described in reference to FIGS. 9 and 10. Phase III with escrow is shown and described in reference to FIGS. 11-29.

VI. Phase I: Listing Domain Name as Available for Re-Registration

Figure 7:
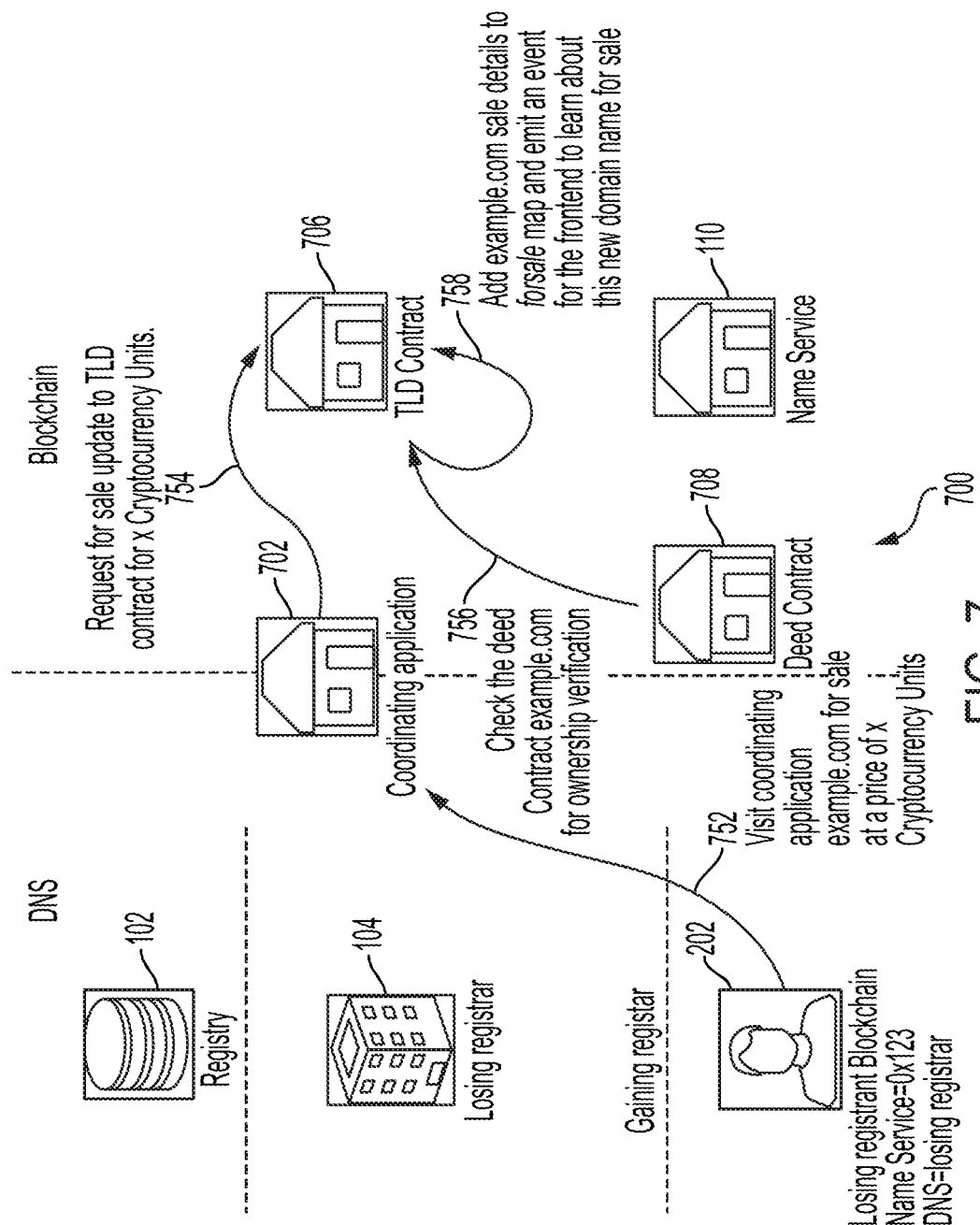
FIG. 7 is a hybrid diagram for a method for listing in a blockchain environment a domain name available for re-registration.

FIG. 7 is a hybrid diagram for a method 700 for listing in a blockchain environment a domain name available for re-registration. For convenience, method 700 is shown and described in reference to the same registry 102, registrar 104, and blockchain directory 110 as shown and described above in reference to FIG. 1, and the same registrant 202 as shown and described above in reference to FIG. 2. In particular, FIG. 7 depicts registrant 202 as listing their domain as being available for re-registration.

For method 700, and in Part B in general, registrar 802 is referred to as the gaining registrar to indicate that it will be the registrar of record for the domain name once the domain transfer is completed. Similarly, in Part B, registrar 104 is referred to as the losing registrar to indicate that it is the registrar of record for the domain name that is being transferred.

Method 700 may be performed in part by coordinating application 702. Coordinating application 702 may include a web-based user interface that a gaining or losing registrant may utilize to provide and receive information as described herein. Coordinating application 702 may be embodied in one or more applications of various types according to various embodiments. As shown in FIGS. 7-29, coordinating application 702 is depicted as a hybrid decentralized application and website. However, according to some embodiments, e.g., embodiments without escrow, coordinating application 702 may be or include a decentralized application. Alternately, according to various embodiments, coordinating application 702 may be or include a website and/or web service. In particular, for embodiments with escrow, coordinating application 702 may include a website or web service in order to securely persist data such as access tokens and authorization information, which cannot be placed on a blockchain in clear text without compromising secrecy. Further, according to various embodiments, coordinating application 702 may be or include a wallet, e.g., of losing registrant 202 and/or of a gaining registrant. Yet further, coordinating application 702 may be operated by an intermediate party that interacts with the blockchain on the behalf of losing registrant 202 for method 700. Yet further, coordinating application 702 may include a smart contract on the blockchain. According to some embodiments, some (or none) of the actions described herein as being performed by coordinating application 702 are performed by a decentralized application, some (or none) of the actions are performed by a website, and some (or none) of the actions are performed by a wallet. Any combination of actions of coordinating application 702 may be performed by any combination of a decentralized application, a website, a web service, and a wallet.

Method 700 may be performed in part by one or more smart contracts, depicted in FIG. 7 as top-level domain contract 706, deed contract 708, and blockchain directory 110. These smart contracts may be coded using a standard blockchain smart contract language and included in the blockchain itself. The functionalities of the smart contracts according to various embodiments is described in detail herein. Nevertheless, the functionalities of these smart contracts may be distributed among one or more of top-level domain contract 706, deed contract 708, and blockchain directory 110. That is, the division of labor among these smart contracts as presented herein is by way of non-limiting example; functionalities may be combined, exchanged, or transferred between top-level domain contract 706, deed contract 708, and blockchain directory 110.

Top-level domain contract 706 may have various properties and functionalities as described herein. According to some embodiments, top-level domain contract 706 may be, or include functionality of, registry signature verification program 106 as shown and described above in reference to FIG. 1. According to some embodiments, top-level domain contract 706 owns, according to blockchain directory 110, one or more top-level domains. That is, according to such embodiments, the blockchain may include a mined transaction digitally signed by a private key of registry 102 that indicates transfer of the one or more top-level domains to top-level domain contract 706. According to some embodiments, top-level domain contract 706 creates and/or interacts with deed contract 708 as described in detail further herein. According to some embodiments, top-level domain contract 706 detects and/or emits various events as described in detail further herein. According to various embodiments, top-level domain contract 706 facilitates domain name transfers in various ways as described in detail further herein.

Deed contract 708 may have various properties and functionalities as described herein. According to various embodiments, each domain name that is used as a blockchain address has a corresponding deed contract, such as deed contract 708. According to some embodiments, a deed contract may be for multiple domain names. In either embodiment type, deed contract 708 includes relevant data for the domain name(s). For example, deed contract 708 may include any, or a combination, of a domain name, registrant information for the domain name, and/or registration expiration for the domain name. According to various embodiments, deed contract 708 may create and/or interact with various pending deed contracts as described in detail further herein.

Method 700 may be initiated by a registrant, such as losing registrant 202. The actions performed by registrant 202 for method 700, including the initiation of method 700, may be performed through or by coordinating application 702 according to some embodiments. A description of method 700 in operation follows.

At 752, losing registrant 202 accesses coordinating application 702 to initiate method 700. Such access may be via the internet. By way of non-limiting example, losing registrant 202 has registered example.com and wishes to list it as being available for re-registration. Thus, at 752, losing registrant 202 provides at least the domain name to coordinating application 702. In addition, losing registrant 202 may provide to coordinating application 702 any, or a combination, of: a price (e.g., in terms of dollars or a respective cryptocurrency), the blockchain address for losing registrant 202, the blockchain address for an authoritative resolver for example.com for the blockchain, and the identity of the registrar of record for example.com, that is, the identity of losing registrar 104. According to some embodiments, the price may be replaced, or supplemented, by alternate compensation arrangement details, e.g., bidding parameters such as starting price, bidding forum, bidding increments, etc.

At 754, coordinating application 702 sends a request to top-level domain contract 706 to list example.com (for example) as being available for re-registration. The request may be sent using any suitable standard blockchain network communication protocol.

At 756, top-level domain contract 706 contacts deed contract 708 for example.com to request ownership information, e.g., the registrant and registrar of record for example.com as represented in the blockchain. Deed contract 708 for example.com returns the ownership information to top-level domain contract 706. In this manner, top-level domain contract 706 verifies that the seller (here, losing registrant 202) owns example.com on the specific blockchain at issue.

At 758, top-level domain contract 706 emits an event indicating that example.com is available for re-registration, which coordinating application 702 later detects. Further, top-level domain contract 706 adds example.com to a list that it maintains of domain names available for re-registration. Such a list may include associated details for each such domain name, such as the identity of losing registrar 104 and/or the price (e.g., in dollars or in cryptocurrency) or other compensation arrangement details.

This may conclude method 700.

VII. Phase II: Searching for Available Domain Names

Figure 8:
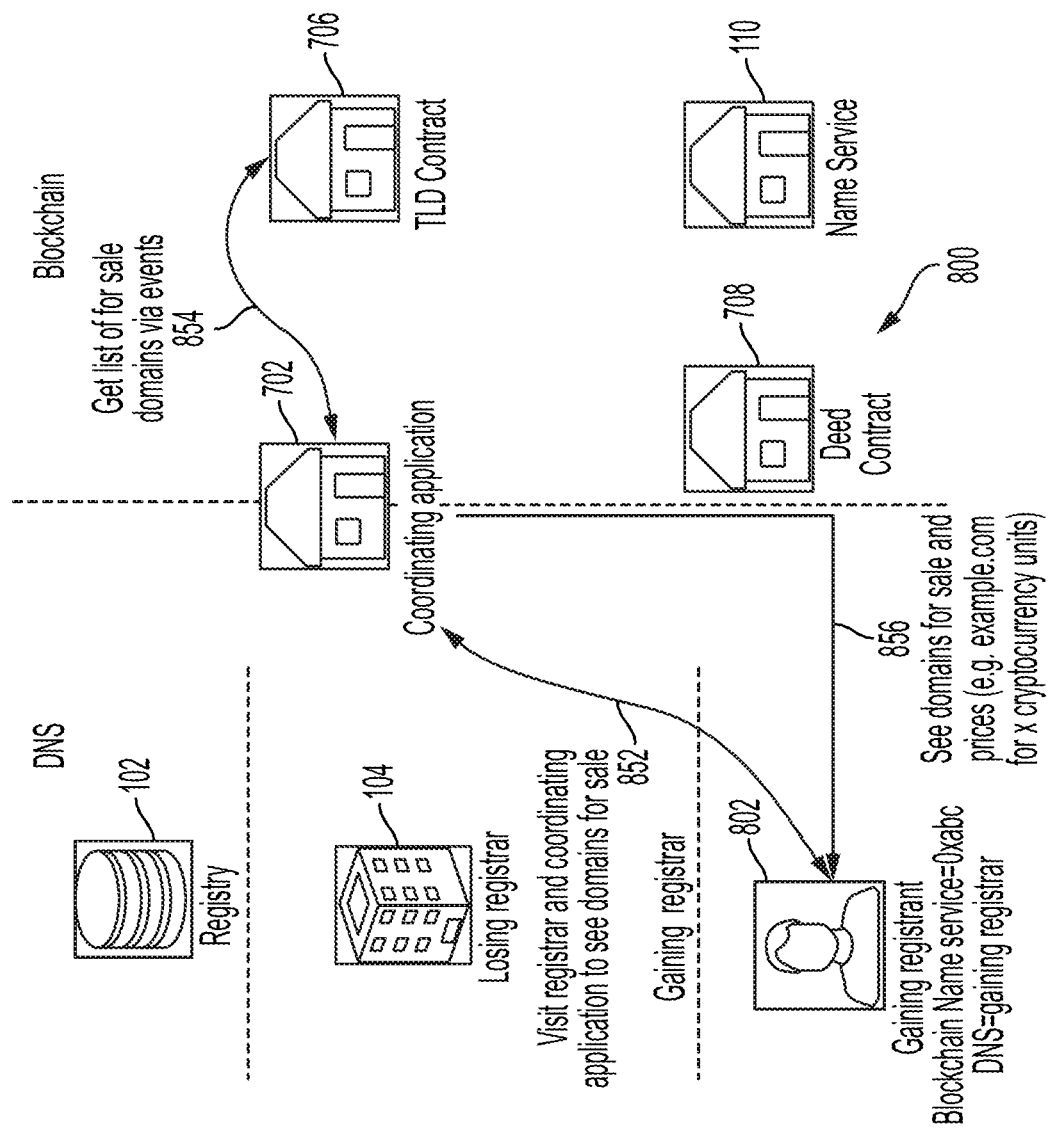
FIG. 8 is a hybrid diagram for a method of searching in a blockchain environment for available domain name re-registrations.

FIG. 8 is a hybrid diagram for a method 800 of searching in a blockchain environment for available domain name re-registrations. For convenience, method 800 is shown and described in reference to the same registry 102, losing registrar 104, blockchain directory 110, coordinating application 702, top-level domain contract 706, and deed contract 708, as shown and described above in reference to FIG. 7. In addition, method 800 may include a prospective registrant, referred to herein as gaining registrant 802.

Method 800 may be initiated by the prospective registrant, such as gaining registrant 802. The actions performed by gaining registrant 802 for method 800, including the initiation of method 800, may be performed through or by coordinating application 702 according to some embodiments. A description of method 800 in operation follows.

At 852, gaining registrant 802 accesses coordinating application 702 to initiate method 800. Such access may be via the internet. Gaining registrant 802 interacts with a user interface provided by coordinating application 702 to request a list of domain names for sale. To that end, coordinating application 702 may provide search functionality, such as permitting gaining registrant 802 to search for available domain names using keywords, synonyms, alternative top-level domains, etc. Alternately, or in addition, gaining registrant 802 may request a complete list of available domain names.

At 854, coordinating application 702 gets a list of domain names that are available for re-registration from top-level domain contract 706. The list may be a full list, or may be a partial list responsive to search criteria originally provided to coordinating application 702 by gaining registrant 802. Subsequently, coordinating application 702 displays one or more domain names available for re-registration to gaining registrant 802. Such display may include prices (e.g., in dollars or in cryptocurrency), other compensation arrangement details, and/or existing bids.

This may conclude method 800.

VIII. Phase III: Transferring Domain Names

Figure 9:
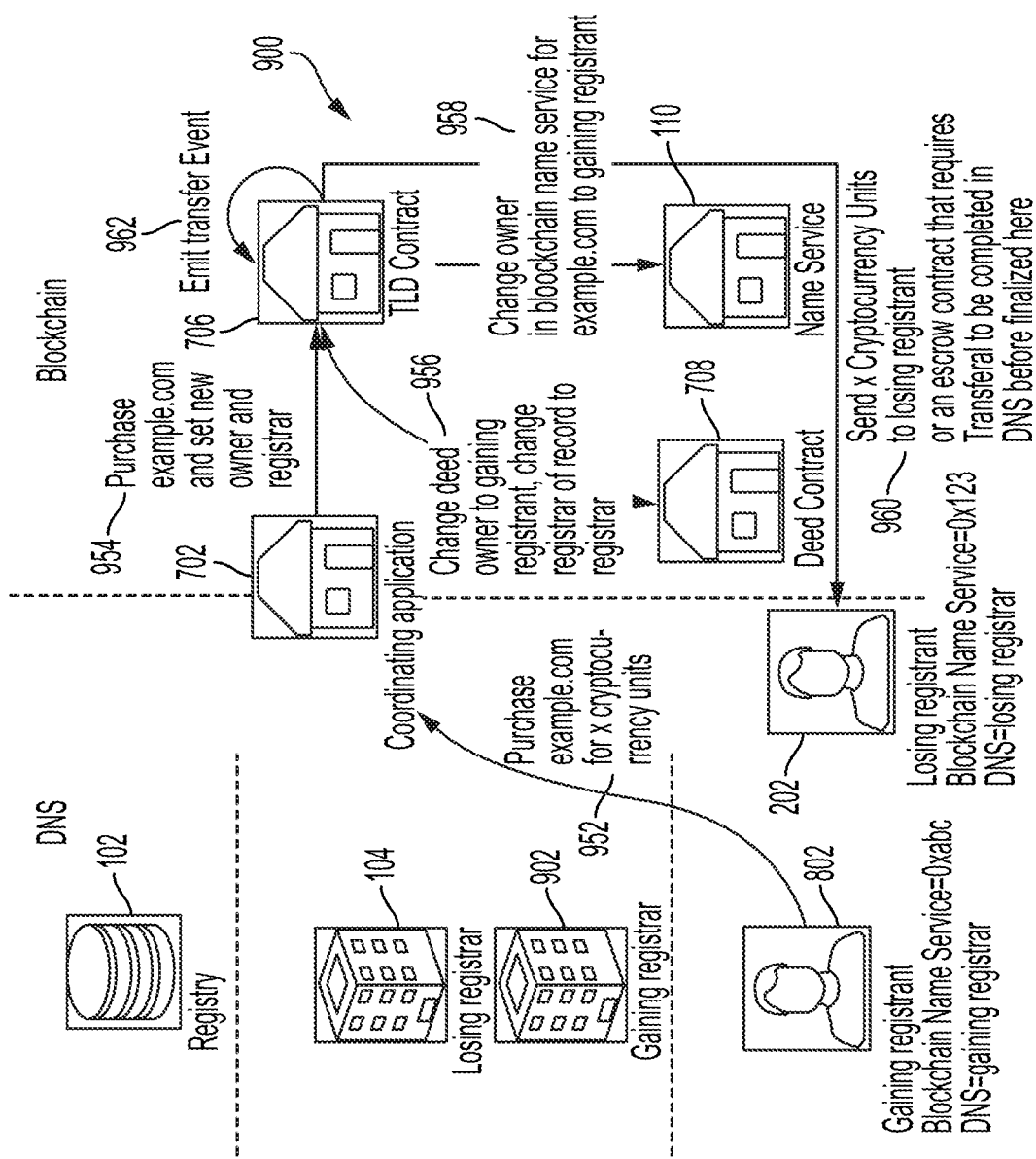
FIG. 9 is a hybrid diagram for a method of transferring registration of a domain name without escrow in a blockchain environment.

FIG. 9 is a hybrid diagram for a method 900 of transferring registration of a domain name without escrow in a blockchain environment. For convenience, method 900 is shown and described in reference to the same registry 102, losing registrar 104, blockchain directory 110, coordinating application 702, top-level domain contract 706, deed contract 708, and gaining registrant 802 as shown and described above in reference to FIG. 8. In addition, method 900 involves gaining registrar 902, which will be the new registrar of record for (continuing the example of FIGS. 7 and 8) example.com once it has been fully transferred in the DNS environment.

Method 900 may be initiated by gaining registrant 802. The actions performed by gaining registrant 802 for method 900, including the initiation of method 900, may be performed through or by coordinating application 702 according to some embodiments.

Coordinating application 702 includes functionality to securely interact with registrars 104, 902 in the DNS environment on behalf of registrants 202, 804 and to facilitate interactions with the blockchain. According to some embodiments, registrants 202, 802 sign into coordinating application 702 and link their existing accounts with respective registrars 104, 902 to their respective accounts with coordinating application 702. Further, prior to method 900 (and certain of the methods of FIGS. 10-29) access tokens have been furnished to coordinating application 702 by registrants 202, 802, e.g., by using an Open Authorization (OAuth) process according to some embodiments. Alternately, other schemes can be used to pass messages between coordinating application 702 and registrars 104, 902. Coordinating application 702 is thus able to process domain name transfers on behalf of registrants 202, 802, e.g., via their access tokens.

A description of method 900 in operation follows.

At 952, gaining registrant 802 indicates to coordinating application 702 (e.g., via a user interface) that they wish to re-register example.com. By way of non-limiting example, gaining registrant 802 specifies the domain name and purchase price to coordinating application 702.

At 954, coordinating application 702 sends a message to top-level domain contract 706 to purchase example.com and set gaining registrant 802 as the new registrant.

At 956, top-level domain contract 706 communicates with deed contract 708 to change the registrant of record to gaining registrant 802 and change the registrar of record to gaining registrar 902.

At 958, top-level domain contract 706 communicates with blockchain directory 110 to change the owner (as listed in blockchain directory 110) of example.com to gaining registrant 802.

At 960, top-level domain contract 706 transfers the purchase price, in cryptocurrency units, to losing registrant 202. This may be accomplished in the standard manner for the blockchain at issue, e.g., by way of mined transaction.

Thus, at this point, ownership of the domain name, as represented in the blockchain environment, e.g., in blockchain directory 110, is transferred from losing registrant 202 to gaining registrant 802. This may conclude method 900.

Figure 10:
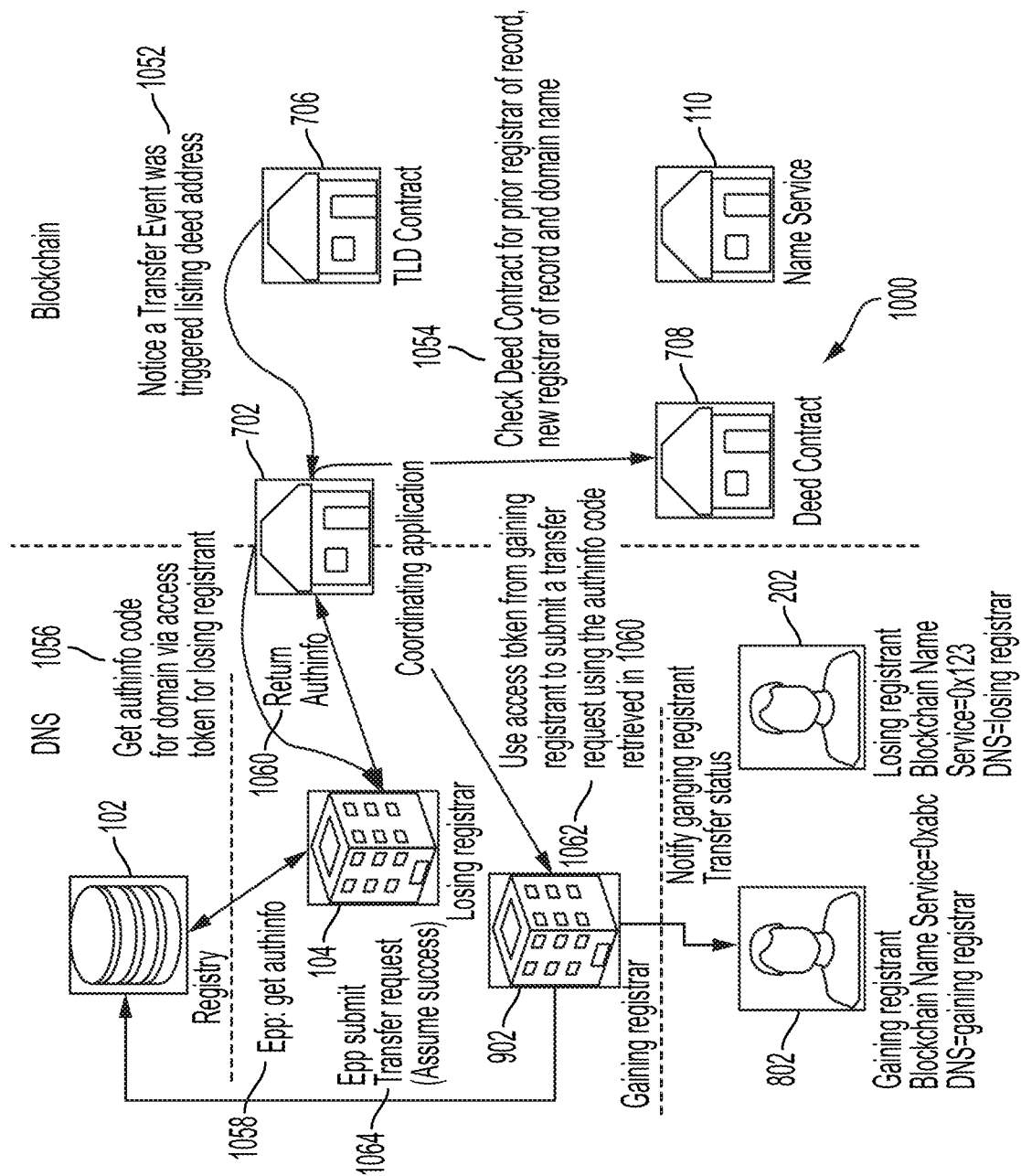
FIG. 10 is a hybrid diagram for a method of propagating a transfer of domain name registration from the blockchain environment into the DNS environment without escrow.

FIG. 10 is a hybrid diagram for a method 1000 of propagating a transfer of domain name registration from the blockchain environment into the DNS environment without escrow. For convenience, method 1000 is shown and described in reference to the same registry 102, losing registrar 104, blockchain directory 110, coordinating application 702, top-level domain contract 706, deed contract 708, gaining registrant 802, and gaining registrar 902 as shown and described above in reference to FIG. 9. The description of method 1000 continues the example imitated in reference to FIG. 7 regarding the domain name example.com.

Method 1000 may automatically follow method 900 in order to ensure that the domain name is properly transferred in both the blockchain environment and the DNS environment. Thus, method 1000 may be initiated by coordinating application 702 in response to detecting the transfer event of 962 of method 900. A description of method 1000 follows.

At 1052, coordinating application 702 detects that top-level domain contract 706 has emitted a transfer event (e.g., per 962 of method 900). Coordinating application 702 may detect such an event using any standard blockchain communication protocol.

At 1054, coordinating application 702 checks deed contract 708 for the domain name and the identities of gaining registrar 902, losing registrar 104.

At 1056, coordinating application 702 requests authorization information for the domain name from losing registrar 104 using the access token for losing registrant 202.

At 1058, losing registrar 104 sets or requests the authorization information from registry 102 using an EPP get command. Registry 102 responds with the requested authorization information.

At 1060, losing registrar 104 returns the authorization information requested per 1056 to coordinating application 702.

At 1062, coordinating application 702 uses the access token for gaining registrant 802 to submit a transfer request to gaining registrar 902 for example.com using the authorization information obtained at 1060.

At 1064, gaining registrar 902 submits an EPP transfer request to registry 102. Registry 102 thus completes the transfer.

At 1066, gaining registrar 902 notifies gaining registrant 802 that the transfer has completed.

This may conclude method 1000.

Figure 11:
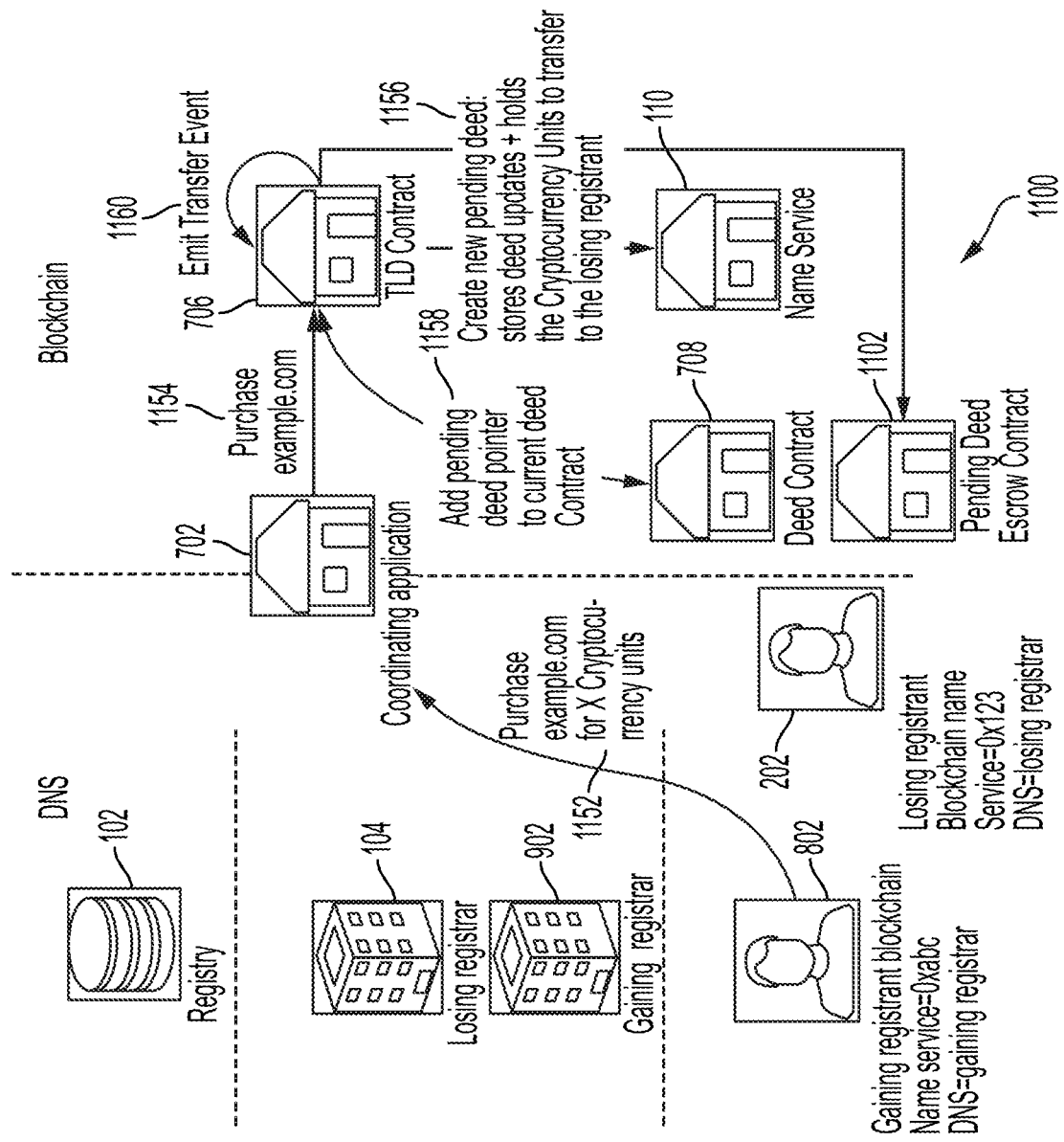
FIG. 11 is a hybrid diagram for a method of entering a domain name and cryptocurrency funds into escrow.

FIGS. 11-29 depict embodiments in which Phase III includes escrow for the domain name and the cryptocurrency. Such embodiments may include two stages as follows. The first stage of Phase III with escrow is referred to herein as escrow entry. Escrow entry occurs within the blockchain environment, where the domain name and the funds are stored in an escrow deed contract (on the blockchain) until proof of a transfer is shown in the DNS environment. FIG. 11 depicts the escrow entry stage of Phase III.

FIG. 11 is a hybrid diagram for a method 1100 of entering a domain name and cryptocurrency funds into escrow. For convenience, method 1100 is shown and described in reference to the same registry 102, losing registrar 104, gaining registrar 902, losing registrant 202, gaining registrant 802, coordinating application 702, top-level domain contract 706, deed contract 708, and blockchain directory 110 as shown and described above in reference to FIG. 10. Method 1100 also involves pending deed contract 1102, described in detail below. The description of method 1100 continues the example imitated in reference to FIG. 7 regarding the domain name example.com.

Method 1100 may be initiated by gaining registrant 802. The actions performed by gaining registrant 802 for method 1100, including the initiation of method 1100, may be performed through or by coordinating application 702 according to some embodiments.

At 1152, gaining registrant 802 indicates to coordinating application 702 (e.g., via a user interface) that they wish to re-register example.com. By way of non-limiting example, gaining registrant 802 specifies the domain name and purchase price to coordinating application 702. Also as part of 1152, coordinating application 702 may prompt gaining registrant 802 to digitally sign a transaction transferring the purchase price in cryptocurrency to coordinating application 702. The signed transaction is passed to coordinating application 702 to be combined with certain other transactions for mining as described below in reference to the escrow release stage of Phase III.

At 1154, coordinating application 702 sends a message to top-level domain contract 706 to purchase example.com and set gaining registrant 802 as the new registrant.

At 1156, top-level domain contract 706 creates pending deed contract 1102. Pending deed contract 1102 stores updates to deed contract 708 that reflect the transfer of example.com. In particular, pending deed contract 1102 stores the identities of gaining registrar 902 and gaining registrant 802. Further, pending deed contract 1102 may store the cryptocurrency payment by transferring the cryptocurrency from top-level domain contract 1160 to pending deed contract 1102. That is, pending deed contract 1102 may programmatically specify the conditions upon which the fund transfer should occur. Pending deed contract 1102 is stored in the blockchain.

At 1158, top-level domain contract 1160 adds to deed contract 708 for example.com a pointer to pending deed contract 1102.

At 1160, top-level domain contract 1160 emits a transfer event using any standard blockchain communication protocol.

At this point, registration of example.com in the blockchain environment and the corresponding cryptocurrency are escrowed by way of pending deed contract 1102. This may conclude method 1100.

The second of Phase III is referred to as escrow release, which occurs within both the blockchain and the DNS environments. For escrow release, once a proof of transfer is shown from inside the DNS environment, the escrowed cryptocurrency is released to losing registrant 202 and the escrowed domain name is transferred to gaining registrant 802 in both the DNS and in the blockchain.

The proof of transfer may take the form of a signed registrar of record message from registry 102. Thus, for embodiments with escrow, registry 102 may support a registrar of record EPP extension as described in detail above in reference to FIG. 1. Further, top-level domain contract 1272 may include a registry signature verification program provisioned with a public key of registry 102 to verify registrar of record proofs provided by registry 102. Such a signature verification program is presented above in reference to FIG. 1.

FIGS. 12-29 depict escrow release, in which various entities perform the following two tasks: first, receive a notice that a transfer of the domain name should occur and begin interacting with the DNS to coordinate the transfer, and second, verify that the transfer occurred in the DNS to finalize the transfer of the cryptocurrency and the domain name on the blockchain. The following Table provides a guide to FIGS. 12-29 as they relate to the first and second tasks of the escrow release stage of Phase III.

TABLE

Figure 12:
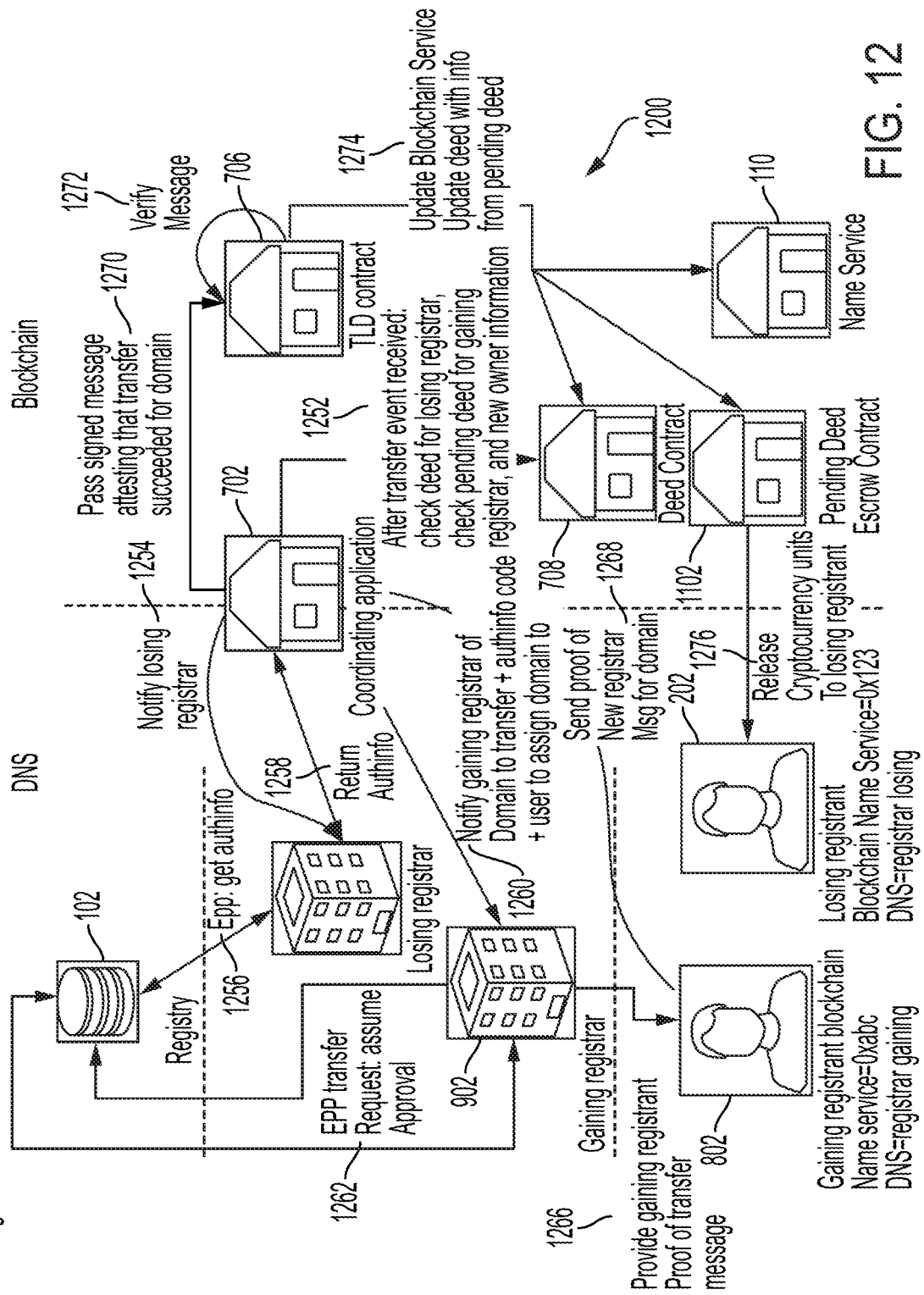
FIG. 12 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the gaining registrant.
Figure 13:
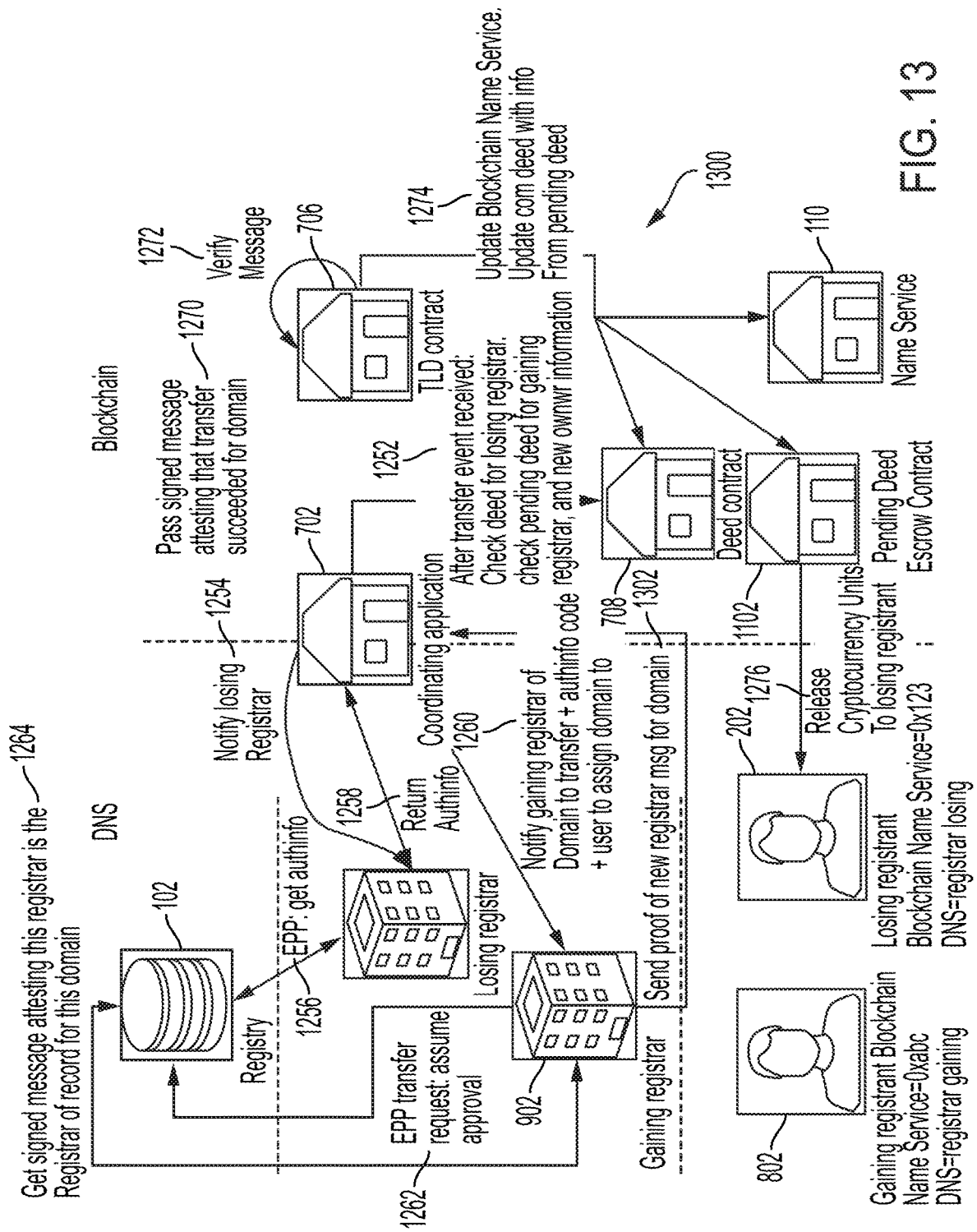
FIG. 13 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the gaining registrar.
Figure 14:
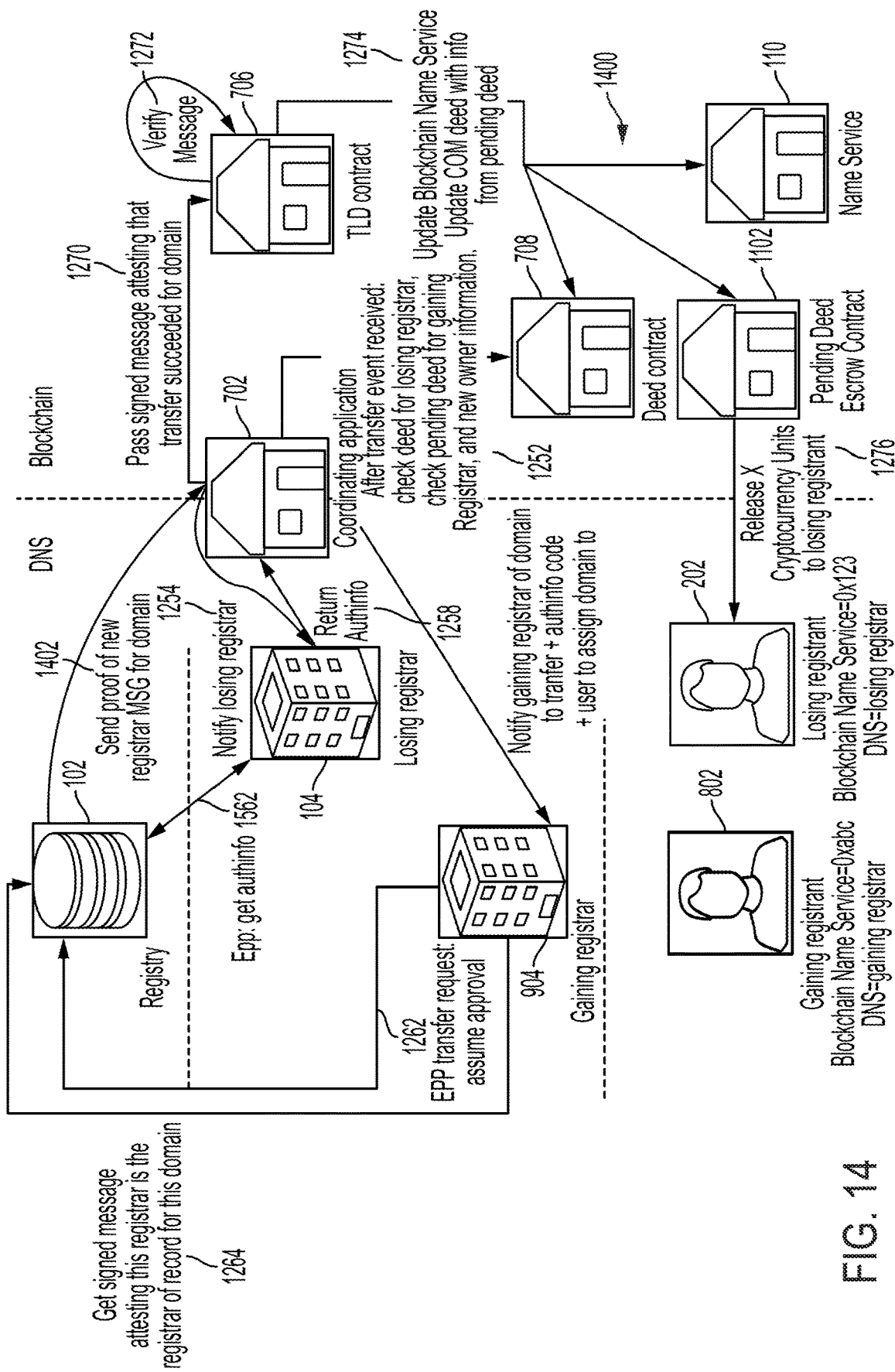
FIG. 14 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the registry.
Figure 15:
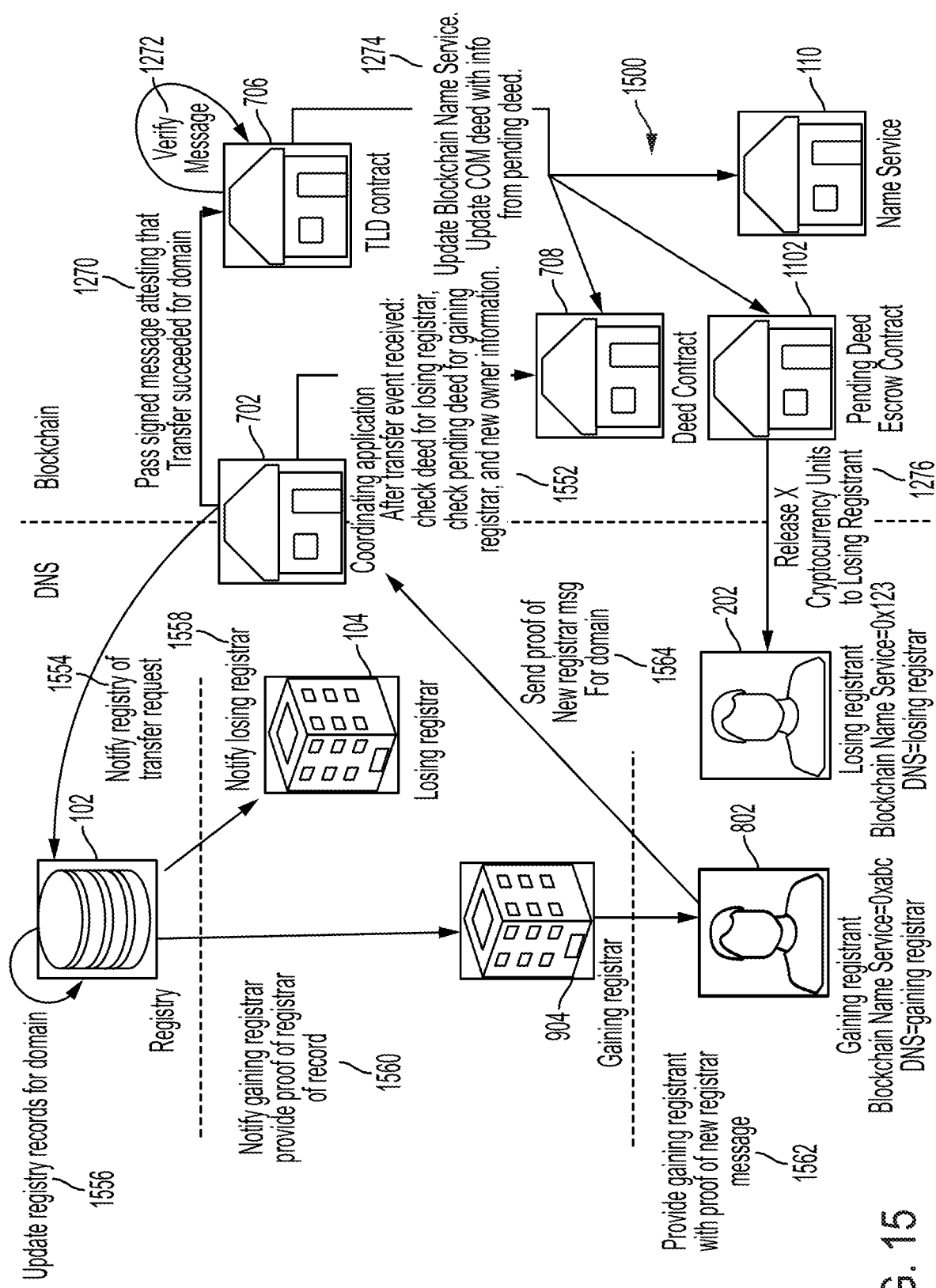
FIG. 15 is a hybrid diagram for a method of propagating the transfer of a domain name registration from the blockchain environment into the DNS environment by releasing both the domain name and cryptocurrency funds from escrow, where the notified entity is the registry by way of the coordinating application, and where the verifying entity is the gaining registrant.
Figure 16:
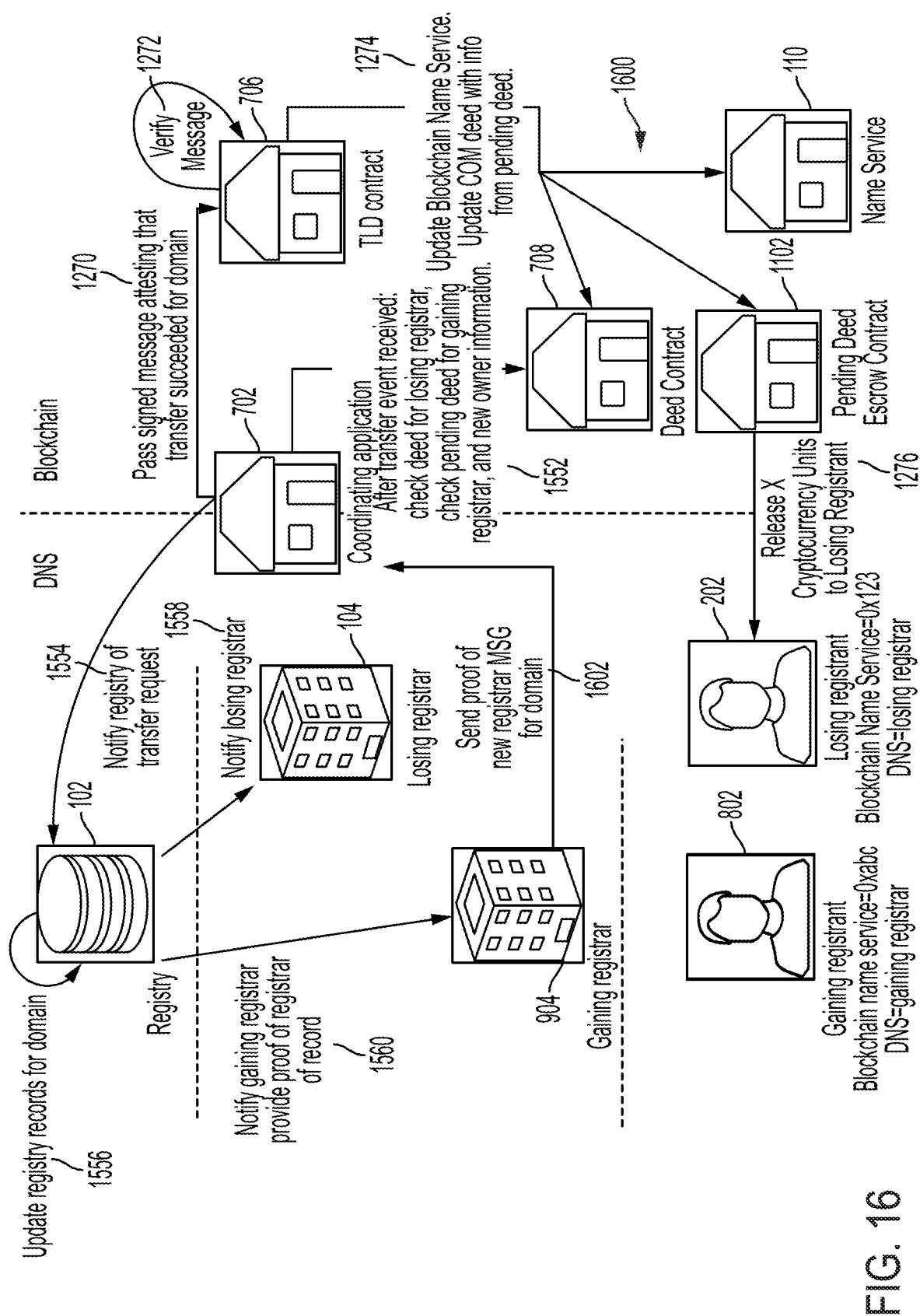
FIG. 16 is a hybrid diagram for a method 1600 of propagating the transfer of a domain name registration from the blockchain environment into the DNS environment by releasing both the domain name and cryptocurrency funds from escrow, where the notified entity is the registry by way of the coordinating application, and where the verifying entity is the gaining registrar.
Figure 17:
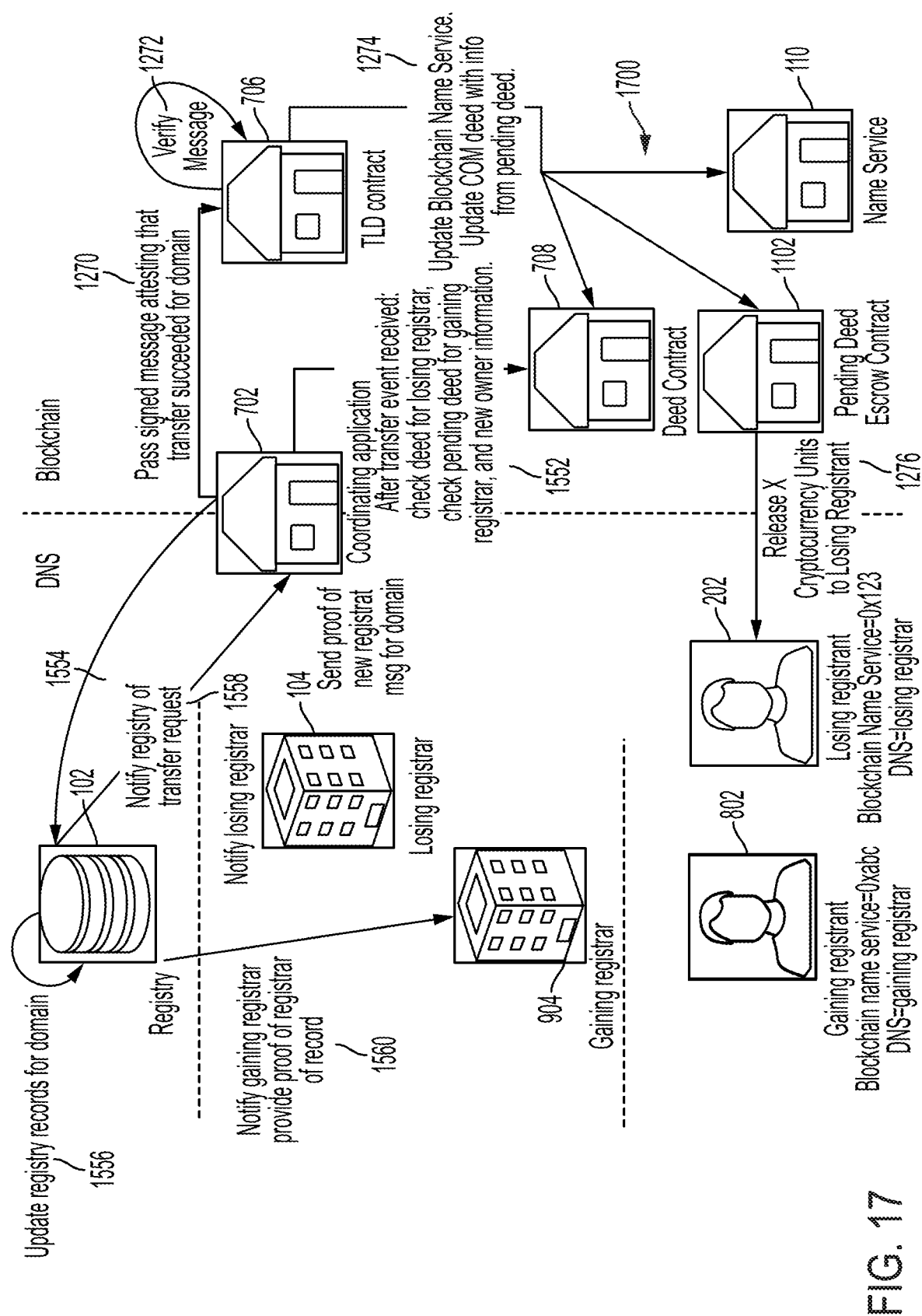
FIG. 17 is a hybrid diagram for a method of propagating the transfer of a domain name registration from the blockchain environment into the DNS environment by releasing both the domain name and cryptocurrency funds from escrow, where the notified entity is the registry by way of the coordinating application, and where the verifying entity is the registry.
Figure 18:
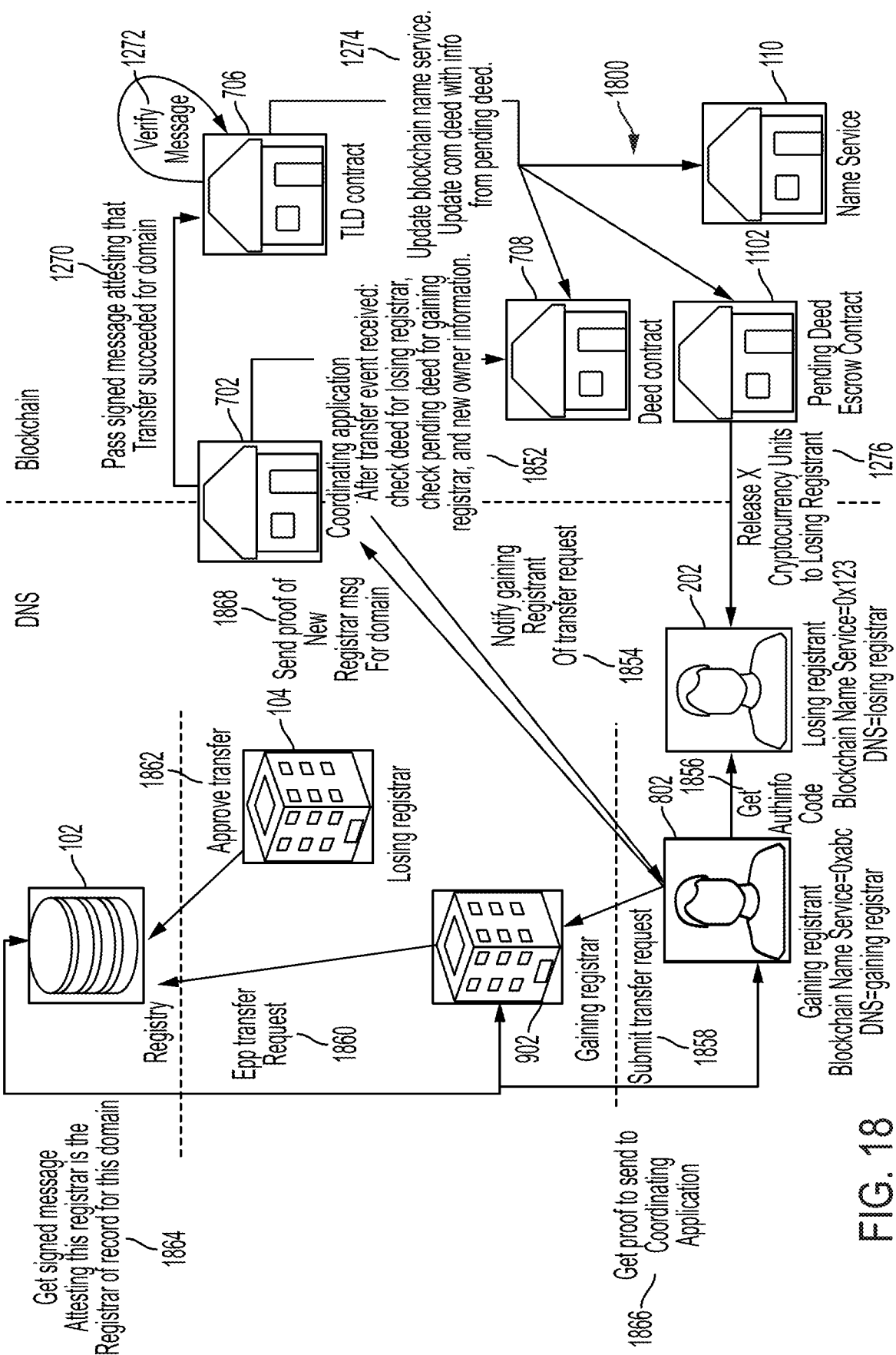
FIG. 18 is a hybrid diagram for a method of propagating the transfer of a domain name registration from the blockchain environment into the DNS environment by releasing both the domain name and cryptocurrency funds from escrow, where the notified entity is the gaining registrant by way of the coordinating application, and where the verifying entity is the gaining registrant.
Figure 19:
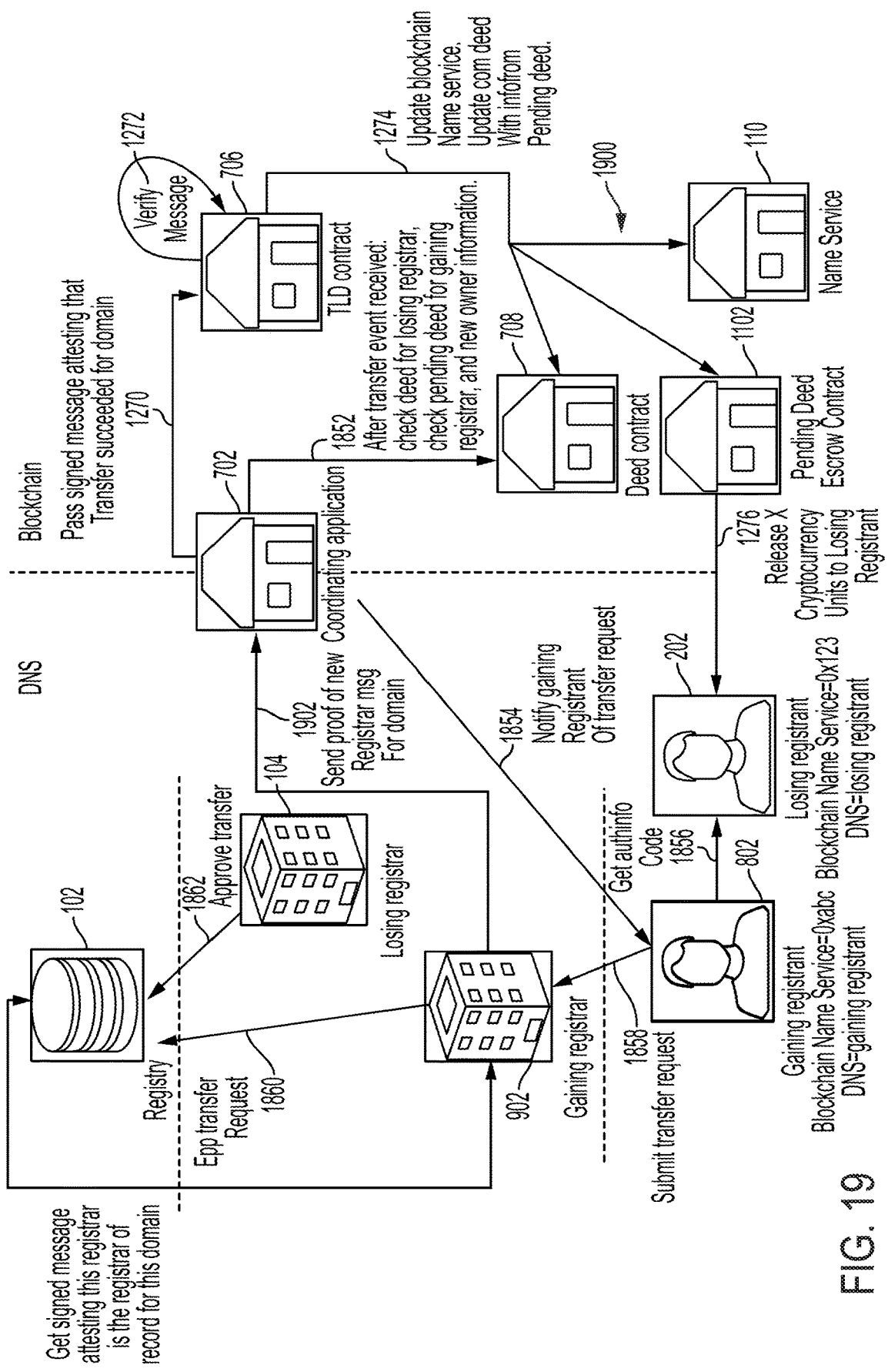
FIG. 19 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the gaining registrar.
Figure 20:
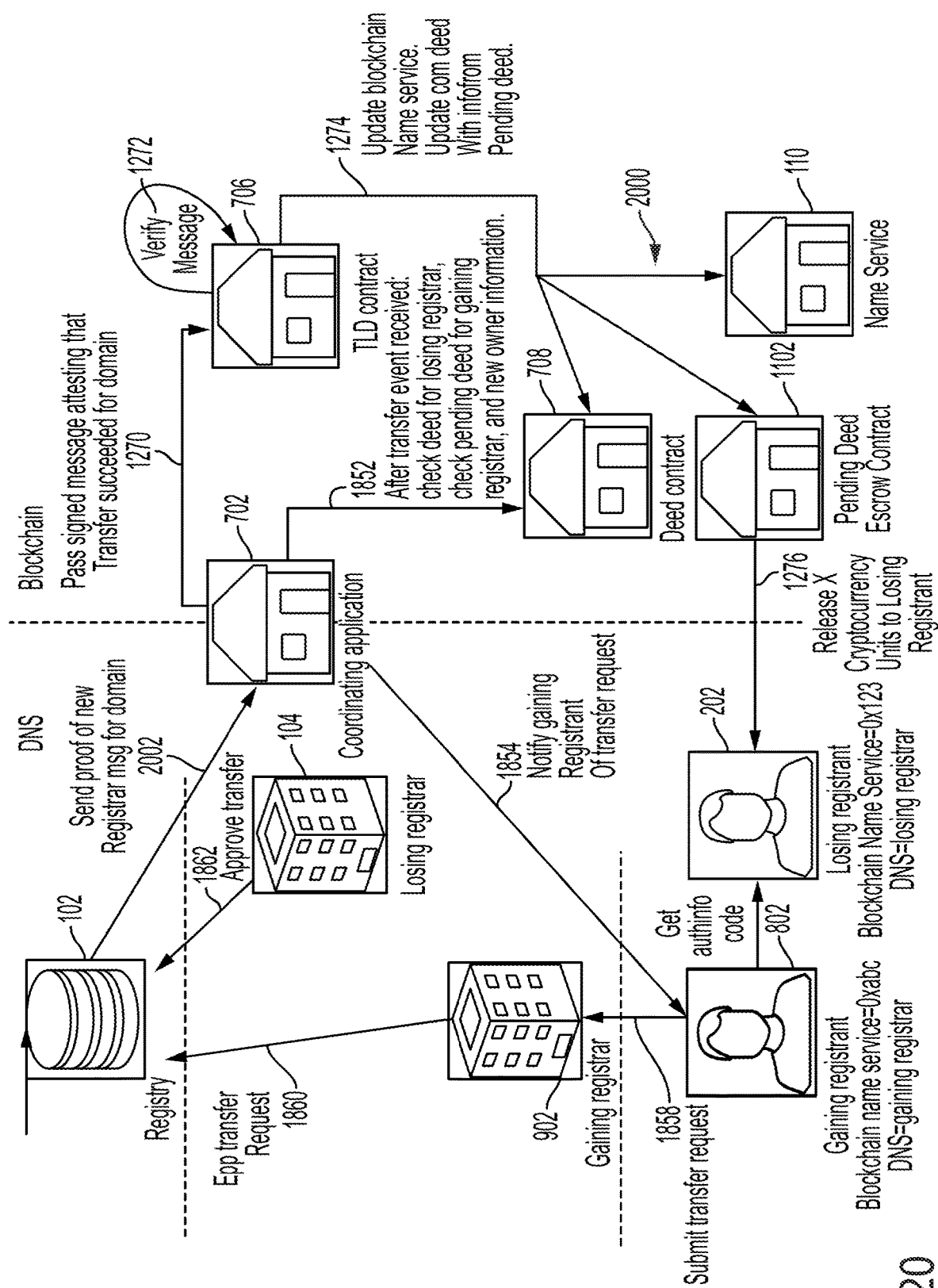
FIG. 20 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the registry.
Figure 21:
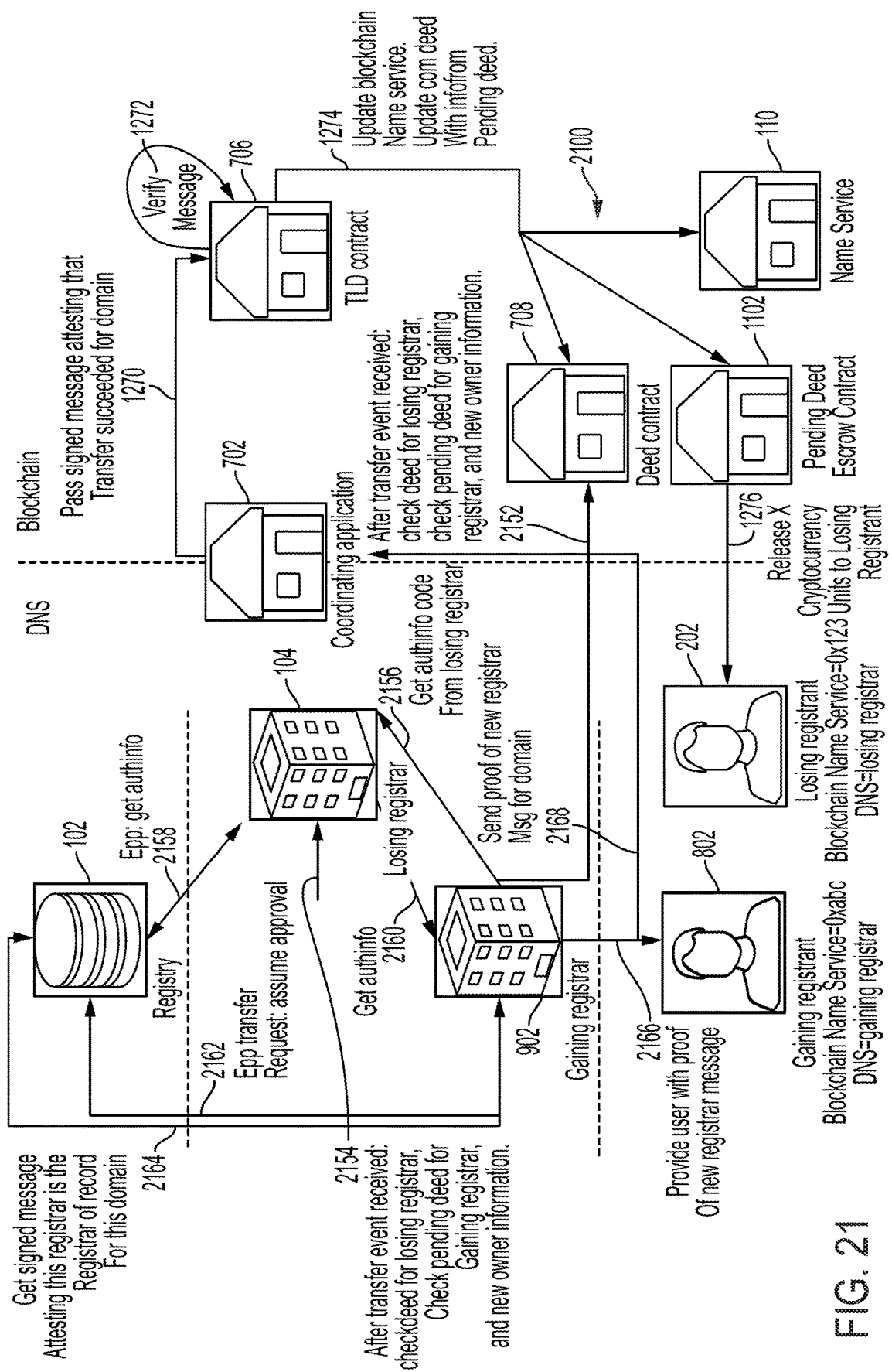
FIG. 21 is a hybrid diagram for a method of propagating the transfer of a domain name registration from the blockchain environment into the DNS environment by releasing both the domain name and cryptocurrency funds from escrow, where the notified entities are the losing registrar and the gaining registrar, and where the verifying entity is the gaining registrant.
Figure 22:
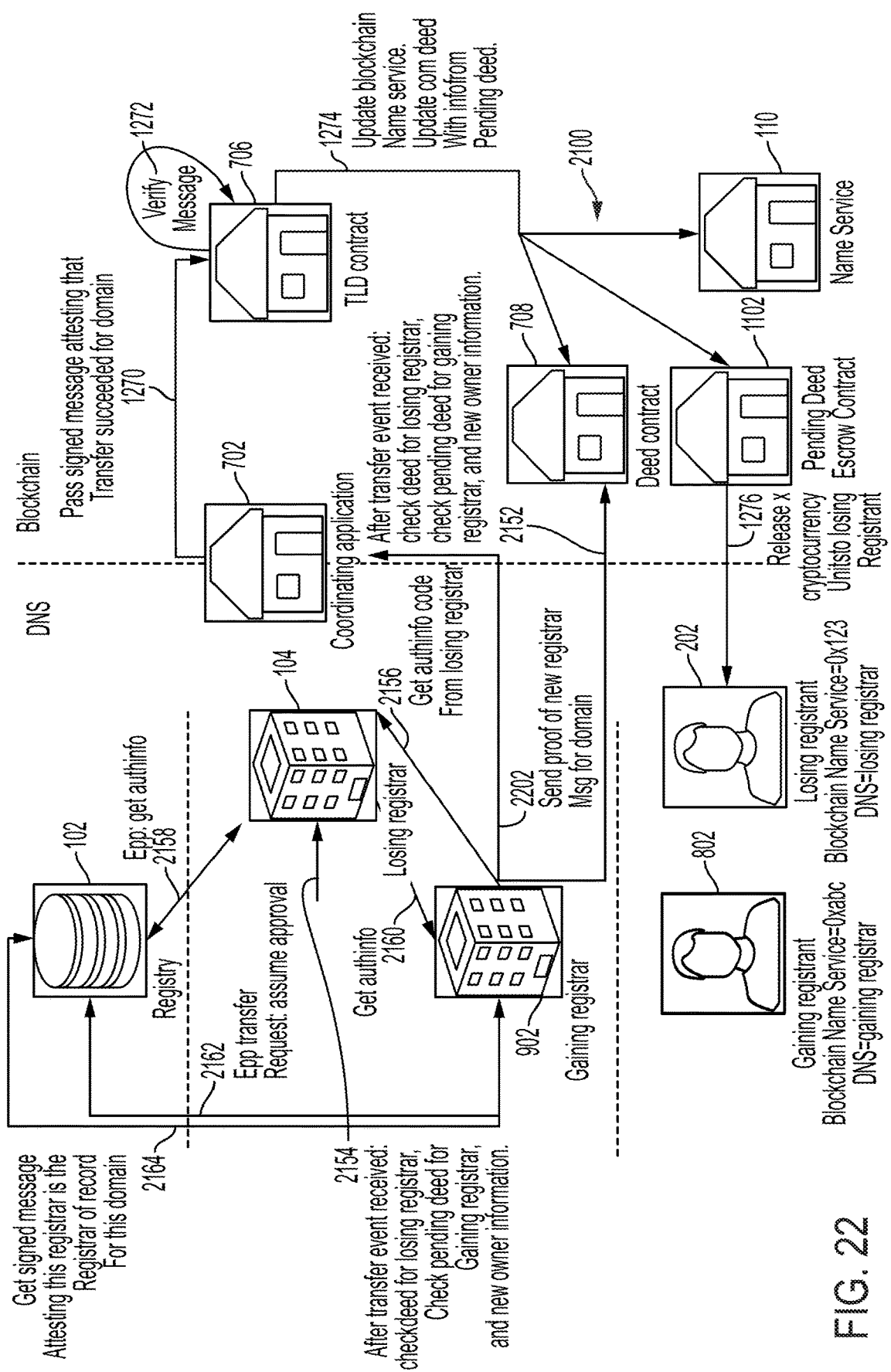
FIG. 22 is a hybrid diagram for a method of propagating the transfer of a domain name registration from the blockchain environment into the DNS environment by releasing both the domain name and cryptocurrency funds from escrow, where the notified entities are the losing registrar and the gaining registrar, and where the verifying entity is the gaining registrar.
Figure 23:
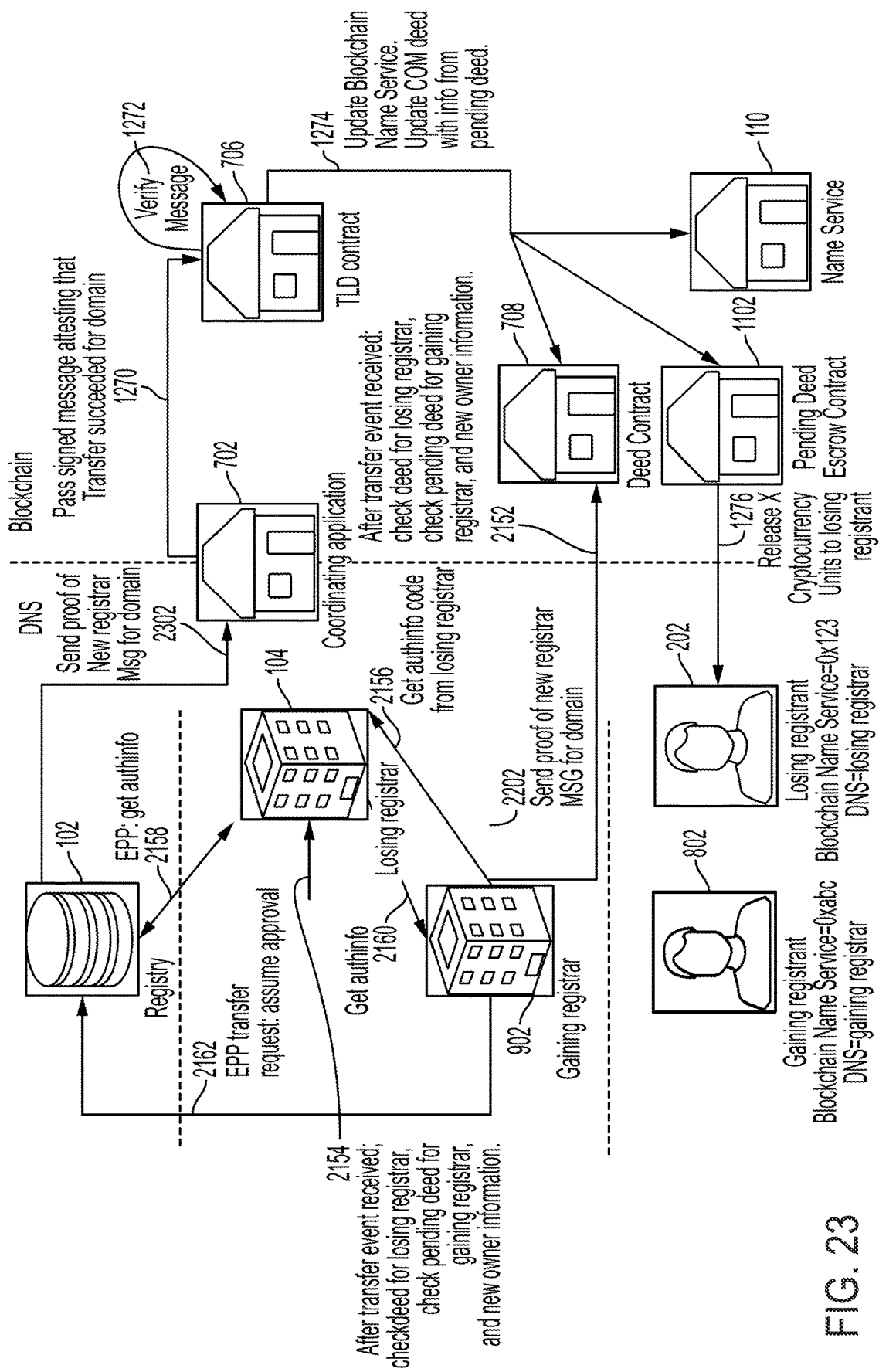
FIG. 23 is a hybrid diagram for a method of propagating the transfer of a domain name registration from the blockchain environment into the DNS environment by releasing both the domain name and cryptocurrency funds from escrow, where the notified entities are the losing registrar and the gaining registrar, and where the verifying entity is the registry.
Figure 24:
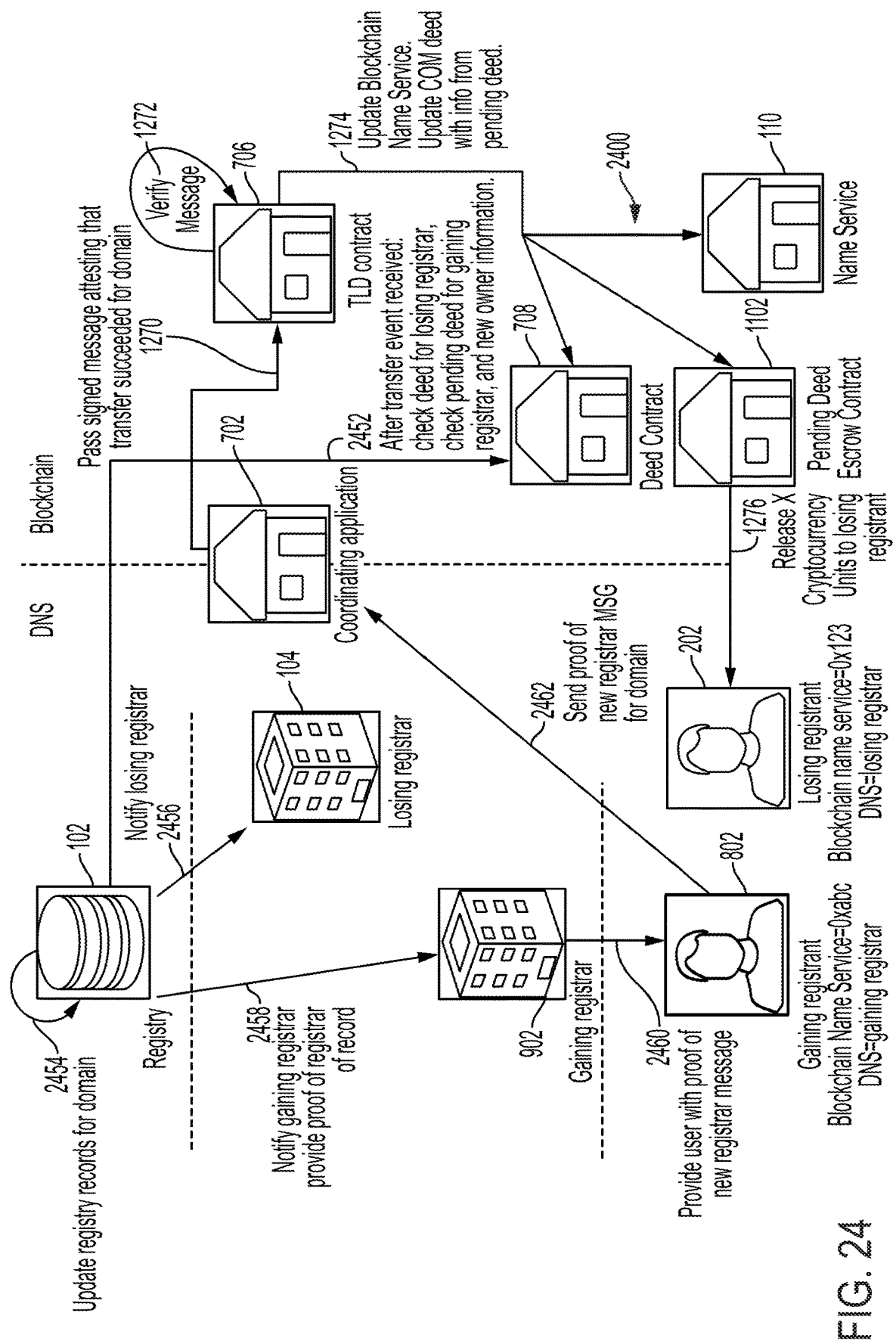
FIG. 24 is a hybrid diagram for a method of propagating the transfer of a domain name registration from the blockchain environment into the DNS environment by releasing both the domain name and cryptocurrency funds from escrow, where the notified entity is the registry, and where the verifying entity is the gaining registrant.
Figure 25:
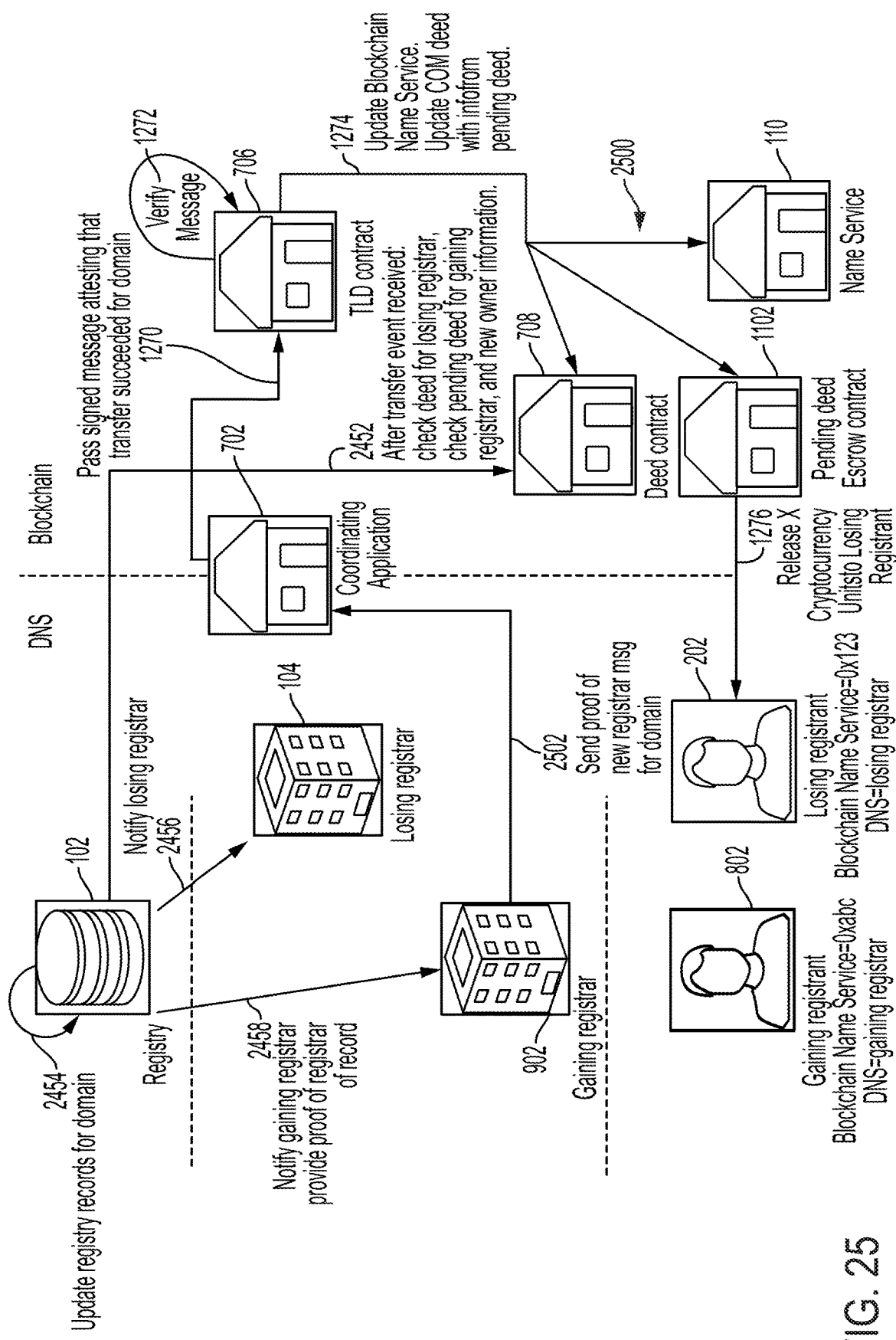
FIG. 25 is a hybrid diagram for a method of propagating the transfer of a domain name registration from the blockchain environment into the DNS environment by releasing both the domain name and cryptocurrency funds from escrow, where the notified entity is the registry, and where the verifying entity is the gaining registrar.
Figure 26:
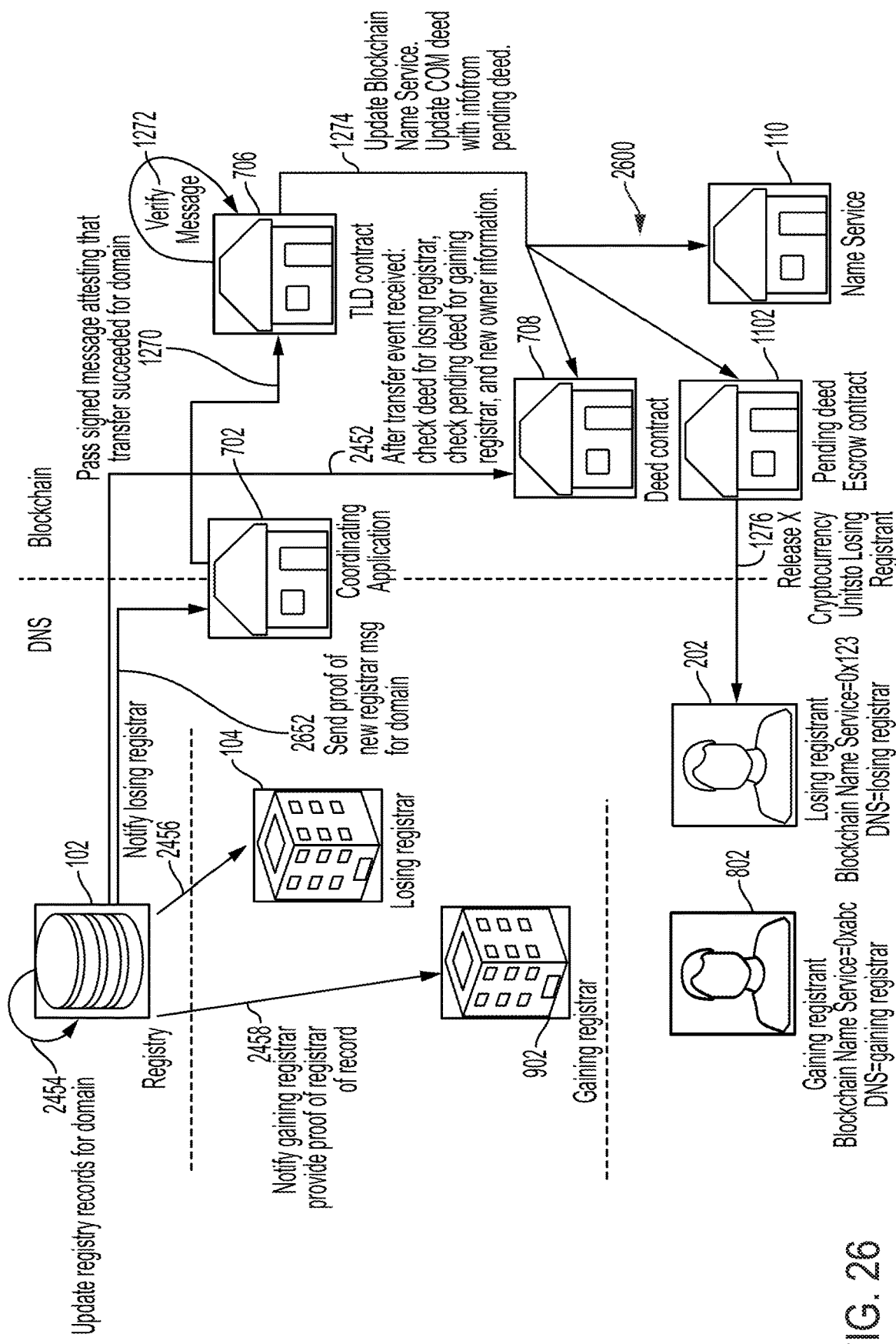
FIG. 26 is a hybrid diagram for a method 2600 of propagating the transfer of a domain name registration from the blockchain environment into the DNS environment by releasing both the domain name and cryptocurrency funds from escrow, where the notified entity is the registry, and where the verifying entity is also the registry.
Figure 27:
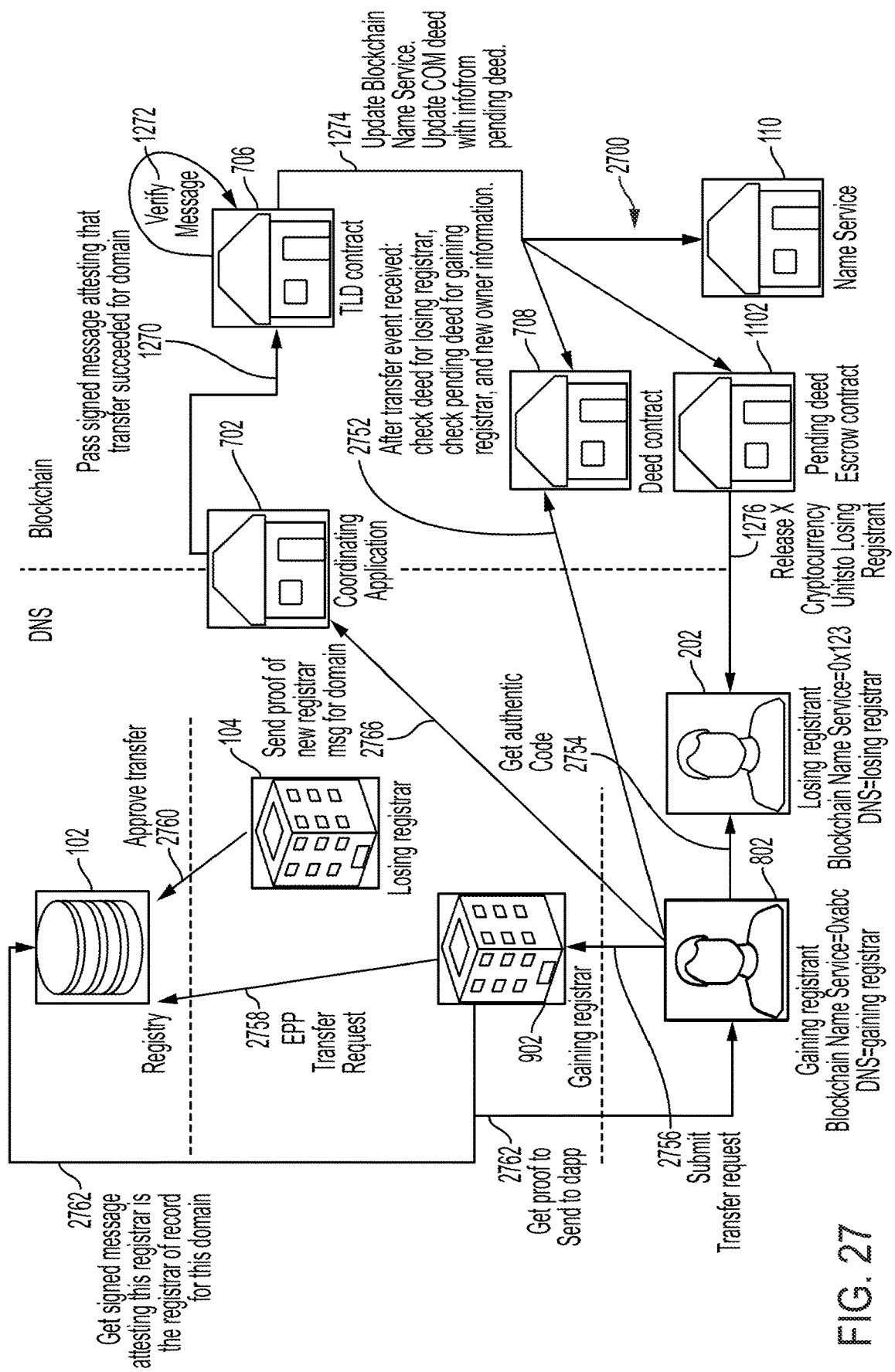
FIG. 27 is a hybrid diagram for a method of propagating the transfer of a domain name registration from the blockchain environment into the DNS environment by releasing both the domain name and cryptocurrency funds from escrow, where the notified entity is the gaining registrant, and where the verifying entity is also the gaining registrant.
Figure 28:
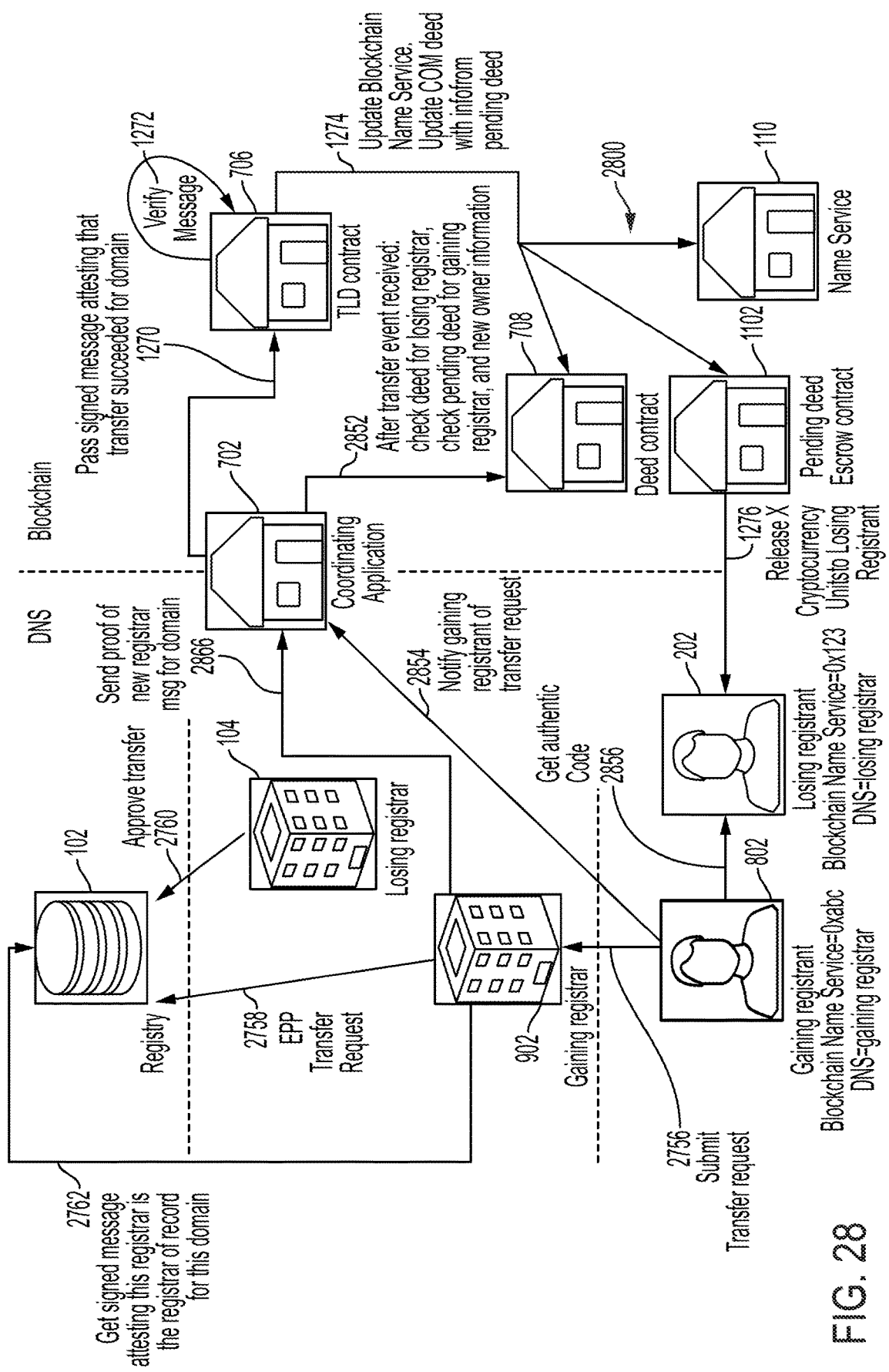
FIG. 28 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the gaining registrar.
Figure 29:
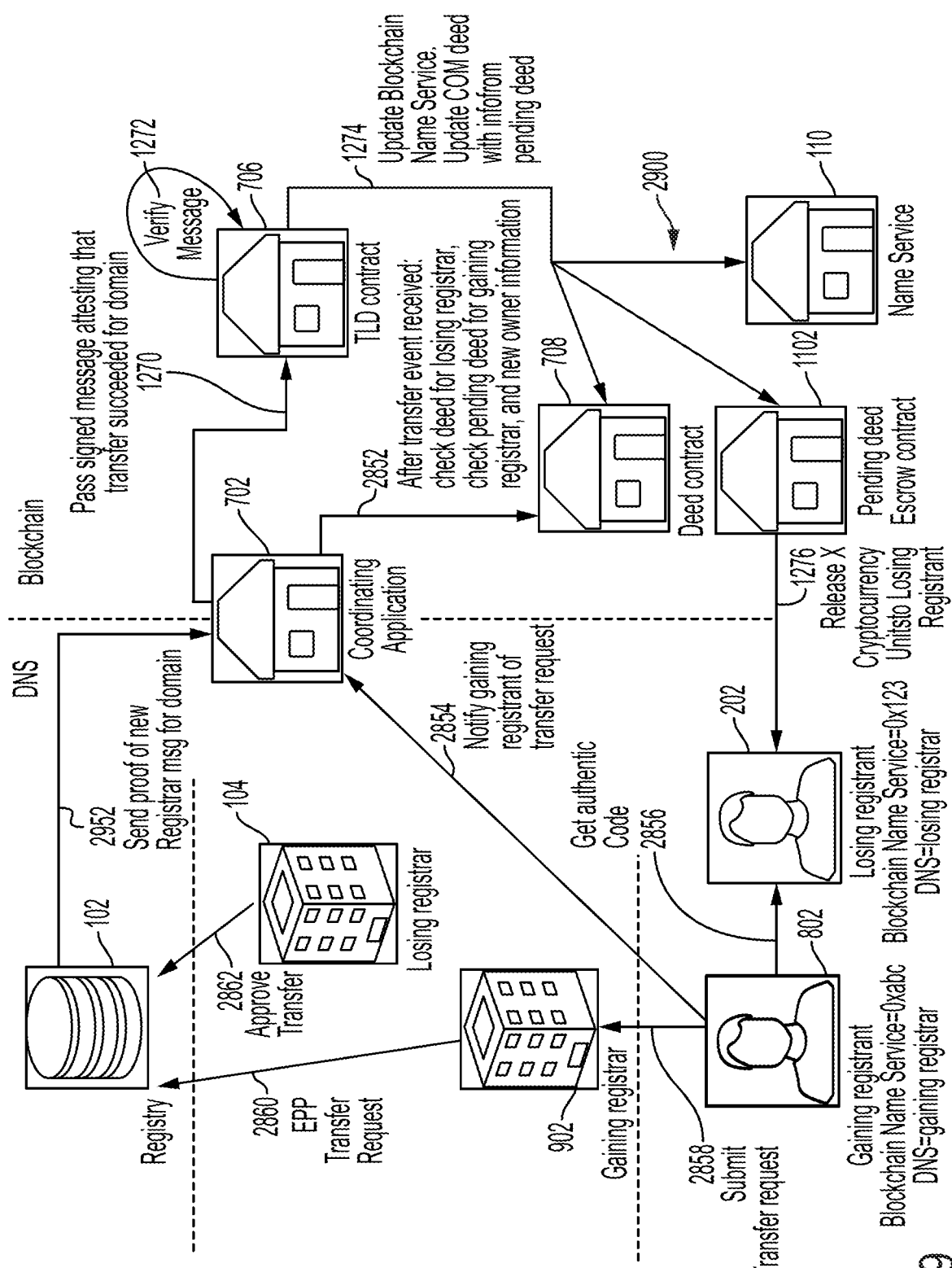
FIG. 29 is a hybrid diagram for a method of propagating the transfer of a domain name registration from the blockchain environment into the DNS environment by releasing both the domain name and cryptocurrency funds from escrow, where the notified entity is the gaining registrar by way of the coordinating application, and where the verifying entity is the registry.

| Stage 2 of Phase III | | | | |
|---|---|---|---|---|
| | | Verifying Entity | | |
| | | Gaining Registrant 802 | Gaining Registrar 902 | Registry 102 |
| Notified Entity | Coordinating Application 702 to Gaining Registrar 902 | FIG. 12 | FIG. 13 | FIG. 14 |
| | Coordinating Application 702 to Registry 102 | FIG. 15 | FIG. 16 | FIG. 17 |
| | Coordinating Application 702 to Gaining Registrant 802 | FIG. 18 | FIG. 19 | FIG. 20 |
| | Gaining Registrar 902 and Losing Registrar 104 | FIG. 21 | FIG. 22 | FIG. 23 |
| | Registry 102 | FIG. 24 | FIG. 25 | FIG. 26 |
| | Gaining Registrant 802 (for FIGS. 28 & 29, via Coordinating Application 702) | FIG. 27 | FIG. 28 | FIG. 29 |

FIG. 12 is a hybrid diagram for a method 1200 of propagating the transfer of a domain name registration from the blockchain environment into the DNS environment by releasing both the domain name and cryptocurrency funds from escrow, where the notified entity is gaining registrar 902 by way of coordinating application 702, and where the verifying entity is gaining registrant 802. For convenience, method 1200 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 1200 continues the example initiated in reference to FIG. 7 regarding the domain name example.com.

Method 1200 may automatically follow method 1100 in order to ensure that the domain name is properly transferred in both the blockchain environment and the DNS environment. Thus, method 1200 may be initiated by coordinating application 702 in response to detecting the transfer event of 1160 of method 1100. A description of method 1200 follows.

At 1252, coordinating application 702 detects the transfer event of 1160 and proceeds to check deed contract 708 for the identities of losing registrar 104, gaining registrar 902, and new registrant information.

The new registrant information may take various forms. The new registrant information may be used to notify gaining registrar 902 which account on its platform should be assigned the domain name, without risking the domain name being orphaned, that is, transferred to gaining registrar 902 without a clear registrant to assign the domain name to. Additionally, if registry 102 is thick or thin may affect the new registrant information that is submitted when transfers are being processed. Here, a registry is thin if it does not capture, for example, personally identifying information of its registrants. Some thin registries store only the domain name and its associated registrar, which stores the personally identifying information of the registrant. A registry is thick if it is not thin, such as by additional information. If registry 102 is thin, the new registrant information may include the identity of gaining registrar 902. If registry 102 is thick, the new registrant information may include the identity of gaining registrar 902 as well as information identifying gaining registrant 802.

At 1254, coordinating application 702 notifies losing registrar 104 of the domain name transfer. Further, coordinating application 702 requests authorization information for the domain name from losing registrar 104 using the access token for losing registrant 202.

At 1256, losing registrar 104 requests the authorization information from registry 102 using an EPP get command. Registry 102 responds with the requested authorization information.

At 1258, losing registrar 104 returns the authorization information requested per 1254 to coordinating application 702.

At 1260, coordinating application 702 notifies gaining registrar 902 of the domain name transfer. The notification may include the authorization information of 1258, the domain name (in the continuing example, example.com), and the identity of gaining registrant 802.

At 1262, gaining registrar 902 sends an EPP transfer request to registry 102 for the transfer of example.com from losing registrant 202 to gaining registrant 802 and from losing registrar 104 to gaining registrar 902.

At 1264, gaining registrar 902 obtains a digitally signed registrar of record proof from registry 102. The registrar of record proof, which is digitally signed by a private key of registry 102, includes at least a copy of the domain name example.com and an identifier of gaining registrant 802.

At 1266, gaining registrar 902 provides gaining registrant 802 with the registrar of record proof.

At 1268, gaining registrant 802 sends the registrar of record proof to coordinating application 702.

At 1270, coordinating application 702 passes the registrar of record proof to top-level domain contract 706.

At 1272, top-level domain contract 702 uses its signature verification program to verify the registrar of record proof. If the digital signature is valid, then control passes to 1274; otherwise, top-level domain contract 706 may return an error message, which may be propagated to gaining registrant 802 via coordinating application 702.

At 1274, top-level domain contract 706 updates blockchain directory 110 and deed contract 708. In particular, top-level domain contract 706 updates blockchain directory 110 as to the new registrant for example.com, e.g., associating the domain name with the blockchain address of gaining registrant 802. Further, top-level domain contract 706 reads pending deed contract 1102 and uses the read information to update deed contract 708 with the information for gaining registrant 802. Top-level domain contract 706 also directs pending deed contract 1102 to release the escrowed cryptocurrency funds to losing registrant 202.

At 1276, pending deed contract 1102 may transfer the purchase price in cryptocurrency held in escrow at 1102 to losing registrant 202. In some embodiments, coordinating application 702 may provide a digital signature in order to release the cryptocurrency purchase price to losing registrant 202.

At this point, transfer of example.com in both the blockchain environment and the DNS environment is complete, as well as the transfer of the corresponding cryptocurrency from gaining registrant 802 to losing registrant 202. This may conclude method 1200.

FIG. 13 is a hybrid diagram for a method 1300 of propagating the transfer of a domain name registration from the blockchain environment into the DNS environment by releasing both the domain name and cryptocurrency funds from escrow, where the notified entity is gaining registrar 902 by way of coordinating application 702, and where the verifying entity is gaining registrar 902. Method 1300 is shown and described in reference to the same entities as shown and described above in reference to FIG. 11.

Method 1300 is identical to method 1200 except where noted presently. Instead of gaining registrar 902 providing the registrar of record proof to gaining registrant 802 at 1266, and gaining registrant 802 forwarding it to coordinating application 702 at 1268, for method 1300, gaining registrar 902 sends the registrar of record proof directly to coordinating application 702 at 1302. The remainder of the actions of method 1300 are identical to those of method 1200.

FIG. 14 is a hybrid diagram for a method 1400 of propagating the transfer of a domain name registration from the blockchain environment into the DNS environment by releasing both the domain name and cryptocurrency funds from escrow, where the notified entity is gaining registrar 902 by way of coordinating application 702, and where the verifying entity is registry 102. Method 1400 is shown and described in reference to the same entities as shown and described above in reference to FIG. 11.

Method 1400 is identical to method 1200 except where noted presently. Instead of gaining registrar 902 providing the registrar of record proof to gaining registrant 802 at 1266, and gaining registrant 802 forwarding it to coordinating application 702 at 1268, for method 1400, registry 102 sends the registrar of record proof directly to coordinating application 702 at 1402. The remainder of the actions of method 1400 are identical to those of method 1200.

FIG. 15 is a hybrid diagram for a method 1500 of propagating the transfer of a domain name registration from the blockchain environment into the DNS environment by releasing both the domain name and cryptocurrency funds from escrow, where the notified entity is registry 102 by way of coordinating application 702, and where the verifying entity is gaining registrar 802. For convenience, method 1500 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 1500 continues the example initiated in reference to FIG. 7 regarding the domain name example.com.

Method 1500 may automatically follow method 1100 in order to ensure that the domain name is properly transferred in both the blockchain environment and the DNS environment. Thus, method 1500 may be initiated by coordinating application 702 in response to detecting the transfer event of 1160 of method 1100. A description of method 1500 follows.

At 1552, coordinating application 702 detects the transfer event of 1160 and proceeds to check deed contract 708 for the identities of losing registrar 104, gaining registrar 902, and new registrant information. The new registrant information may be as described above in reference to FIG. 12.

At 1554, coordinating application 702 notifies registry 102 of the domain name transfer. Coordinating application 702 may utilize EPP or a different protocol to issue the notification.

At 1556, registry 102 updates its records to represent the transfer of example.com from losing registrant 202 to gaining registrant 802 and from losing registrar 104 to gaining registrar 904.

At 1558, registry 102 notifies losing registrar 104 of the transfer.

At 1560, registry 102 notifies gaining registrar 904 of the transfer. Further, registry 102 provides gaining registrar 904 with a registrar of record proof.

At 1562, gaining registrar 904 provides gaining registrant 802 with the registrar of record proof.

At 1564, gaining registrant 802 provides coordinating application 702 with the registrar of record proof.

The remaining actions of method 1500 are identical to actions 1270, 1272, 1274, and 1276 as shown and described above in reference to FIG. 12.

FIG. 16 is a hybrid diagram for a method 1600 of propagating the transfer of a domain name registration from the blockchain environment into the DNS environment by releasing both the domain name and cryptocurrency funds from escrow, where the notified entity is registry 102 by way of coordinating application 702, and where the verifying entity is gaining registrar 902. Method 1600 is shown and described in reference to the same entities as shown and described above in reference to FIG. 11.

Method 1600 is identical to method 1500 except where noted presently. Instead of gaining registrar 902 providing the registrar of record proof to gaining registrant 802 at 1562, and gaining registrant 802 forwarding it to coordinating application 702 at 1564, for method 1600, gaining registrar 904 sends the registrar of record proof directly to coordinating application 702 at 1602. The remainder of the actions of method 1600 are identical to those of method 1500.

FIG. 17 is a hybrid diagram for a method 1700 of propagating the transfer of a domain name registration from the blockchain environment into the DNS environment by releasing both the domain name and cryptocurrency funds from escrow, where the notified entity is registry 102 by way of coordinating application 702, and where the verifying entity is registry 102. Method 1700 is shown and described in reference to the same entities as shown and described above in reference to FIG. 11.

Method 1700 is identical to method 1500 except where noted presently. Instead of gaining registrar 902 providing the registrar of record proof to gaining registrant 802 at 1562, and gaining registrant 802 forwarding it to coordinating application 702 at 1564, for method 1700, registry 102 sends the registrar of record proof directly to coordinating application 702 at 1702. The remainder of the actions of method 1600 are identical to those of method 1500.

FIG. 18 is a hybrid diagram for a method 1800 of propagating the transfer of a domain name registration from the blockchain environment into the DNS environment by releasing both the domain name and cryptocurrency funds from escrow, where the notified entity is gaining registrant 802 by way of coordinating application 702, and where the verifying entity is gaining registrant 802. For convenience, method 1800 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 1800 continues the example initiated in reference to FIG. 7 regarding the domain name example.com.

Method 1800 may automatically follow method 1100 in order to ensure that the domain name is properly transferred in both the blockchain environment and the DNS environment. Thus, method 1800 may be initiated by coordinating application 702 in response to detecting the transfer event of 1160 of method 1100. A description of method 1800 follows.

At 1852, coordinating application 702 detects the transfer event of 1160 and proceeds to check deed contract 708 for the identities of losing registrar 104, gaining registrar 902, and new registrant information. The new registrant information may be as described above in reference to FIG. 12.

At 1854, coordinating application 702 notifies gaining registrant 802 of the domain name transfer.

At 1856, gaining registrant 802 requests authorization information from losing registrant 202. This action may be performed by, e.g., the respective wallets of registrants 802, 202. Losing registrant 202 provides the requested authorization information.

At 1858, gaining registrant 802 submits a transfer request to gaining registrar 902 for the domain name example.com. The transfer request may include the authorization information obtained at 1856.

At 1860, gaining registrar 902 submits a transfer request to registry 102 using EPP. The transfer request is to transfer example.com from losing registrant 202 to gaining registrant 802 and from losing registrar 104 to gaining registrar 902.

At 1862, losing registrar 104 approves the transfer, e.g., in response to a query from registry 102.

At 1864, gaining registrar 902 obtains a registrar of record proof from registry 102.

At 1866, gaining registrant 802 obtains the registrar of record proof from gaining registrar 902.

At 1868, gaining registrant 802 sends the registrar of record proof to coordinating application 702.

The remaining actions of method 1800 are identical to actions 1270, 1272, 1274, and 1276 as shown and described above in reference to FIG. 12.

FIG. 19 is a hybrid diagram for a method 1900 of propagating the transfer of a domain name registration from the blockchain environment into the DNS environment by releasing both the domain name and cryptocurrency funds from escrow, where the notified entity is gaining registrant 802 by way of coordinating application 702, and where the verifying entity is gaining registrar 902. Method 1900 is shown and described in reference to the same entities as shown and described above in reference to FIG. 11.

Method 1900 is identical to method 1800 except where noted presently. Instead of gaining registrar 902 providing the registrar of record proof to gaining registrant 802 at 1866, and gaining registrant 802 forwarding it to coordinating application 702 at 1868, for method 1900, gaining registrar 904 sends the registrar of record proof directly to coordinating application 702 at 1902. The remainder of the actions of method 1900 are identical to those of method 1800.

FIG. 20 is a hybrid diagram for a method 2000 of propagating the transfer of a domain name registration from the blockchain environment into the DNS environment by releasing both the domain name and cryptocurrency funds from escrow, where the notified entity is gaining registrant 802 by way of coordinating application 702, and where the verifying entity is registry 102. Method 2000 is shown and described in reference to the same entities as shown and described above in reference to FIG. 11.

Method 2000 is identical to method 1800 except where noted presently. Instead of registry 102 providing a registrar of record proof to gaining registrar 902 at 1864, gaining registrar 902 forwarding it to gaining registrant 802 at 1866, and gaining registrant 802 forwarding it to coordinating application 702 at 1868, for method 2000, registry 102 generates and sends the registrar of record proof directly to coordinating application 702 at 2002. The remainder of the actions of method 2000 are identical to those of method 1800.

FIG. 21 is a hybrid diagram for a method 2100 of propagating the transfer of a domain name registration from the blockchain environment into the DNS environment by releasing both the domain name and cryptocurrency funds from escrow, where the notified entities are losing registrar 102 and gaining registrar 902, and where the verifying entity is gaining registrant 802. For convenience, method 2100 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 2100 continues the example initiated in reference to FIG. 7 regarding the domain name example.com.

Method 2100 may automatically follow method 1100 in order to ensure that the domain name is properly transferred in both the blockchain environment and the DNS environment. Thus, method 2100 may be initiated by gaining registrar 902 in response to detecting the transfer event of 1160 of method 1100. A description of method 2100 follows.

At 2152, gaining registrar 902 detects the transfer event of 1160 and proceeds to check deed contract 708 for the identity of losing registrar 104 and new registrant information. The new registrant information may be as described above in reference to FIG. 12.

At 2154, losing registrar 104 detects the transfer event of 1160 and proceeds to check deed contract 708 for the identity of gaining registrar 902 and new registrant information. The new registrant information may be as described above in reference to FIG. 12.

At 2156, gaining registrar 902 request authorization information from losing registrar 104.

At 2158, losing registrar 104 requests such authorization information from registry 102, which returns it to losing registrar 104.

At 2160, losing registrar 104 passes the authorization information to gaining registrar 902.

At 2162, gaining registrar 902 submits a transfer request to registry 102 using EPP. The transfer request is to transfer example.com from losing registrant 202 to gaining registrant 802 and from losing registrar 104 to gaining registrar 902.

At 2164, gaining registrar 902 requests and receives a registrar of record proof from registry 102.

At 2166, gaining registrar 902 forwards the registrar of record proof to gaining registrant 802.

At 2168, gaining registrant 802 forward the registrar of record proof to coordinating application 702.

The remaining actions of method 2100 are identical to actions 1270, 1272, 1274, and 1276 as shown and described above in reference to FIG. 12.

FIG. 22 is a hybrid diagram for a method 2200 of propagating the transfer of a domain name registration from the blockchain environment into the DNS environment by releasing both the domain name and cryptocurrency funds from escrow, where the notified entities are losing registrar 102 and gaining registrar 902, and where the verifying entity is gaining registrar 902. Method 2200 is shown and described in reference to the same entities as shown and described above in reference to FIG. 11.

Method 2200 is identical to method 2100 except where noted presently. Instead of gaining registrar 902 providing the registrar of record proof to gaining registrant 802 at 2166, and gaining registrant 802 forwarding it to coordinating application 702 at 2168, for method 2200, gaining registrar 904 sends the registrar of record proof directly to coordinating application 702 at 2202. The remainder of the actions of method 2200 are identical to those of method 2100.

FIG. 23 is a hybrid diagram for a method 2300 of propagating the transfer of a domain name registration from the blockchain environment into the DNS environment by releasing both the domain name and cryptocurrency funds from escrow, where the notified entities are the losing registrar 102 and the gaining registrar 902, and where the verifying entity is registry 102. Method 2300 is shown and described in reference to the same entities as shown and described above in reference to FIG. 11.

Method 2300 is identical to method 2100 except where noted presently. Instead of registry 102 providing the registrar of record proof to gaining registrar 902 at 2164, gaining registrar 902 providing it to gaining registrant 802 at 2166, and gaining registrant 802 forwarding it to coordinating application 702 at 2168, for method 2300, registry 102 sends the registrar of record proof directly to coordinating application 702 at 2302. The remainder of the actions of method 2300 are identical to those of method 2100.

FIG. 24 is a hybrid diagram for a method 2400 of propagating the transfer of a domain name registration from the blockchain environment into the DNS environment by releasing both the domain name and cryptocurrency funds from escrow, where the notified entity is registry 102, and where the verifying entity is gaining registrar 802. For convenience, method 2400 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 2400 continues the example initiated in reference to FIG. 7 regarding the domain name example.com.

Method 2400 may automatically follow method 1100 in order to ensure that the domain name is properly transferred in both the blockchain environment and the DNS environment. Thus, method 2400 may be initiated by registry 102 in response to detecting the transfer event of 1160 of method 1100. A description of method 2400 follows.

At 2452, registry 102 detects the transfer event of 1160 and proceeds to check deed contract 708 for the identity of losing registrar 104 and new registrant information. The new registrant information may be as described above in reference to FIG. 12.

At 2454, registry 102 updates its records to represent the transfer of example.com from losing registrant 202 to gaining registrant 802 and from losing registrar 104 to gaining registrar 904.

At 2456, registry 102 notifies losing registrar 104 of the transfer.

At 2458, registry 102 notifies gaining registrar 904 of the transfer. Further, registry 102 provides gaining registrar 904 with a registrar of record proof.

At 2460, gaining registrar 904 provides gaining registrant 802 with the registrar of record proof.

At 2462, gaining registrant 802 provides coordinating application 702 with the registrar of record proof.

The remaining actions of method 2400 are identical to actions 1270, 1272, 1274, and 1276 as shown and described above in reference to FIG. 12.

FIG. 25 is a hybrid diagram for a method 2500 of propagating the transfer of a domain name registration from the blockchain environment into the DNS environment by releasing both the domain name and cryptocurrency funds from escrow, where the notified entity is registry 102, and where the verifying entity is gaining registrar 902. Method 2500 is shown and described in reference to the same entities as shown and described above in reference to FIG. 11.

Method 2500 is identical to method 2400 except where noted presently. Instead of gaining registrar 902 providing the registrar of record proof to gaining registrant 802 at 2460, and gaining registrant 802 forwarding it to coordinating application 702 at 2462, for method 2500, gaining registrar 902 sends the registrar of record proof directly to coordinating application 702 at 2502. The remainder of the actions of method 2500 are identical to those of method 2400.

FIG. 26 is a hybrid diagram for a method 2600 of propagating the transfer of a domain name registration from the blockchain environment into the DNS environment by releasing both the domain name and cryptocurrency funds from escrow, where the notified entity is registry 102, and where the verifying entity is also registry 102. Method 2600 is shown and described in reference to the same entities as shown and described above in reference to FIG. 11.

Method 2600 is identical to method 2400 except where noted presently. Instead of gaining registrar 902 providing the registrar of record proof to gaining registrant 802 at 2460, and gaining registrant 802 forwarding it to coordinating application 702 at 2462, for method 2600, registry 102 sends the registrar of record proof directly to coordinating application 702 at 2652. The remainder of the actions of method 2600 are identical to those of method 2400.

FIG. 27 is a hybrid diagram for a method 2700 of propagating the transfer of a domain name registration from the blockchain environment into the DNS environment by releasing both the domain name and cryptocurrency funds from escrow, where the notified entity is gaining registrant 802, and where the verifying entity is also gaining registrant 802. For convenience, method 2700 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 2700 continues the example initiated in reference to FIG. 7 regarding the domain name example.com.

Method 2700 may automatically follow method 1100 in order to ensure that the domain name is properly transferred in both the blockchain environment and the DNS environment. Thus, method 2700 may be initiated by gaining registrant 802 in response to detecting the transfer event of 1160 of method 1100. A description of method 2700 follows.

At 2752, gaining registrant 802 detects the transfer event of 1160 and proceeds to check deed contract 708 for the identity of losing registrar 104 and new registrant information. The new registrant information may be as described above in reference to FIG. 12.

At 2754, gaining registrant 802 requests authorization information from losing registrant 202. This action may be performed by, e.g., the respective wallets of registrants 802, 202. Losing registrant 202 provides the requested authorization information.

At 2756, gaining registrant 802 submits a transfer request to gaining registrar 902 for the domain name example.com. The transfer request may include the authorization information obtained at 2754.

At 2758, gaining registrar 902 submits a transfer request to registry 102 using EPP. The transfer request is to transfer example.com from losing registrant 202 to gaining registrant 802 and from losing registrar 104 to gaining registrar 902.

At 2760, losing registrar 104 approves the transfer, e.g., in response to a query from registry 102.

At 2762, gaining registrar 902 obtains a registrar of record proof from registry 102.

At 2764, gaining registrant 802 obtains the registrar of record proof from gaining registrar 902.

At 2766, gaining registrant 802 sends the registrar of record proof to coordinating application 702.

The remaining actions of method 2700 are identical to actions 1270, 1272, 1274, and 1276 as shown and described above in reference to FIG. 12.

FIG. 28 is a hybrid diagram for a method 2800 of propagating the transfer of a domain name registration from the blockchain environment into the DNS environment by releasing both the domain name and cryptocurrency funds from escrow, where the notified entity is gaining registrant 802 by way of coordinating application 702, and where the verifying entity is gaining registrar 902. For convenience, method 2800 is shown and described in reference to the same registry 102, losing registrar 104, gaining registrar 902, losing registrant 202, gaining registrant 802, coordinating application 702, top-level domain contract 706, deed contract 708, blockchain directory 110, and pending deed escrow contract 1102, as shown and described above in reference to FIG. 11. The description of method 2800 continues the example initiated in reference to FIG. 7 regarding the domain name example.com.

Method 2800 may automatically follow method 1100 in order to ensure that the domain name is properly transferred in both the blockchain environment and the DNS environment. Thus, method 2800 may be initiated by gaining registrant 802 in response to detecting the transfer event of 1160 of method 1100. A description of method 2800 follows.

At 2852, coordinating application 702 detects the transfer event of 1160 and proceeds to check deed contract 708 for the identity of losing registrar 104 and new registrant information. The new registrant information may be as described above in reference to FIG. 12.

At 2854, coordinating application 702 notifies gaining registrant 802 of the transfer request.

At 2856, gaining registrant 802 requests authorization information from losing registrant 202. This action may be performed by, e.g., the respective wallets of registrants 802, 202. Losing registrant 202 provides the requested authorization information.

At 2858, gaining registrant 802 submits a transfer request to gaining registrar 902 for the domain name example.com. The transfer request may include the authorization information obtained at 2754.

At 2860, gaining registrar 902 submits a transfer request to registry 102 using EPP. The transfer request is to transfer example.com from losing registrant 202 to gaining registrant 802 and from losing registrar 104 to gaining registrar 902.

At 2862, losing registrar 104 approves the transfer, e.g., in response to a query from registry 102.

At 2864, gaining registrar 902 obtains a registrar of record proof from registry 102.

At 2866, gaining registrar 902 provides the registrar of record proof to coordinating application 702.

The remaining actions of method 2800 are identical to actions 1270, 1272, 1274, and 1276 as shown and described above in reference to FIG. 12.

FIG. 29 is a hybrid diagram for a method 2900 of propagating the transfer of a domain name registration from the blockchain environment into the DNS environment by releasing both the domain name and cryptocurrency funds from escrow, where the notified entity is gaining registrant 802 by way of coordinating application 702, and where the verifying entity is registry 102. Method 2900 is shown and described in reference to the same entities as shown and described above in reference to FIG. 11.

Method 2900 is identical to method 2800 except where noted presently. Instead of gaining registrar 902 obtaining the registrar of record proof from registry 102 at 2864, and gaining registrar 902 providing the registrar of record proof to coordinating application 702 at 2866, for method 2900, registry 102 sends the registrar of record proof directly to coordinating application 702 at 2952. The remainder of the actions of method 2900 are identical to those of method 2800.

IX. Variations, Modifications, and Alternate Embodiments

Some embodiments may include the registrar digitally signing messages for proof of registration at the registrar level, referred to, for example, as a registrant of record proof. Such embodiments may provide a registrar-signed message that specifies that a particular account has registered a particular domain name on a particular registrar. According to such embodiments, the registrar of record proof may be included with the registrar of record proof where it occurs, and validated when the registrar of record proof is validated. Registrant of record proofs may be used in the case of intra-registrar transfers, for example, where a registrant re-registers a domain name that is already managed by the current registrar. In such a case, the digitally signed registrar statement that is included with the (registry-signed) registrar of record proof may provide a stronger guarantee of transferal than the registrar of record proof itself.

Some embodiments may be used to push domain names sold in a blockchain to an external marketplace and vice-versa. For example, a registrar may want to partner with the service such that a domain listed on the blockchain secondary market is also listed on the registrar's secondary market. If a domain is cross-listed in both a traditional website and the blockchain secondary market, then both parties may notify each other when a sale occurs in order to ensure administrative tasks such as delisting occur in a timely manner. If a conflict occurs, e.g., a name is sold at the same time in both markets, then any of a variety of resolution strategies may be used, for example: highest price wins, favor a particular market, random chance, and any other strategy that the parties could agree to that would resolve the conflict.

Some embodiments may extend the notified parties who can submit a registrar of record proof to include the losing registrar and by extension the losing registrant when appropriate. In such embodiments, either the gaining or losing party could submit the registrar of record proof to the coordinating application or top-level domain contract. Such embodiments may include efficiency and ecosystem incentives, e.g., a losing registrant may want to be paid their purchase price as soon as possible, and such embodiments allow the losing registrant to finalize the transfer where appropriate.

Some embodiments may extend the smart contracts capable of handling secondary blockchain markets beyond the top-level domain contract 706, e.g., to a smart contract that the top-level domain contract has approved of, or delegated, to handle secondary market behaviors. In such instances, top-level domain contract 706 may be replaced by an approved secondary market smart contract that can still keep DNS and blockchain systems in sync.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A non-transitory computer readable medium comprising computer readable instructions for transferring Domain Name System (DNS) registration of a domain name from a first registrant to a second registrant by configuring at least one electronic processor to perform operations comprising:
   receiving a purchase request, from the second registrant, for the purchase of a blockchain identifier that corresponds to the domain name, wherein the purchase request comprises the blockchain identifier, at least one purchase parameter, and a second registrant network identifier, wherein the blockchain identifier is used to identify a first blockchain address of the first registrant in a blockchain network; and
   sending a message to an executable program of the blockchain network, wherein the message comprises a purchase instruction for the purchase of the blockchain identifier by the second registrant, the blockchain identifier, and the second registrant network identifier,
   wherein the executable program is configured to:
      write, to a deed contract for the blockchain identifier, the blockchain identifier, the second registrant network identifier, and an identifier of a gaining registrar, wherein the deed contract is stored in the blockchain network and identifies the purchased blockchain identifier used to identify a second blockchain address of the second registrant in the blockchain network; and
      emit an event representing a request to transfer the DNS registration of the domain name from the first registrant to the second registrant.

2. The computer readable medium of claim 1, wherein the operations further comprise:
   detecting the event representing the request to transfer, in the DNS, registration of the domain name;
   extracting at least the domain name and the identifier of the gaining registrar from the deed contract;
   obtaining, from a losing registrar, data representing authorization to transfer registration of the domain name in the DNS; and
   sending, to the gaining registrar, and using the data representing authorization to transfer registration of the domain name in the DNS, a request to transfer, in the DNS, registration of the domain name to the second registrant.

3. The computer readable medium of claim 1, wherein the operations further comprise:
   receiving a proof indicating that the gaining registrar is a registrar of record for the domain name, wherein the proof is digitally signed by a private key of a blockchain key pair of a registry for the domain name; and
   sending the proof to the executable program, wherein the domain name and corresponding cryptocurrency funds are held in escrow until the executable program verifies that the domain name has been transferred in the DNS to the second registrant.

4. The computer readable medium of claim 3, wherein the operations further comprise:
   receiving a registrar-level proof indicating that the gaining registrar is a registrar of record for the domain name, wherein the registrar-level proof is digitally signed by a private key of a blockchain key pair of the gaining registrar; and
   sending the registrar-level proof to the executable program.

5. The computer readable medium of claim 3, wherein the operations further comprise:
   detecting the event representing the request to transfer, in the DNS, registration of the domain name; and
   extracting from the deed contract at least the identifier of the gaining registrar and information identifying the second registrant; and
   notifying at least one of the gaining registrar, a losing registrar, the registry for the domain name, the second registrant, or the first registrant of the request to transfer, in the DNS, registration of the domain name.

6. The computer readable medium of claim 1, wherein the operations further comprise, prior to the receiving the purchase request and the sending the message:
receiving a for-sale message comprising the domain name and the at least one purchase parameter; and
sending a for-sale update request comprising the domain name and the at least one purchase parameter to the executable program, wherein the executable program is configured to add the domain name to a set of domain name registrations for sale.

7. The computer readable medium of claim 1, wherein the operations further comprise, prior to the receiving the purchase request and the sending the message:
receiving a request to identify at least one domain name for sale;
sending a request to the executable program to identify the at least one domain name for sale;
receiving, from the executable program, an identification of the at least one domain name for sale; and
conveying, to a sender of the request to identify at least one domain name for sale, an identification of the at least one domain name for sale.

8. The computer readable medium of claim 1, wherein the receiving the purchase request and the sending the message are performed by a wallet of the second registrant.

9. The computer readable medium of claim 1, wherein the blockchain network comprises a transaction indicating that the executable program controls a top-level domain of the domain name.

10. The computer readable medium of claim 1, wherein the at least one purchase parameter comprises a purchase price.

11. The method of claim 1, wherein the blockchain network comprises a transaction indicating that the executable program controls a top-level domain of the domain name.

12. The method of claim 1, wherein the at least one purchase parameter comprises a purchase price.

13. A method of transferring Domain Name System (DNS) registration of a domain name from a first registrant to a second registrant, the method comprising:
receiving a purchase request, from the second registrant, for the purchase of a blockchain identifier that corresponds to the domain name, wherein the purchase request comprises the blockchain identifier, at least one purchase parameter, and a second registrant network identifier, wherein the blockchain identifier is used to identify a first blockchain address of the first registrant in a blockchain network; and
sending a message to an executable program of the blockchain network, wherein the message comprises a purchase instruction for the purchase of the blockchain identifier by the second registrant, the blockchain identifier, and the second registrant network identifier,
wherein the executable program is configured to:
write, to a deed contract for the blockchain identifier, the blockchain identifier, the second registrant network identifier, and an identifier of a gaining registrar, wherein the deed contract is stored in the blockchain network and identifies the purchased blockchain identifier used to identify a second blockchain address of the second registrant in the blockchain network; and
emit an event representing a request to transfer the DNS registration of the domain name from the first registrant to the second registrant.

14. The method of claim 13, further comprising:
detecting the event representing the request to transfer, in the DNS, registration of the domain name;
extracting at least the domain name and the identifier of the gaining registrar from the deed contract;
obtaining, from a losing registrar, data representing authorization to transfer registration of the domain name in the DNS; and
sending, to the gaining registrar, and using the data representing authorization to transfer registration of the domain name in the DNS, a request to transfer, in the DNS, registration of the domain name to the second registrant.

15. The method of claim 13, further comprising:
receiving a proof indicating that the gaining registrar is a registrar of record for the domain name, wherein the proof is digitally signed by a private key of a blockchain key pair of a registry for the domain name; and
sending the proof to the executable program, whereby the domain name and corresponding cryptocurrency funds are held in escrow until the executable program verifies that the domain name has been transferred in the DNS to the second registrant.

16. The method of claim 15, further comprising:
receiving a registrar-level proof indicating that the gaining registrar is a registrar of record for the domain name, wherein the registrar-level proof is digitally signed by a private key of a blockchain key pair of the gaining registrar; and
sending the registrar-level proof to the executable program.

17. The method of claim 15, further comprising:
detecting the event representing the request to transfer, in the DNS, registration of the domain name; and
extracting from the deed contract at least the identifier of the gaining registrar and information identifying the second registrant; and
notifying at least one of the gaining registrar, a losing registrar, the registry for the domain name, the second registrant, or the first registrant of the request to transfer, in the DNS, registration of the domain name.

18. The method of claim 13, further comprising, prior to the receiving the purchase request and the sending the purchase instruction message:
receiving a for-sale message comprising the domain name and the at least one purchase parameter; and
sending a for-sale update request comprising the domain name and the at least one purchase parameter to the executable program, whereby the executable program adds the domain name to a set of domain name registrations for sale.

19. The method of claim 13, further comprising, prior to the receiving the purchase request and the sending the purchase instruction message:
receiving a request to identify at least one domain name for sale;
sending a request to the executable program to identify the at least one domain name for sale;
receiving, from the executable program, an identification of the at least one domain name for sale; and
conveying to a sender of the request to identify at least one domain name for sale an identification of the at least one domain name for sale.

20. The method of claim 13, wherein the receiving the purchase request and the sending the purchase instruction message are performed by a wallet of the second registrant.

* * * * *